United States Patent
Chu et al.

(10) Patent No.: US 11,102,780 B2
(45) Date of Patent: Aug. 24, 2021

(54) MEDIA ACCESS CONTROL FOR PUNCTURED/AGGREGATED COMMUNICATION CHANNELS IN WLAN

(71) Applicant: NXP USA, Inc., Austin, TX (US)

(72) Inventors: Liwen Chu, San Ramon, CA (US); Hongyuan Zhang, Fremont, CA (US)

(73) Assignee: NXP USA, INC., Austin, TX (US)

( * ) Notice: Subject to any disclaimer, the term of this patent is extended or adjusted under 35 U.S.C. 154(b) by 104 days.

(21) Appl. No.: 16/526,716

(22) Filed: Jul. 30, 2019

(65) Prior Publication Data

US 2020/0037324 A1 Jan. 30, 2020

Related U.S. Application Data

(60) Provisional application No. 62/712,079, filed on Jul. 30, 2018.

(51) Int. Cl.
| | | |
|---|---|---|
| H04W 72/04 | (2009.01) | |
| H04L 1/16 | (2006.01) | |
| H04W 72/08 | (2009.01) | |
| H04L 5/00 | (2006.01) | |
| H04L 1/00 | (2006.01) | |
| H04W 80/02 | (2009.01) | |
| H04W 84/12 | (2009.01) | |

(52) U.S. Cl.
CPC ....... *H04W 72/0453* (2013.01); *H04L 1/0057* (2013.01); *H04L 1/1614* (2013.01); *H04L 5/0055* (2013.01); *H04W 72/08* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | |
|---|---|---|
| 8,068,455 B2 | 11/2011 | Utsunomiya et al. |
| 8,363,578 B1 | 1/2013 | Ramamurthy et al. |
| 8,670,399 B2 | 3/2014 | Liu et al. |

(Continued)

FOREIGN PATENT DOCUMENTS

| | | |
|---|---|---|
| GB | 2501898 A | 11/2013 |
| WO | WO-2017/111567 A2 | 6/2017 |

OTHER PUBLICATIONS

U.S. Appl. No. 16/399,782, Chu et al., entitled "Punctured Operating Channels in WLAN," filed Apr. 30, 2019.

(Continued)

*Primary Examiner* — Ayanah S George

(57) ABSTRACT

A first communication device generates a plurality of media access control (MAC) layer data units to be transmitted to a second communication device via a communication channel that includes a first frequency segment and a second frequency segment separated by a gap in frequency. The first communication device generates one or more physical layer (PHY) data units that include the plurality of MAC layer data units, and simultaneously transmits i) a first frequency portion of the one or more PHY data units via the first frequency segment, and ii) a second frequency portion of the one or more PHY data units via the second frequency segment, including transmitting a first MAC layer data unit in the first frequency portion, and ii) transmitting a second MAC layer data unit in the second frequency portion.

20 Claims, 18 Drawing Sheets

(56) References Cited

U.S. PATENT DOCUMENTS

| | | | |
|---|---|---|---|
| 8,773,969 B1* | 7/2014 | Zhang | H04L 5/0044 370/208 |
| 8,787,338 B2 | 7/2014 | Liu et al. | |
| 8,787,385 B2 | 7/2014 | Liu et al. | |
| 8,811,203 B1 | 8/2014 | Liu et al. | |
| 8,971,350 B1 | 3/2015 | Liu | |
| 9,717,086 B2 | 7/2017 | Zhang et al. | |
| 9,912,388 B2 | 3/2018 | Chu et al. | |
| 2011/0249659 A1 | 10/2011 | Fontaine et al. | |
| 2014/0079016 A1 | 3/2014 | Dai et al. | |
| 2016/0100421 A1* | 4/2016 | Ding | H04L 1/1628 370/336 |
| 2016/0212748 A1 | 7/2016 | Yang et al. | |
| 2017/0006608 A1 | 1/2017 | Josiam et al. | |
| 2017/0149547 A1 | 5/2017 | Kim et al. | |
| 2017/0311204 A1 | 10/2017 | Coariou et al. | |
| 2018/0115403 A1 | 4/2018 | Sakai et al. | |
| 2019/0123863 A1 | 4/2019 | Zhang et al. | |
| 2019/0182714 A1 | 6/2019 | Chu et al. | |
| 2019/0349930 A1 | 11/2019 | Chu et al. | |

OTHER PUBLICATIONS

U.S. Appl. No. 16/526,937, Chu et al., entitled "Media Access Control for Punctured/Aggregated Communication Channels in WLAN," filed Jul. 30, 2019.

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

Cariou et al., "Multi-channel Transmissions," Doc. No. IEEE 802.11-09/1022r0, *The Institute of Electrical and Electronics Engineers, Inc.*, pp. 1-13 (Sep. 2009).

Yuan et al., "Carrier Aggregation for LTE-Advanced Mobile Communication Systems," *IEEE Communications Magazine*, pp. 88-93 (Feb. 2010).

Pedersen et al., "Carrier Aggregation for LTE-Advanced: Functionality and Performance Aspects," IEEE Communications Magazine, vol. 49, No. 6, pp. 89-95, (Jun. 1, 2011).

Noh et al., "Channel Selection and Management for 11ac," Doc. No. IEEE 802.11-10/0593r1, *The Institute of Electrical and Electronics Engineers, Inc.*, pp. 1-21 (May 20, 2010).

Redieteab et al., "Cross-Layer Multichannel Aggregation for Future WLAN Systems," 2010 IEEE Int'l Conf. on Communication Systems (ICCS), pp. 740-756 (Nov. 2010).

Park, "IEEE 802.11 ac: Dynamic Bandwidth Channel Access," 2011 IEEE Int'l Conf. on Communications (ICC), pp. 1-5 (Jun. 2011).

Liu et al., "VHT BSS Channel Selection," *Institute of Electrical and Electronics Engineers, Inc.*, doc. No. IEEE 802.11-11/1433r0, pp. 1-10 (Nov. 2011).

Wannstrom, "Carrier Aggregation explained," pp. 1-6 (May 2012).

International Search Report and Written Opinion in Interational Patent Application No. PCT/US2019/044229, dated Dec. 17, 2019 (17 pages).

Zhang et al., "EHT Technology Candidate Discussions," doc: IEEE 802.11-18/1161r0, The Institute of Electrical and Electronics Engineers, Inc., pp. 1-10 Jul. 8, 2018.

Chu et al., "MU Minimum MPDU Start Spacing," IEEE 802.11-16/0645r0, IEEE Draft, vol. 802.11ax, 14 pages (May 16, 2016).

Ghosh, et al., "Signaling of Multi-TID Aggregation Limit," IEEE 802.11-16/0667r0, IEEE Draft, vol. 802.11 ax, 16 pages (May 16, 2016).

International Search Report and Written Opinion in International Patent Application No. PCT/US2019/044219, dated Oct. 22, 2019 (12 pages).

Invitation to Pay Additional Fees and Partial International Search Report in International Patent Application No. PCT/US2019/044229, dated Oct. 22, 2019 (12 pages).

\* cited by examiner

MEDIA ACCESS CONTROL FOR PUNCTURED/AGGREGATED COMMUNICATION CHANNELS IN WLAN

CROSS REFERENCES TO RELATED APPLICATIONS

This application claims the benefit of U.S. Provisional Patent Application No. 62/712,079, entitled "Frame Transmission in Punctured/Aggregated WiFi Channels," filed on Jul. 30, 2018, which is hereby incorporated herein by reference in its entirety.

FIELD OF TECHNOLOGY

The present disclosure relates generally to wireless communication systems, and more particularly to media access control for transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. To achieve greater throughput, channel puncturing and/or simultaneous transmission in multiple radio frequency (RF) bands will likely be permitted in future developments of the IEEE 802.11 Standard. Channel puncturing involves not using a particular 20 MHz channel (e.g., because it is being used by another network) within an operating channel that comprises an aggregation of multiple 20 MHz channels such that the operating channel may include a gap in frequency. Channel puncturing and simultaneous transmission in multiple RF bands (e.g., in the 2 GHz RF band and the 5 GHz RF band) improves throughput, but increases complexity with regard to media access control (MAC) operations such as acknowledging a transmission that was performed over multiple frequency portions separated by a gap in frequency.

SUMMARY

In an embodiment, a method for transmitting packets in a wireless communication network includes: generating, at a first communication device, a plurality of media access control (MAC) layer data units to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, and wherein the plurality of MAC layer data units includes at least i) a first MAC layer data unit and ii) a second MAC layer data unit; generating, at the first communication device, one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit; and transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

In another embodiment, a first communication device for communicating in a wireless communication network comprises a wireless network interface device comprising one or more integrated circuits (ICs). The one or more ICs are configured to: generate a plurality of MAC layer data units to be transmitted to a second communication device via a communication channel that includes a first frequency segment and a second frequency segment, wherein a gap in frequency between the first frequency segment and the second frequency segment is not used for the communication channel, and wherein the plurality of MAC layer data units includes at least i) a first MAC layer data unit and ii) a second MAC layer data unit; wherein the one or more ICs are further configured to: generate one or more PHY data units that include the plurality of MAC layer data units, including i) generating a first frequency portion of the one or more PHY data units to include the first MAC layer data unit, and ii) generating a second frequency portion of the one or more PHY data units to include the second MAC layer data unit, and transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

In yet another embodiment, a method for acknowledging data transmitted in a wireless communication network includes: receiving, at a first communication device, one or more PHY data units from a second communication device via a communication channel that includes a first frequency segment and a second frequency segment separated from the first frequency segment by a gap in frequency, wherein the gap is not used for the communication channel, and wherein receiving the one or more PHY data units includes simultaneously i) receiving a first frequency portion of the one or more PHY data units via the first frequency segment of the communication channel, and ii) receiving a second frequency portion of the one or more PHY data units via the second frequency segment of the communication channel; extracting, at the first communication device, a plurality of MAC layer data units from the one or more PHY data units, including i) extracting a first MAC layer data unit from the first frequency portion of the one or more PHY data units, and ii) extracting a second MAC layer data unit from the second frequency portion of the one or more PHY data units, wherein the plurality of MAC layer data units are from the second communication device; generating, at the first communication device, acknowledgement information for the plurality of MAC layer data units; and transmitting, by the first communication device, the acknowledgment information to the second communication device via one or both of i) the first frequency segment and ii) the second frequency segment.

In still another embodiment, a first communication device for communicating in a wireless communication network comprises: a wireless network interface device comprising one or more ICs. The one or more ICs are configured to: receive one or more PHY data units from a second communication device via a communication channel that includes a first frequency segment and a second frequency segment separated from the first frequency segment by a gap in frequency, wherein the gap is not used for the communication channel, and wherein receiving the one or more PHY data units includes simultaneously i) receiving a first frequency portion of the one or more PHY data units via the first frequency segment of the communication channel, and ii) receiving a second frequency portion of the one or more PHY data units via the second frequency segment of the communication channel. The one or more ICs are further configured to: extract a plurality of MAC layer data units from the one or more PHY data units, including i) extracting a first MAC layer data unit from the first frequency portion of the one or more PHY data units, and ii) extracting a second MAC layer data unit from the second frequency portion of the one or more PHY data units, wherein the plurality of MAC layer data units are from the second communication device, generate acknowledgement information for the plurality of MAC layer data units, and transmit the acknowledgment information to the second communication device via one or both of i) the first frequency segment and ii) the second frequency segment.

In another embodiment, a method is for communicating sounding feedback in a wireless communication network. The sounding feedback is associated with an estimate of a communication channel that includes a first frequency segment and a second frequency segment separated from the first frequency segment by a gap in frequency that is not used for the communication channel. The method includes: receiving, at a first communication device, a sounding packet via the communication channel, wherein the sounding packet includes training signals for obtaining channel estimate data and/or beamforming data for the communication channel, and wherein the sounding packet includes i) a first portion received via the first frequency segment of the communication channel and ii) a second portion received via the second frequency segment of the communication channel; generating, at the first communication device, sounding feedback data for the first frequency segment of the communication channel and the second frequency segment of the communication channel based on reception of the training signals in the sounding packet; generating, at the first communication device, a plurality of MAC layer data units to include the sounding feedback data, including generating at least i) a first MAC layer data unit to be transmitted via the first frequency segment of the communication channel, and ii) a second MAC layer data unit to be transmitted via the second frequency segment of the communication channel; generating, at the first communication device, one or more PHY data units to include the plurality of MAC layer data units, including i) generating a first frequency portion of the one or more PHY data units to include the first MAC layer data unit, and ii) generating a second frequency portion of the one or more PHY data units to include the second MAC layer data unit; and transmitting, by the first communication device, the one or more PHY data units packet via the communication channel to a second communication device, including simultaneously i) transmitting the first frequency portion of the one or more PHY data units via the first frequency segment of the communication channel, and ii) transmitting the second frequency portion of the one or more PHY data units via the second frequency segment of the communication channel.

In still another embodiment, a first communication device for communicating in a wireless communication network comprises: a wireless network interface device comprising one or more ICs. The one or more ICs are configured to: receive a sounding packet via a communication channel that includes a first frequency segment and a second frequency segment separated from the first frequency segment by a gap in frequency that is not used for the communication channel, wherein the sounding packet includes training signals for obtaining channel estimate data and/or beamforming data for the communication channel, and wherein the sounding packet includes i) a first portion received via the first frequency segment of the communication channel and ii) a second portion received via the second frequency segment of the communication channel. The one or more ICs are further configured to: generate sounding feedback data for the first frequency segment of the communication channel and the second frequency segment of the communication channel based on reception of the training signals in the sounding packet, generate a plurality of MAC layer data units to include the sounding feedback data, including generating at least i) a first MAC layer data unit to be transmitted via the first frequency segment of the communication channel, and ii) a second MAC layer data unit to be transmitted via the second frequency segment of the communication channel, generate one or more PHY data units to include the plurality of MAC layer data units, including i) generating a first frequency portion of the one or more PHY data units to include the first MAC layer data unit, and ii) generating a second frequency portion of the one or more PHY data units to include the second MAC layer data unit, and control the wireless network interface to transmit the one or more PHY data units packet via the communication channel to a second communication device, including simultaneously i) transmitting the first frequency portion of the one or more PHY data units via the first frequency segment of the communication channel, and ii) transmitting the second frequency portion of the one or more PHY data units via the second frequency segment of the communication channel.

In another embodiment, a method for transmitting packets in a wireless communication network includes: generating, at a first communication device, a plurality of aggregate MAC protocol data units (A-MPDUs) to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, wherein the plurality of A-MPDUs includes at least i) a first A-MPDU and ii) a second A-MPDU, and wherein the plurality of A-MPDUs correspond to a single block acknowledgment (BA) agreement between the first communication device and the second communication device; generating, at the first communication device, one or more PHY data units that include the plurality of A-MPDUs, including i) generating a first frequency portion of the one or more PHY data units to include the first A-MPDU, and ii) generating a second frequency portion of the one or more PHY data units to include the second A-MPDU; and transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

In yet another embodiment, a first communication device for communicating in a wireless communication network comprises: a wireless network interface device comprising one or more ICs. The one or more ICs are configured to: generate a plurality of A-MPDUs to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, wherein the plurality of A-MPDUs includes at least i) a first A-MPDU and ii) a second A-MPDU, and wherein the plurality of A-MPDUs correspond to a single BA agreement between the first communication device and the second communication device; generate one or more PHY data units that include the plurality of A-MPDUs, including i) generating a first frequency portion of the one or more PHY data units to include the first A-MPDU, and ii) generating a second frequency portion of the one or more PHY data units to include the second A-MPDU; and transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

DETAILED DESCRIPTION

Figure 1A:
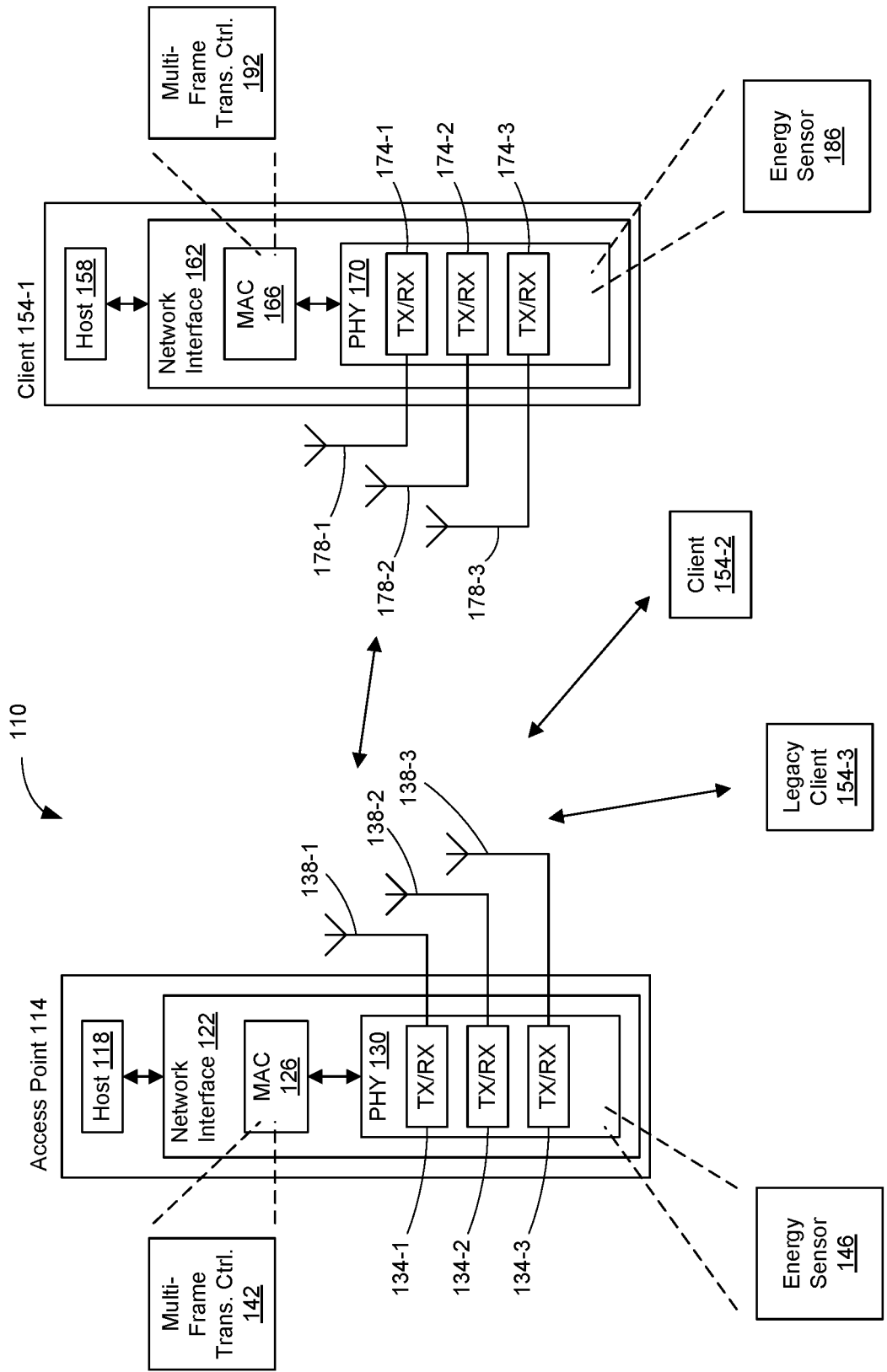
FIG. 1A is a block diagram of an example wireless local area network (WLAN) that uses a punctured communication channel in which one or more sub-channels within an overall bandwidth are not used, and/or uses a communication channel with sub-channels in multiple radio frequency (RF) bands, according to an embodiment.

The IEEE 802.11n Standard communication protocol, the IEEE 802.11ac Standard communication protocol, and the IEEE 802.11ax Standard communication protocol (now in the final stages of development) permit an access point (AP) of a wireless local area network (WLAN) to establish an operating channel that comprises multiple 20 MHz communication sub-channels (sometimes referred to herein as "component channels") aggregated together to form a composite communication channel. For example, an access point (AP) may establish an operating channel by aggregating two adjacent 20 MHz sub-channels to form a 40 MHz composite channel; by aggregating four adjacent 20 MHz sub-channels to form an 80 MHz composite channel; or by aggregating eight adjacent 20 MHz sub-channels to form a 160 MHz composite channel.

As the density of IEEE 802.11 WLANs increases over time, it tends to become more difficult for an AP to find several 20 MHz sub-channels within a single radio frequency (RF) band that are idle and that can be aggregated together to form a larger composite channel. Additionally, since government regulatory authorities have permitted IEEE 802.11 WLANs to operate in radio frequency (RF)

bands that are also used by other technologies (such as radar systems), this also tends to make it more difficult for an AP to find several 20 MHz sub-channels that are idle and can be aggregated together to form a larger composite channel.

In various embodiments described below, a first communication device in a wireless local area network (WLAN) simultaneously transmits multiple media access control (MAC) layer data units to a second communication device via different frequency segments of an operating channel Simultaneous transmission of different MAC layer data units to a single second communication device via different frequency segments improves throughput, at least in some embodiments.

In some embodiments, the operating channel may have an overall bandwidth in which one or more sub-channels are "punctured", e.g., not used for the operating channel, and the different frequency segments are separated in frequency by the punctured sub-channel(s). Thus, the different frequency segments are separated by a gap in frequency corresponding to the punctured sub-channel(s). As an illustrative example, the operating channel has an overall bandwidth of 80 MHz, but one 20 MHz sub-channel within the overall 80 MHz bandwidth is not used. In the illustrative example above, if one sub-channel within an overall 80 MHz composite channel is busy, the AP can establish a punctured operating channel having an aggregate bandwidth that is greater than 40 MHz. This is in contrast to prior art WiFi systems in which communication devices would be required to switch to an operating channel of 40 MHz even if only one 20 MHz sub-channel within an overall 80 MHz composite channel became busy. As another illustrative example, the operating channel has an overall bandwidth of 160 MHz, but up to three 20 MHz sub-channels within the overall 160 MHz bandwidth are not used. In the illustrative example above, if one (or two, or three) sub-channel within an overall 160 MHz composite channel is busy, the AP can establish a punctured operating channel having an aggregate bandwidth that is greater than 80 MHz. This is in contrast to prior art WiFi systems in which communication devices would be required to switch to an operating channel of 80 MHz even if only one 20 MHz sub-channel within an overall 160 MHz composite channel became busy.

In other embodiments, the different frequency segments are additionally or alternatively located in different RF bands, which may be separated from each other by a gap in frequency. The Federal Communication Commission (FCC) now permits wireless local area networks (WLANs) to operate in multiple RF bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Current IEEE 802.11 Standard protocols only permit a WLAN to operate in one RF band at a time. For example, the IEEE 802.11n Standard protocol is defined only for operation in the 2.4 GHz band or the 5 GHz band, but not both the 2.4 GHz band and the 5 GHz band at the same time. The IEEE 802.11ac Standard protocol is defined only for operation in the 5 GHz band. A draft of the IEEE 802.11ax Standard protocol, now under development, proposes to permit a WLAN to operate in the 2.4 GHz band or the 5 GHz band, but not both the 2.4 GHz band and the 5 GHz band at the same time.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 is configured for operating within a single RF band at a given time. In another embodiment, the network interface device 122 is configured for operating within multiple RF bands at the same time. For example, in an embodiment, the network interface device 122 includes multiple PHY processors 130 to facilitate multi-RF band communication, where respective PHY processors 130 correspond to respective RF bands. In another embodiment, the network interface device 122 includes a single PHY processor 130, where each transceiver 134 includes respective RF radios corresponding to respective RF bands to facilitate multi-band communication. For brevity and ease of explanation, FIG. 1 shows a single PHY processor 130 and the present disclosure refers to "the PHY processor 130". In some embodiments, however, "the PHY processor 130" referred to in the present application comprises multiple PHY processors 130, e.g., to facilitate multi-RF band communication.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130, according to some embodiments. The PHY processor 130 is configured to receive MAC layer data units from the MAC processor 126 and encapsulate the MAC layer data units to generate PHY data units such as PHY protocol data units (PPDUs) for transmission via the antennas 138, according to some embodiments. Similarly, the PHY processor 130 is configured to receive PHY data units that were received via the antennas 138, and extract MAC layer data units encapsulated within the PHY data units, according to some embodiments. The PHY processor 130 provides the extracted MAC layer data units to the MAC processor 126, which processes the MAC layer data units, according to some embodiments.

PHY data units are sometimes referred to herein as "packets", and MAC layer data units are sometimes referred to herein as "frames".

In connection with generating one or more RF signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes a multi-frame transmission controller 142 that is configured to control the PHY processor 130 to simultaneously transmit multiple MAC layer data units to another communication device via different frequency segments, according to an embodiment. For example, FIGS. 3A-F illustrate examples of communication channels with different frequency segments via which multiple MAC layer data units are transmitted, according to various embodiments. Additionally, the multi-frame transmission controller 142 is configured to select the multiple MAC layer data units to be simultaneously transmitted to the other communication device via the different frequency segments, according to an embodiment. In an embodiment, the multi-frame transmission controller 142 is implemented by a processor (not shown) configured to execute machine readable instructions stored in a memory device (not shown) such as a RAM, a read ROM, a flash memory, etc. In another embodiment, the multi-frame transmission controller 142 includes a hardware state machine (not shown).

The PHY processor 130 includes one or more energy sensors 146 (sometimes referred to herein as "the energy sensor 146" for brevity) that are configured to measure energy levels in communication channels for the purpose of determining whether the communication channels are idle. The one or more energy sensors 146 include respective energy level sensors corresponding to respective communication channels, in an embodiment. The energy sensor 146 includes a single energy level sensor that is time-shared to measure energy levels of different communication channels, in another embodiment. In some embodiments, PHY processor 130 also comprises one or more 802.11 signal detectors (not shown) that are configured to detect a signal that conforms to the IEEE 802.11 Standard (sometimes referred to as a "valid signal"). In some embodiments, the PHY processor is configured to compare an energy level in a communication channel to a first threshold if a valid signal is not detected, and compare the energy level in the communication channel to a second threshold if a valid signal is detected, where the second threshold is lower than the first threshold, and where comparison of the energy level to the first or second threshold is for determining whether the communication channel is idle (e.g., if the energy level is below the appropriate threshold, the communication channel is determined to be idle).

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170, according to some embodiments. The PHY processor 170 is configured to receive MAC layer data units from the MAC processor 166 and encapsulate the MAC layer data units to generate PHY data units such as PPDUs for transmission via the antennas 178, according to some embodiments. Similarly, the PHY processor 170 is configured to receive PHY data units that were received via the antennas 178, and extract MAC layer data units encapsulated within the PHY data units, according to some embodiments. The PHY processor 170 provides the extracted MAC layer data units to the MAC processor 166, which processes the MAC layer data units, according to some embodiments.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1 for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor (not shown) configured to execute machine readable instructions stored in a memory device (not shown) such as a RAM, a ROM, a flash memory, etc. In an embodiment, the MAC processor 166 includes a hardware state machine (not shown).

The MAC processor 166 includes a multi-frame transmission controller 182 that is configured to control the PHY processor 170 to simultaneously transmit multiple MAC layer data units to another communication device via different frequency segments, according to an embodiment. Additionally, the multi-frame transmission controller 182 is configured to select the multiple MAC layer data units to be simultaneously transmitted to the other communication device via the different frequency segments, according to an embodiment. In an embodiment, the multi-frame transmission controller 182 is implemented by a processor (not shown) configured to execute machine readable instructions stored in a memory device (not shown) such as a RAM, a read ROM, a flash memory, etc. In another embodiment, the multi-frame transmission controller 182 includes a hardware state machine (not shown).

The PHY processor 170 includes one or more energy sensors 186 (sometimes referred to herein as "the energy sensor 186" for brevity) that are configured to measure energy levels in communication channels for the purpose of determining whether the communication channels are idle. The one or more energy sensors 186 include respective energy level sensors corresponding to respective communication channels, in an embodiment. The energy sensor 186 includes a single energy level sensor that is time-shared to measure energy levels of different communication channels, in another embodiment. In some embodiments, PHY processor 170 also comprises one or more 802.11 signal detectors (not shown) that are configured to detect a signal that conforms to the IEEE 802.11 Standard (a "valid signal"). In some embodiments, the PHY processor is configured to compare an energy level in a communication channel to a first threshold if a valid signal is not detected, and compare the energy level in the communication channel to a second threshold if a valid signal is detected, where the second threshold is lower than the first threshold, and where comparison of the energy level to the first or second threshold is for determining whether the communication channel is idle (e.g., if the energy level is below the appropriate threshold, the communication channel is determined to be idle).

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 1B:
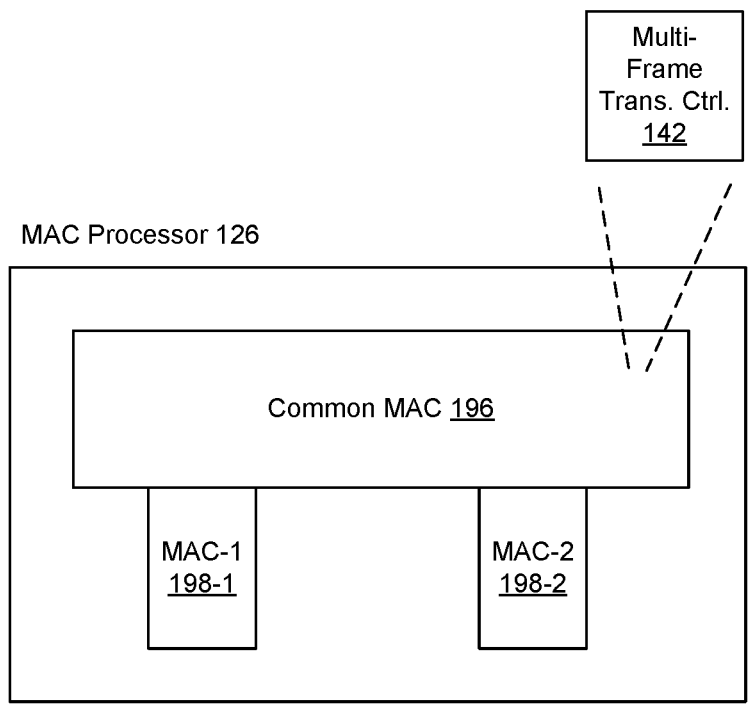
FIG. 1B is a block diagram of an example MAC processor of an access point in the example WLAN of FIG. 1A, according to an embodiment.

FIG. 1B is a diagram of the MAC processor 126, according to an embodiment. The example MAC processor 126 of FIG. 1B is configured to operate in multiple frequency segments simultaneously. The MAC processor 126 includes a common MAC processor 196 and a plurality of link-specific MAC processors 198 that respectively correspond to different frequency segments of a communication channel. The common MAC processor 196 is configured to implement MAC layer functions that are common to all of the frequency segments of the communication channel, and/or are not specific to a particular frequency segment of the communication channel, according to an embodiment. On the other hand, each link-specific MAC processor 198 is configured to implement MAC layer functions that are specific to the frequency segment to which the link-specific MAC processor 198 corresponds, according to an embodiment. As an illustrative example, if the MAC processor 126 maintains a single network allocation vector (NAV) counter for the entire communication channel, the common MAC processor 196 includes and maintains the single NAV counter, according to an embodiment. On the other hand, if the MAC processor 126 maintains multiple NAV counters for different frequency segments of the communication channel, each link-specific MAC processor 198 includes and maintains a respective NAV counter, according to an embodiment. As another illustrative example, if the MAC processor 126 maintains a single backoff counter for the entire communication channel, the common MAC processor 196 includes and maintains the single backoff counter, according to an embodiment. On the other hand, if the MAC processor 126 maintains multiple backoff counters for different frequency segments of the communication channel, each link-specific MAC processor 198 includes and maintains a respective backoff counter, according to an embodiment. As another illustrative example, if the MAC processor 126 maintains a single NAV counter for the entire communication channel, the common MAC processor 196 includes and maintains the single NAV counter, according to an embodiment. On the other hand, if the MAC processor 126 maintains multiple NAV counters for different frequency segments of the communication channel, each link-specific MAC processor 198 includes and maintains a respective NAV counter, according to an embodiment.

In an embodiment, the common MAC processor 196 is configured to perform acts related to MAC layer functions such as one or more of i) association of client stations 154 with a basic service set (BSS), ii) authentication of client stations 154, iii) negotiating block acknowledgment sessions, etc. In an embodiment, each link-specific MAC processor 198 is configured to perform acts related to MAC layer functions specific to communications via a respective frequency segment of a communication channel, such as one or more of i) performing a backoff operation to determine when a transmission in the frequency segment is permitted, ii) determining when one or more sub-channels within the frequency segment are idle, etc.

The MAC processor 126 corresponds to a multi-link MAC entity and is sometimes referred to as a multi-link MAC entity, according to an embodiment. In some embodiments, one of the link-specific MAC processors 198 is designated as a "master MAC" or "master AP," and remaining link-specific MAC processors 198 are designated as "slave MACs" or "slave APs." In an embodiment, only the master MAC 198 transmits beacon frames, whereas the slave MACs 198 do not transmit beacon frames.

In some embodiments, each link-specific MAC processor 198 corresponds to a respective MAC address and/or basic service set (BSS) identifier (BSSID). In an embodiment, only the MAC address (or BSSID) of the master MAC entity is used in connection with layers in a protocol stack above the MAC layer, i.e., the MAC addresses (or BSSIDs) of the slave MAC entities are not used in connection with layers in the protocol stack above the MAC layer. In an embodiment, the MAC address (or BSSID) of the master MAC entity 198 also corresponds to the MAC address (or BSSID) of the multi-link MAC entity 126 as a whole.

Although the multi-frame transmission controller 142 is illustrated in FIG. 1B as being a component of the common MAC processor 196, the multi-frame transmission controller 142 is distributed among the link-specific MAC processors 198, according to another embodiment.

In an embodiment, the common MAC processor 196 is implemented by a processor (not shown) configured to execute machine readable instructions stored in a memory device (not shown) such as a RAM, a read ROM, a flash memory, etc. In another embodiment, the common MAC processor 196 includes a hardware state machine (not shown). In an embodiment, each link-specific MAC processor 198 is implemented by a processor (not shown) configured to execute machine readable instructions stored in a memory device (not shown) such as a RAM, a read ROM, a flash memory, etc. In another embodiment, each link-specific MAC processor 198 includes a hardware state machine (not shown). In an embodiment, one processor and/or hardware state machine implements multiple ones of the common MAC processor 196 and/or the link-specific MAC processors 198.

In an embodiment, the MAC processor 166 (FIG. 1) has a structure similar to the MAC processor 126 of FIG. 1B. For example, the MAC processor 166 includes common MAC processor and a plurality of link-specific MAC processors that respectively correspond to different frequency segments of a communication channel. The common MAC processor is configured to implement MAC layer functions that are common to all of the frequency segments of the communication channel, and/or are not specific to a particular frequency segment of the communication channel, according to an embodiment. On the other hand, each link-specific MAC processor is configured to implement MAC layer functions that are specific to the frequency segment to which the link-specific MAC processor corresponds, according to an embodiment. In some embodiments, one of the link-specific MAC processors is designated as a MAC master entity and the remaining link-specific processors are designated as slave MAC entities. In some embodiments, each link-specific MAC processor corresponds to a respective MAC address. In an embodiment, only the MAC address of the master MAC entity is used in connection with layers in a protocol stack above the MAC layer, i.e., the MAC addresses of the slave MAC entities are not used in connection with layers in the protocol stack above the MAC layer. In an embodiment, the MAC address of the master MAC entity 198 also corresponds to the MAC address of the multi-link MAC entity 166 as a whole.

Figure 2A:
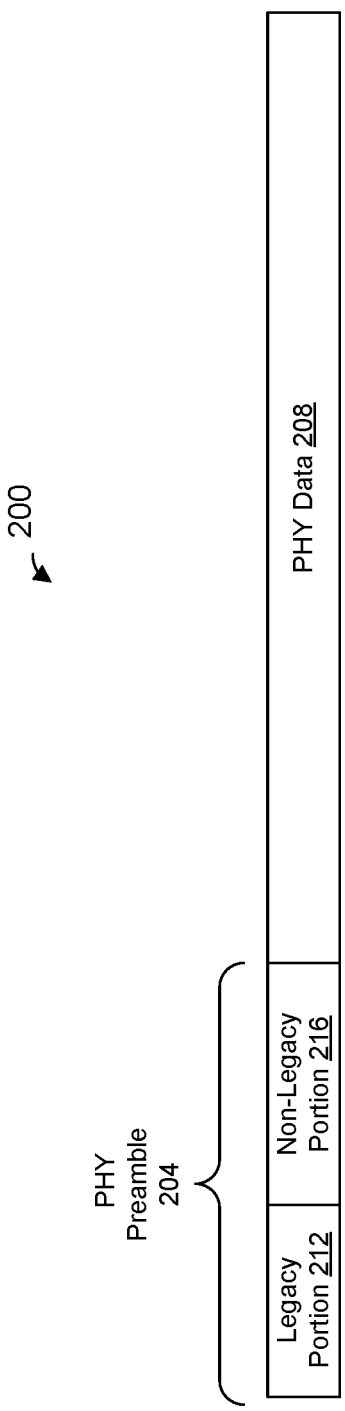
FIG. 2A is a block diagram of an example physical layer (PHY) data unit transmitted by communication devices in the WLAN of FIG. 1, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 200, according to an embodiment.

The network interface device 162 (FIG. 1) is also be configured to generate and transmit the PPDU 200 to the AP 114, according to an embodiment. If the PPDU is transmitted by the AP 114, the network interface device 162 (FIG. 1) is also configured to receive and process the PPDU 200, according to an embodiment.

The PPDU 200 may occupy a 20 MHz bandwidth or another suitable bandwidth. Data units similar to the PPDU 200 occupy other suitable bandwidths that correspond to an aggregation of multiple sub-channels (e.g., each having a 20 MHz bandwidth or another suitable bandwidth), in other embodiments.

The PPDU 200 includes a PHY preamble 204 and a PHY data portion 208.

The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The PHY data portion may include a single MPDU, or may include an aggregated MPDU (A-MPDU) comprising of a plurality of MPDUs.

In an embodiment, the PPDU 200 is a single-user (SU) PHY data unit transmitted by one of the client stations 154 to the AP 114, or transmitted by the AP 114 to one of the client station 154. In another embodiment, the PPDU 200 is a downlink multi-user (MU) PHY data unit in which the AP transmits independent data streams to multiple client stations 154 using respective sets of OFDM tones and/or spatial streams allocated to the client stations 154. In another embodiment, the PPDU 200 is an uplink MU PHY data unit in which the multiple client stations simultaneously transmit independent data streams to the AP 114 using respective sets of OFDM tones and/or spatial streams allocated to the client stations 154.

Figure 2B:
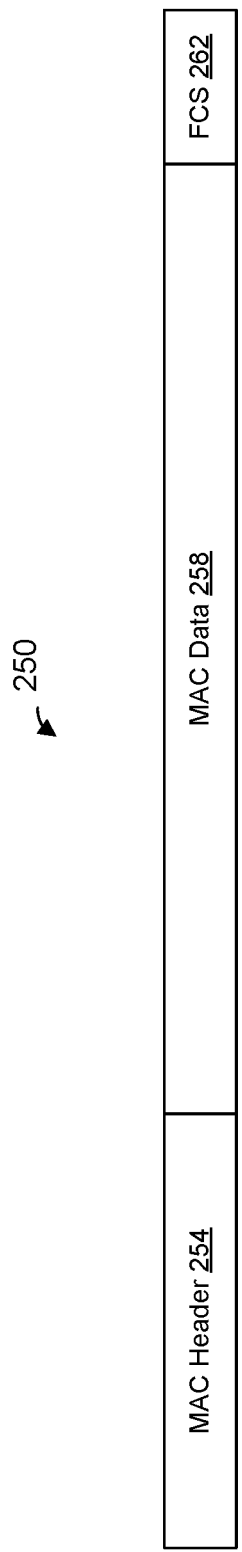
FIG. 2B is a block diagram of an example media access control layer (MAC) layer data unit that is included in the example PHY data unit of FIG. 2A, according to an embodiment.

FIG. 2B is a diagram of an example MPDU 250 that the network interface device 122 (FIG. 1) is configured to generate and transmit to one or more client stations 154 (e.g., the client station 154-1), according to an embodiment. If the MPDU 250 is transmitted by a client station 154, the network interface device 122 (FIG. 1) is also configured to receive and process the MPDU 250, according to an embodiment.

The network interface device 162 (FIG. 1) is also be configured to generate and transmit the MPDU 250 to the AP 114, according to an embodiment. If the MPDU 250 is transmitted by the AP 114, the network interface device 162 (FIG. 1) is also configured to receive and process the MPDU 250, according to an embodiment.

In an embodiment, the MPDU 250 is included in a PPDU, such as the PPDU 200 of FIG. 2A, for wireless transmission in the WLAN 110.

The MPDU 250 includes a MAC header 254, a MAC data portion 258, and a frame check sequence (FCS) field 262. In some embodiments and/or scenarios, the MAC data portion 258 is omitted. In some embodiments and/or scenarios, the MAC data portion 258 and the FCS field 262 are omitted.

The MAC header 254 includes a plurality of address fields (not shown) including a transmitter address (TA) field that includes an address of a first communication device that transmits the MPDU 250 and a receiver address (RA) field that includes an address of a second communication device to which the MPDU 250 is transmitted. The MAC header 254 also includes a traffic identifier (TID) field (not shown) that includes a TID value specifying a traffic class and/or a traffic stream to which the MPDU 250 belongs. The MAC header 254 also includes a duration field (not shown) that includes a duration value that indicates a time duration of transmission of the MPDU 250.

Figure 3A:
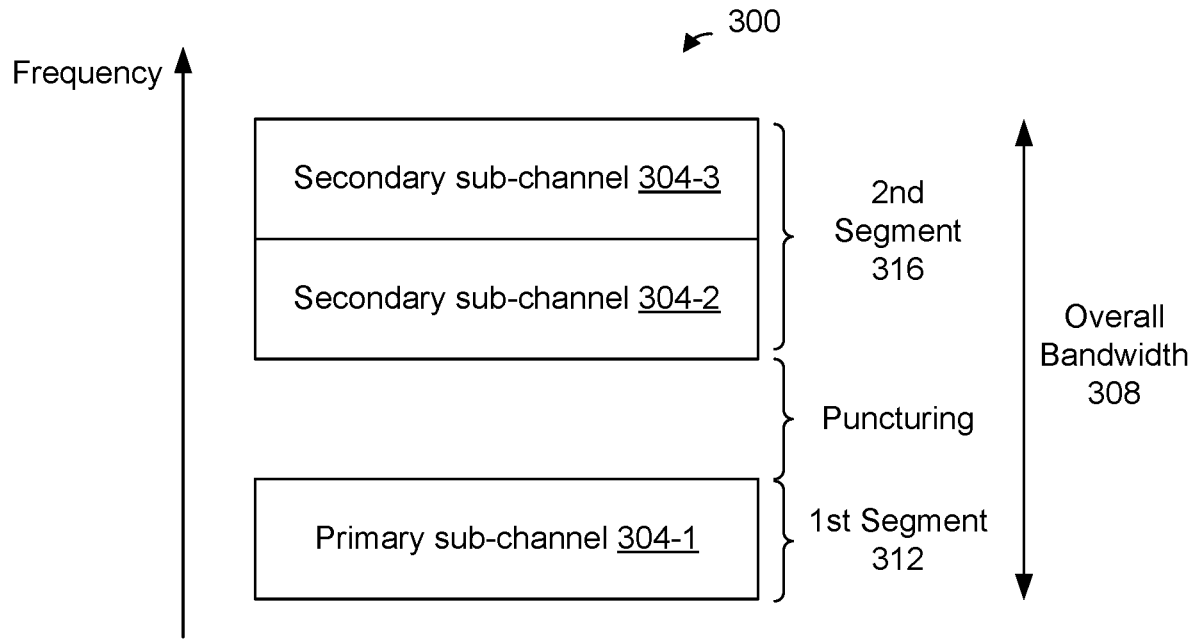
FIG. 3A is a diagram of an example punctured communication channel, according to an embodiment.

FIG. 3A is a diagram of an example punctured operating channel 300, according to an embodiment. The punctured operating channel 300 comprises a plurality of sub-channels 304 that span an overall bandwidth 308. Within the overall bandwidth 308, one of the sub-channels is "punctured", e.g., nothing is transmitted within one of the sub-channels. Although the example punctured operating channel 300 is illustrated as spanning an overall bandwidth corresponding to four sub-channels, other punctured operating channels span overall bandwidths corresponding to other suitable numbers of sub-channels such as eight, sixteen, twenty four, thirty two, etc., according to various embodiments. Although the example punctured operating channel 300 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments. For example, if the communication protocol defines operating channels of 80 MHz and 160 MHz, a punctured operating channel spanning an overall bandwidth of 160 MHz (e.g., eight 20 MHz sub-channels) may have up to three punctured 20 MHz sub-channels, according to an embodiment.

The punctured operating channel 300 includes a first frequency segment 312 and a second frequency segment 316 separated in frequency from the first frequency segment 312 by a gap, which corresponds to the punctured sub-channel.

In some embodiments, one sub-channel (e.g., sub-channel 304-1) within a composite channel is designated as a primary sub-channel, and other sub-channels (e.g., sub-channels 304-2 and 304-3) are designated as secondary sub-channels. A primary sub-channel generally is a common channel of operation for all devices in the WLAN, and secondary sub-channels can be aggregated with the primary channel to form wider composite channels, in some embodiments. In some embodiments, only secondary sub-channels can be punctured, i.e., the primary sub-channel cannot be punctured.

Figure 3B:
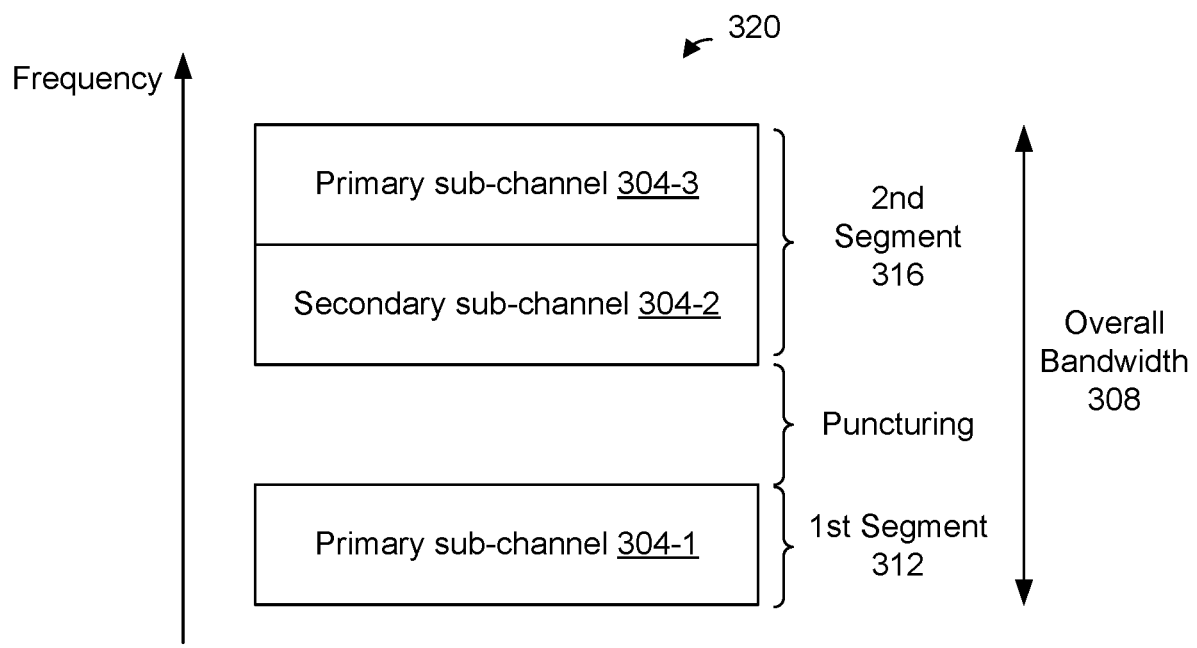
FIG. 3B is a diagram of the example punctured communication channel of FIG. 3A with multiple primary sub-channels, according to another embodiment.

In some embodiments, the first frequency segment 312 and the second frequency segment 316 each include a respective primary channel, such as illustrated in FIG. 3B. In some embodiments in which each frequency segment includes a respective primary sub-channel, only secondary sub-channels can be punctured, i.e., the primary sub-channel cannot be punctured.

Figure 3C:
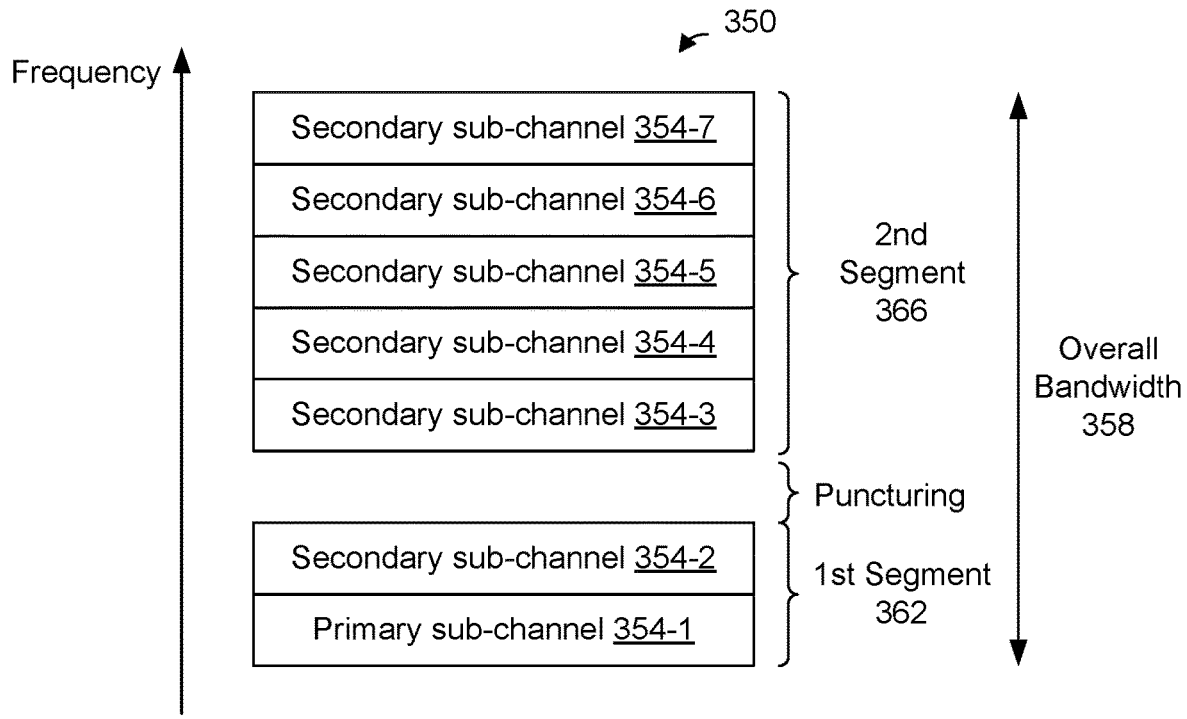
FIG. 3C is a diagram of another example punctured communication channel, according to another embodiment.

FIG. 3C is a diagram of another example punctured operating channel 350, according to an embodiment. The punctured operating channel 350 comprises a plurality of sub-channels 354 that span an overall bandwidth 358. Within the overall bandwidth 358, one of the sub-channels is "punctured", e.g., nothing is transmitted within one of the sub-channels. Although the example punctured operating channel 350 is illustrated as spanning an overall bandwidth corresponding to eight sub-channels, other punctured operating channels span overall bandwidths corresponding to other suitable numbers of sub-channels such as four, sixteen, twenty four, thirty two, etc., according to various embodiments. Although the example punctured operating channel 350 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments.

The punctured operating channel 350 includes a first frequency segment 362 and a second frequency segment 366 separated in frequency from the first frequency segment 362 by a gap, which corresponds to the punctured sub-channel.

In some embodiments, one sub-channel (e.g., sub-channel 354-1) within a composite channel is designated as a primary sub-channel, and other sub-channels (e.g., sub-channels 354-2-354-7) are designated as secondary sub-channels.

In some embodiments, only secondary sub-channels can be punctured, i.e., the primary sub-channel cannot be punctured.

Figure 3D:
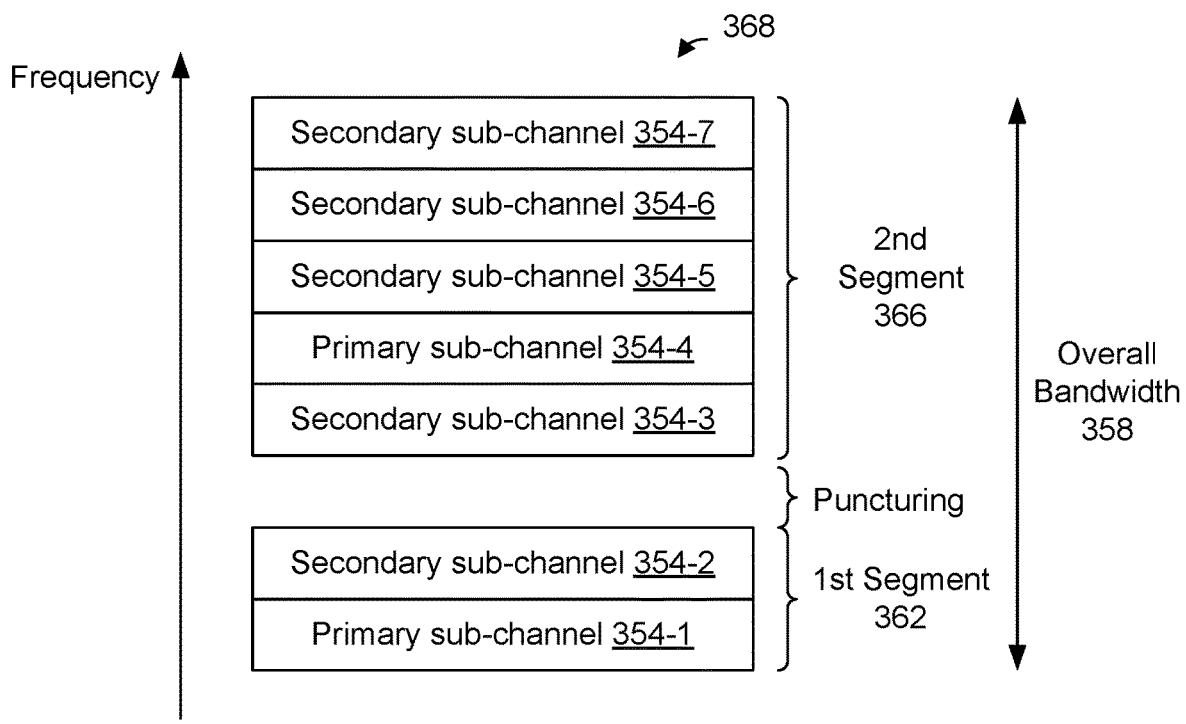
FIG. 3D is a diagram of the example punctured communication channel of FIG. 3C with multiple primary sub-channels, according to another embodiment.

In some embodiments, the first frequency segment 362 and the second frequency segment 366 each include a respective primary channel, such as illustrated in FIG. 3D. In some embodiments in which each frequency segment includes a respective primary sub-channel, only secondary sub-channels can be punctured, i.e., the primary sub-channel cannot be punctured.

Figure 3E:
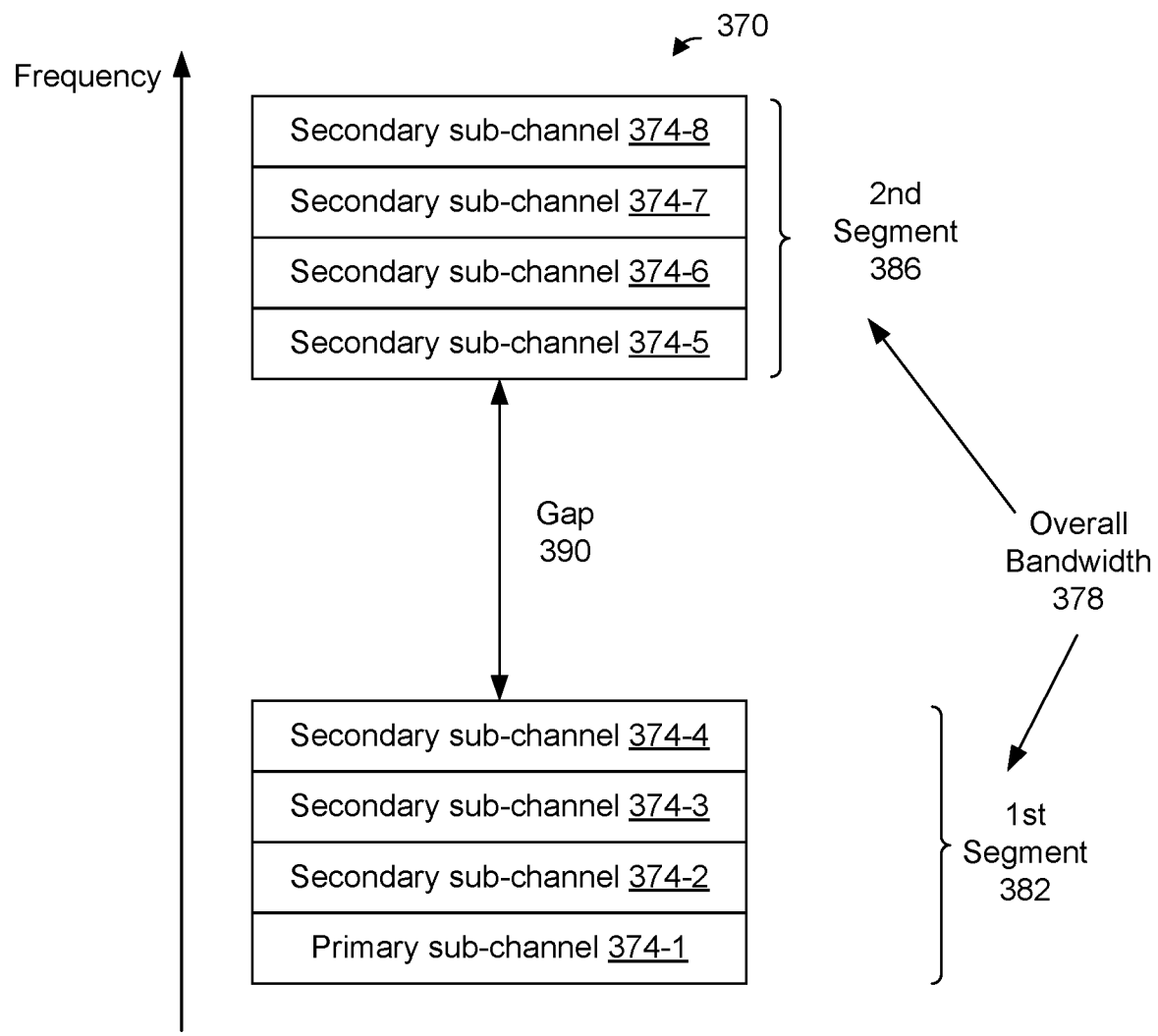
FIG. 3E is a diagram of an example communication channel with sub-channels in multiple RF bands, according to another embodiment.

FIG. 3E is a diagram of another example operating channel 370, according to an embodiment. The operating channel 370 comprises a plurality of sub-channels 374 that span an overall bandwidth 378. The overall bandwidth 378 comprises a first frequency segment 382 and a second frequency segment 386 separated from the first frequency segment 382 by a gap in frequency 390. In an embodiment, the two segments 382 are within a same radio frequency (RF) band. In another embodiment, the segments 382 are in different RF bands. A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel.

Optionally, the first frequency segment 382 and/or the second frequency segment 386 includes one or more punctured sub-channels, e.g., the punctured sub-channel(s) are not used for the operating channel 370.

Although the example operating channel 370 is illustrated as spanning an overall bandwidth 378 corresponding to eight sub-channels, other operating channels span overall bandwidths corresponding to other suitable numbers of sub-channels such as sixteen, twenty four, thirty two, etc., according to various embodiments. Although the first frequency segments 382 and the second frequency segment 386 are illustrated as including a same number of sub-channels, the first frequency segments 382 and the second frequency segment 386 include different numbers of sub-channels in other embodiments.

Figure 3F:
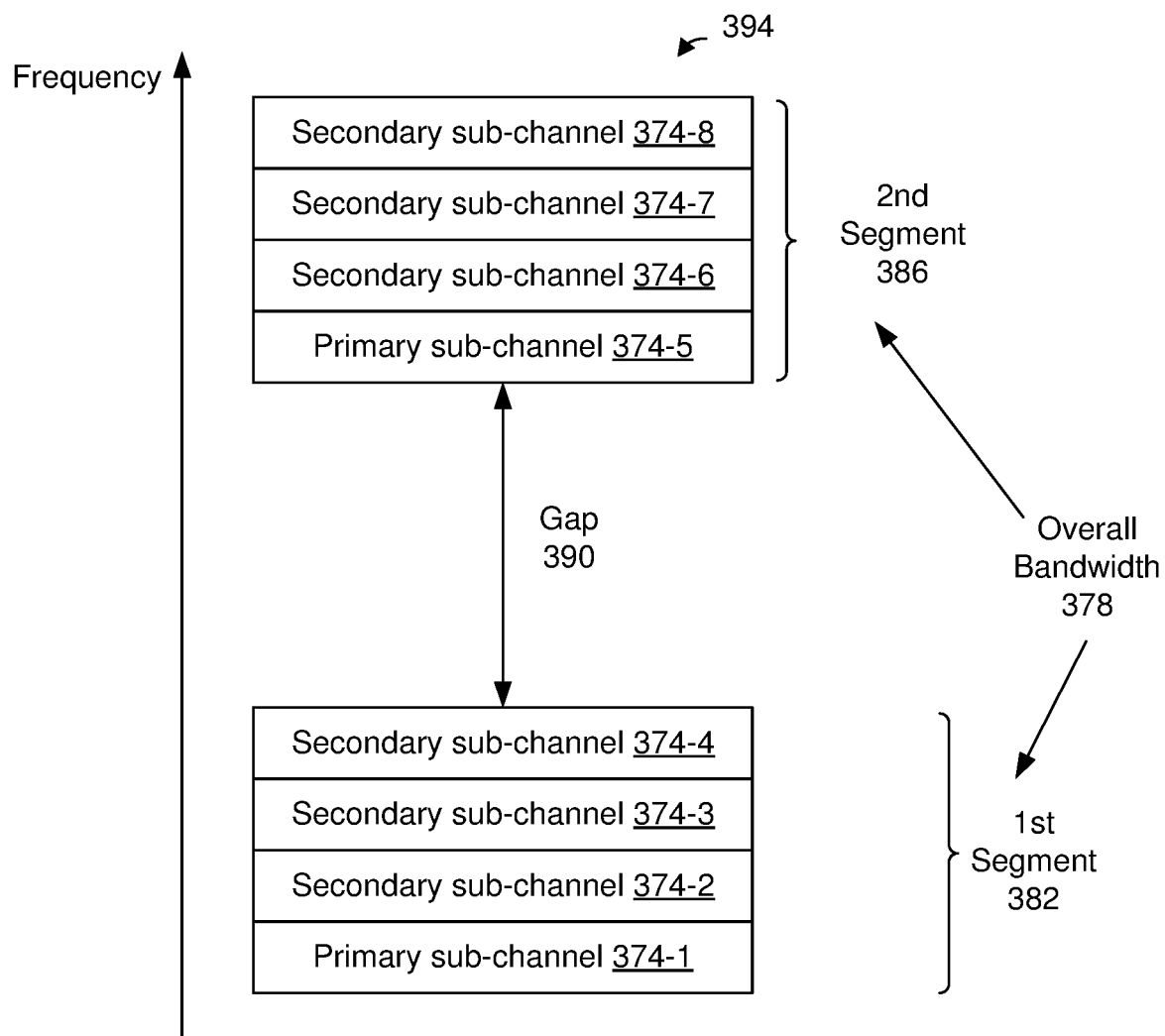
FIG. 3F is a diagram of the example communication channel of FIG. 3E with multiple primary sub-channels, according to another embodiment.

In some embodiments, first frequency segment 382 and the second frequency segment 386 each include a respective primary channel, such as illustrated in FIG. 3F. In some embodiments in which each frequency segment includes a respective primary sub-channel, only secondary sub-channels can be punctured, i.e., the primary sub-channel cannot be punctured.

Each frequency segment of an operating channel such as shown in FIGS. 3A-F comprises at least one sub-channel. In various embodiments, different frequency segments of an operating channel such as shown in FIGS. 3A-F comprise different numbers of sub-channels or the same number of sub-channels.

In some embodiments, one sub-channel (e.g., sub-channel 374-1) within a composite channel is designated as a primary sub-channel, and other sub-channels (e.g., sub-channels 374-2-374-7) are designated as secondary sub-channels. In some embodiments, only secondary sub-channels can be punctured, i.e., the primary sub-channel cannot be punctured.

Although the example operating channel 370 is illustrated as including one primary sub-channel (e.g., sub-channel 374-1) in the first frequency segment 382, another primary channel is also included in the second frequency segment 386, in another embodiment. In some embodiments in which each segment 382 includes a respective primary sub-channel, only secondary sub-channels can be punctured, i.e., none of the primary sub-channels can be punctured.

Although the example operating channel 370 is illustrated as including two segments 382, 386 separated by the gap in frequency 390, other operating channels include three or more segments, where each pair of adjacent segments is separated by a respective gap in frequency, according to other embodiments.

In various embodiments described below, a first communication device simultaneously transmits multiple MAC layer data units to a second communication device via different frequency segments, separated by a gap in frequency, of a communication channel. Illustrative examples of communication channels having different frequency segments separated by a gap in frequency were described above with reference to FIGS. 3A-F, and the first communication device may simultaneously transmit multiple MAC layer data units to the second communication device via such communication channels, as well as other suitable communication channels.

Figure 4A:
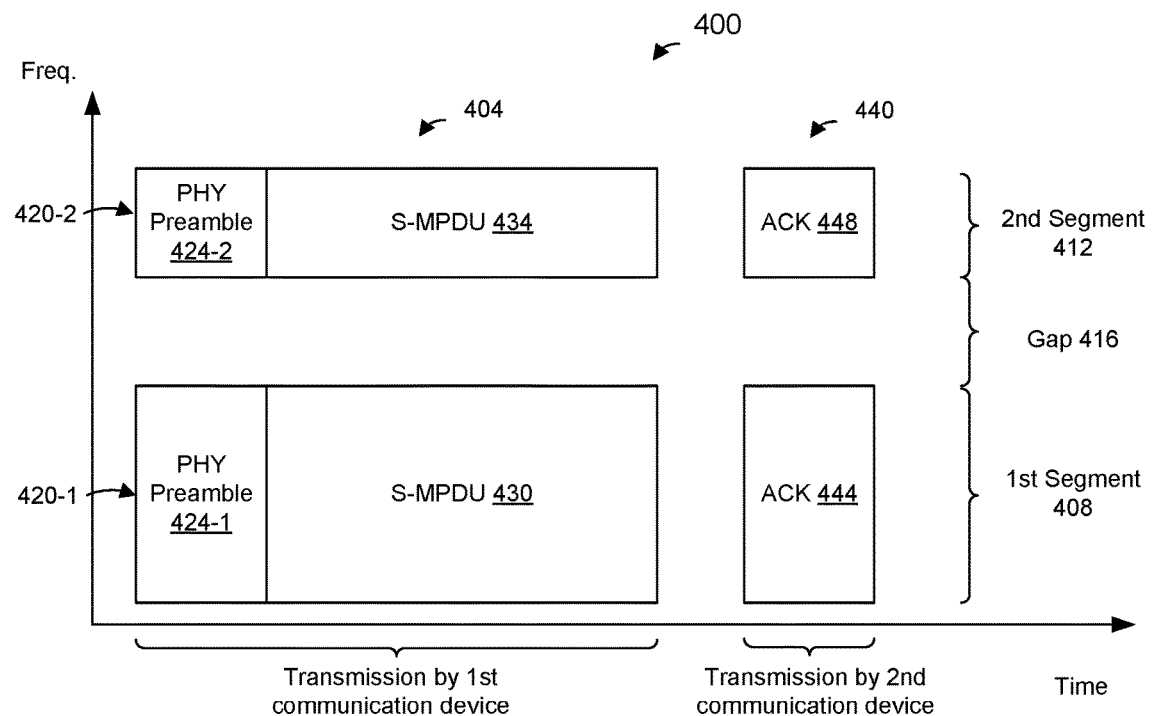
FIG. 4A is a diagram of an example communication exchange in which a first communication device simultaneously transmits multiple media access control (MAC) layer data units to a second communication device in a WLAN, according to an embodiment.

FIG. 4A is a diagram of an example communication exchange 400 between a first communication device and a second communication device in a WLAN, according to an embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

In the communication exchange 400, the first communication device transmits one or more PPDUs 404 via a communication channel that includes a first frequency segment 408 separate and a second frequency segment 412 separated by a gap 416 in frequency. In an embodiment, the first frequency segment 408 and the second frequency segment 412 are within a single RF band, and the gap 416 corresponds to one or more punctured sub-channels. In another embodiment, the first frequency segment 408 is in a first RF band, the second frequency segment 412 is in a second RF band, and the gap 416 corresponds to a gap between the first and second RF bands.

In an embodiment, the one or more PPDUs 404 consists of a single PPDU 404 comprising a first portion 420-1 in the first frequency segment 408 and a second portion 420-2 in the second frequency segment 412. In an embodiment, the single PPDU 404 comprises a multi-user (MU) PPDU configured for orthogonal frequency division multiple access (OFDMA) communication and (optionally) multi-user multiple input, multiple output (MU-MIMO) communication, but the MU PPDU 404 includes data only for the second communication device. In another embodiment in which the single PPDU 404 comprises an MU PPDU, the MU PPDU 404 includes data for one or more other communication devices, e.g., in one or more other frequency segments (not shown) and/or modulated on one or more different spatial streams (not shown).

In another embodiment, the one or more PPDUs 404 comprises a first PPDU 420-1 in the first frequency segment 408 and second PPDU 420-2 in the second frequency segment 412. In an embodiment, the one or more PPDUs 404 include data only for the second communication device. In another embodiment, the one or more PPDUs 404 include a multi-user (MU) PPDU having data for the second communication device and one or more other communication devices. The one or more PPDUs 404 comprise a PHY preamble(s) 424.

The one or more PPDUs 404 further comprise i) a first PHY data portion in the first frequency segment 408, the first PHY data portion having a first single MPDU (S-MPDU) 430, and ii) a second PHY data portion in the second frequency segment 412, the second PHY data portion having a second S-MPDU 434. Each S-MPDU 430, 434 is a MAC layer data unit that includes a respective MPDU delimiter field and a respective MPDU (or a respective portion of an MPDU). In an embodiment, the delimiter field of an S-MPDU includes a length subfield that specifies a number of bits in the MPDU (or the portion of the MPDU) within the S-MPDU.

In response to receiving the S-MPDUs 430, 434, the second communication device generates acknowledgment information and transmits the acknowledgment information to the first communication device in a transmission 440. The transmission 440 includes a first portion 444 in the first frequency segment 408 and a second portion 448 in the second frequency segment 412. In an embodiment, the first portion 444 includes acknowledgment information for data received in the first frequency segment 408 (e.g., the S-MPDU 430), and the second portion 448 includes acknowledgment information for data received in the second frequency segment 412 (e.g., the S-MPDU 434). For example, the second communication device generates a first MAC layer acknowledgment data unit for the data received in the first frequency segment 408 (e.g., the S-MPDU 430), and transmits the first MAC layer acknowledgment data unit in the first frequency segment 408; and the second communication device generates a second MAC layer acknowledgment data unit for the data received in the second frequency segment 412 (e.g., the S-MPDU 434), and transmits the second MAC layer acknowledgment data unit in the second frequency segment 412, according to an embodiment. If the second communication device does not correctly receive the data transmitted in the first frequency segment 408 (e.g., the S-MPDU 430), the second communication device generates a quality of service (QoS) Null frame (or another suitable frame that indicates the data transmitted in the first frequency segment 408 (e.g., the S-MPDU 430) was not correctly received), and transmits the QoS Null frame (or other suitable frame) in the first frequency segment 408; and if the second communication device does not correctly receive the data transmitted in the second frequency segment 412 (e.g., the S-MPDU 434), the second communication device generates a QoS Null frame (or another suitable frame that indicates the data transmitted in the second frequency segment 412 (e.g., the S-MPDU 434) was not correctly received), and transmits the QoS Null frame (or other suitable frame) in the second frequency segment 412, according to an embodiment.

In another embodiment, both the first portion 444 and the second portion 448 include the same acknowledgment information for both data received in the first frequency segment 408 (e.g., the S-MPDU 430), and data received in the second frequency segment 412 (e.g., the S-MPDU 434). For example, the second communication device generates a single MAC layer acknowledgment data unit for both the data received in the first frequency segment 408 (e.g., the S-MPDU 430), and for the data received in the second frequency segment 412 (e.g., the S-MPDU 434); and the second communication device then transmits the single MAC layer acknowledgment data unit in the first frequency segment 408, and transmits a duplicate of the single MAC layer acknowledgment data unit in the second frequency segment 412, according to an embodiment.

In another embodiment, acknowledgment information for both i) data received in the first frequency segment 408 (e.g., the S-MPDU 430), and ii) data received in the second frequency segment 412 (e.g., the S-MPDU 434), is included in a single MAC layer acknowledgment data unit that is transmitted across both the first frequency segment 408 the second frequency segment 412. For example, the second communication device generates a single MAC layer acknowledgment data unit for both the data received in the first frequency segment 408 (e.g., the S-MPDU 430), and for the data received in the second frequency segment 412 (e.g., the S-MPDU 434); and the second communication device then transmits the single MAC layer acknowledgment data unit in a single PPDU that spans both the first frequency segment 408 and the second frequency segment 412, according to an embodiment.

In one embodiment, the first communication device partitions one MPDU into a plurality of fragments, and includes each fragment in a respective S-MPDU 430, 434. For example, referring to FIG. 4B, an MPDU 450 is partitioned into two portions 454. The first portion 454-1 is included in the S-MPDU 430, and the second portion 454-2 is included in the S-MPDU 434. The S-MPDU 430 includes a delimiter field 460 having a length subfield 464 that indicates a number of bits in the first portion 454-1. The S-MPDU 434 includes a delimiter field 470 having a length subfield 474 that indicates a number of bits in the second portion 454-2.

In another embodiment, the first communication device includes respective MPDUs in respective S-MPDUs 430, 434. For example, referring to FIG. 4C, a first MPDU 480 is included in the S-MPDU 430, and a second MPDU 484 is included in the S-MPDU 434. The S-MPDU 430 includes a delimiter field 486 having a length subfield 488 that indicates a number of bits in the first MPDU 480. The S-MPDU 434 includes a delimiter field 490 having a length subfield 492 that indicates a number of bits in the second MPDU 484.

Figure 4B:
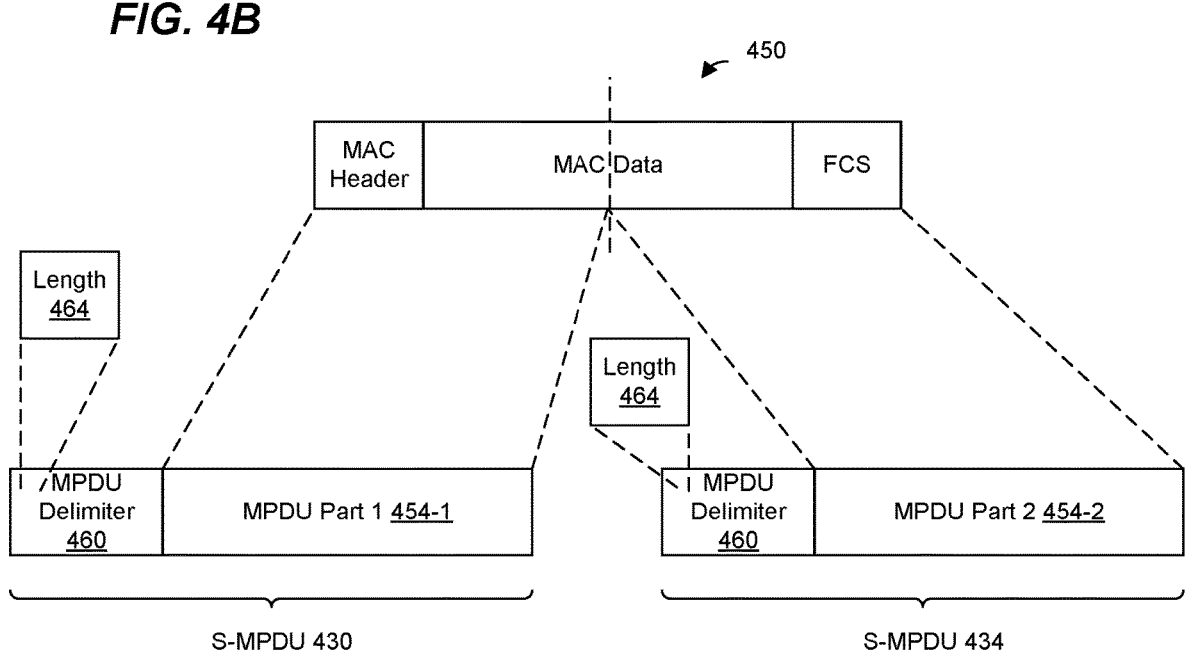
FIG. 4B is a diagram of first and second MAC layer data units that are simultaneously transmitted in a WLAN, according to an embodiment.
Figure 4C:
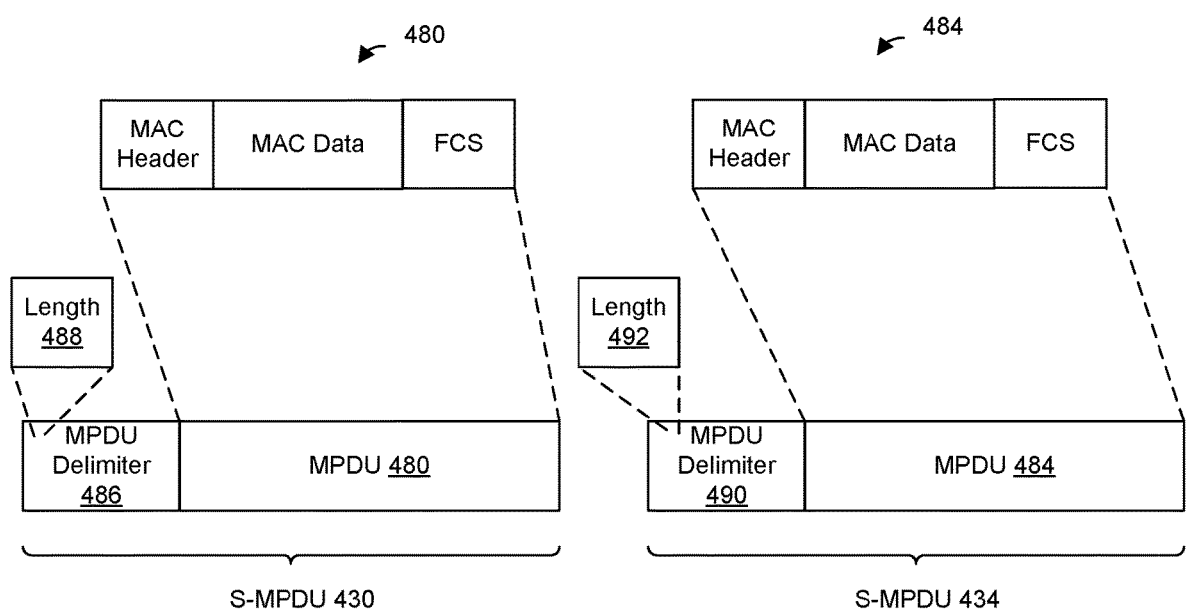
FIG. 4C is a diagram of first and second MAC layer data units that are simultaneously transmitted in a WLAN, according to another embodiment.

Referring now to FIGS. 4A and 4C, the first communication device selects MPDUs for simultaneous transmission in the communication exchange 400 to ensure that the MPDU 480 and the MPDU 484 have different TID values, according to an embodiment. For example, if the MPDU 480 and MPDU 484 correspond to the same TID, the MPDU 480 and the MPDU 484 may correspond to a single stream will need to be ordered at the second communication device, which increases complexity of the protocol and/or the second communication device. Thus, by requiring that the MPDU 480 and the MPDU 484 have different TID values, complexity is reduced. In an embodiment, the MPDUs 480, 484 are a same MPDU for the purpose of robust transmission and/or for decreasing delay.

In another embodiment, the first communication device selects MPDUs for simultaneous transmission in the communication exchange 400 to ensure that the MPDU 480 and the MPDU 484 have the same TID value. In another embodiment, the second communication device does not ensure that the MPDU 480 and the MPDU 484 have the same TID value, or that that the MPDU 480 and the MPDU 484 have different TID values, i.e., the selection of MPDUs for simultaneous transmission in the communication exchange 400 is not based on whether the MPDU 480 and the MPDU 484 have the same TID value or whether the MPDU 480 and the MPDU 484 have different TID values.

Although FIGS. 4A-C illustrate the transmission of S-MPDUs 430, 434, in other embodiments the first communication device transmits other suitable MAC layer data units that include a respective MPDU delimiter field and a respective MPDU (or a respective portion of an MPDU), where the delimiter field includes a length subfield that specifies a number of bits in the MPDU (or the portion of the MPDU) within the MAC layer data unit.

Figure 4D:
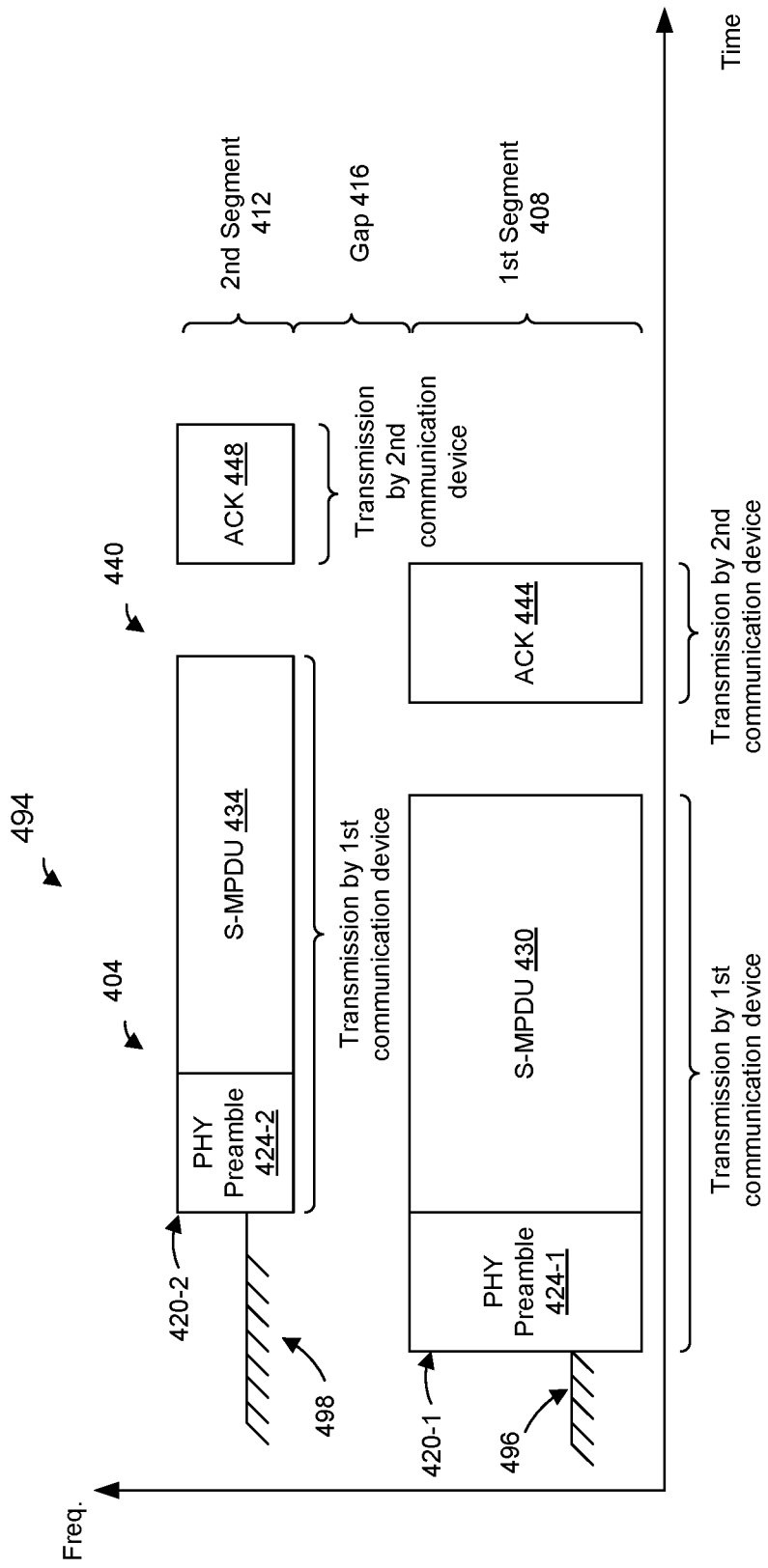
FIG. 4D is a diagram of another example communication exchange in which a first communication device simultaneously transmits multiple MAC layer data units to a second communication device in a WLAN, according to another embodiment.

Although FIG. 4A illustrates the simultaneous transmissions 420 beginning at a same time, in other embodiments, the simultaneous transmissions 420 begin at different times. For example, FIG. 4D illustrates an example communication exchange 400 in which the simultaneous transmissions 420 begin at different times. Referring to FIGS. 1A and 1B, the MAC processor 126 maintains separate backoff counters (e.g., each link-specific MAC processor 198 maintains a respective backoff counter) for the first frequency segment 408 and the second frequency segment 412, according to an embodiment. In the example illustrated in FIG. 4D, a backoff procedure 496 (implemented using a first backoff counter corresponding to the first frequency segment 408) corresponding to the first frequency segment 408 ends prior to a backoff procedure 498 (implemented using a second backoff counter corresponding to the second frequency segment 412) corresponding to the second frequency segment 412. This may occur, for example, if the first communication device only used the second frequency segment 412 in a previous transmission, in which case the first backoff counter corresponding to the first frequency segment 408 continued decrementing during the previous transmission in the second frequency segment 412. As another example, this may occur if the second communication device (or a third communication device) only used the second frequency segment 412 in a previous transmission, in which case the first backoff counter corresponding to the first frequency segment 408 continued decrementing during the previous transmission in the second frequency segment 412. Contents of the S-MPDU 430 and the S-MPDU 434 are fragments of a single MPDU (such as discussed with respect to FIG. 4B), are different MPDUs (such as discussed with respect to FIG. 4C), or a same MPDU, in various embodiments.

Thus, simultaneous transmissions, such as the simultaneous transmissions 420 of FIGS. 4A and 4D, overlap in time, but may begin at a same time, may begin at different times, may end at a same time, and/or may end different times.

Figure 5:
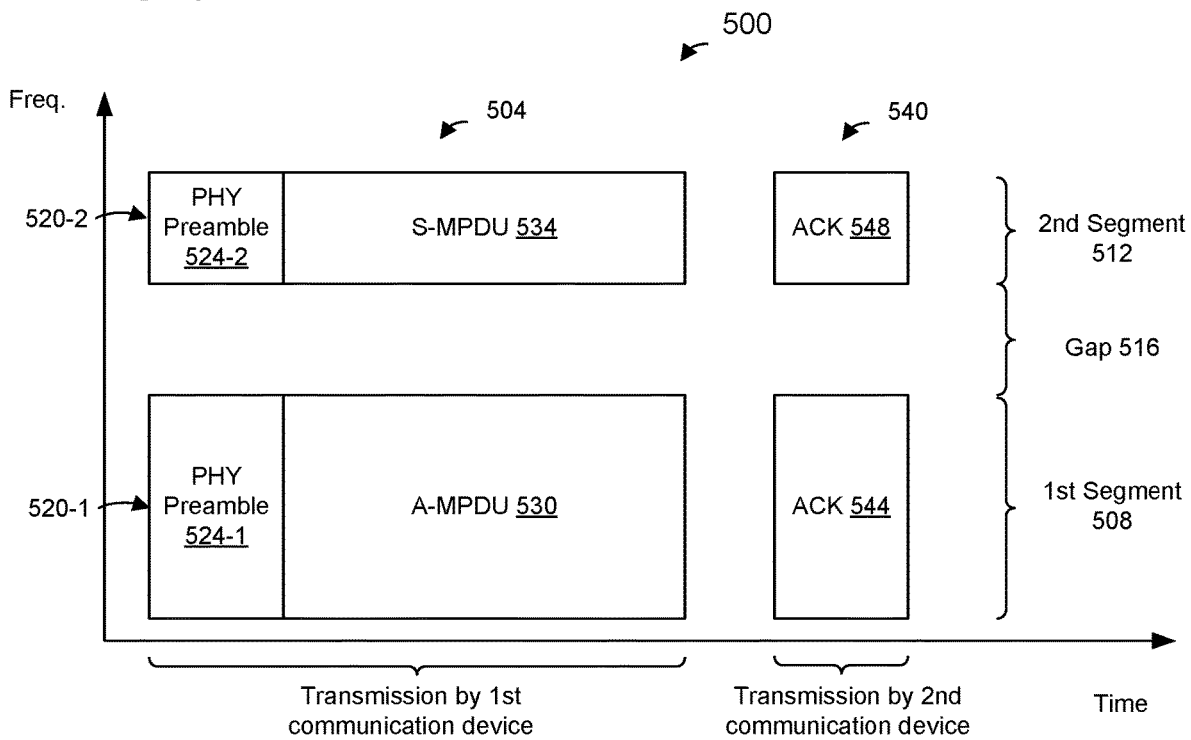
FIG. 5 is a diagram of another example communication exchange in which a first communication device simultaneously transmits multiple MAC layer data units to a second communication device in a WLAN, according to another embodiment.

FIG. 5 is a diagram of another example communication exchange 500 between a first communication device and a second communication device in a WLAN, according to an embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

In the communication exchange 500, the first communication device transmits one or more PPDUs 504 via a communication channel that includes a first frequency segment 508 separate and a second frequency segment 512 separated by a gap 516 in frequency. In an embodiment, the first frequency segment 508 and the second frequency segment 512 are within a single RF band, and the gap 516 corresponds to one or more punctured sub-channels. In another embodiment, the first frequency segment 508 is in a first RF band, and the second frequency segment 512 is in a second RF band.

In an embodiment, the one or more PPDUs 504 consist of a single PPDU 504 comprising a first portion 520-1 in the first frequency segment 508 and a second portion 520-2 in the second frequency segment 512. In an embodiment, the single PPDU 504 comprises an MU PPDU configured for OFDMA communication and (optionally) MU-MIMO communication, but the MU PPDU 504 includes data only for the second communication device. In another embodiment in which the single PPDU 504 comprises an MU PPDU, the MU PPDU 504 includes data for one or more other communication devices, e.g., in one or more other frequency segments (not shown) and/or modulated on one or more different spatial streams (not shown).

In another embodiment, the one or more PPDUs 504 comprises a first PPDU 520-1 in the first frequency segment 508 and a second PPDU 520-2 in the second frequency segment 512. In an embodiment, the one or more PPDUs 504 include data only for the second communication device. In another embodiment, the one or more PPDUs 504 include an MU PPDU having data for the second communication device and one or more other communication devices. The one or more PPDUs 504 include a PHY preamble(s) 524.

The one or more PPDUs 504 further comprise i) a first PHY data portion in the first frequency segment 508, the first PHY data portion having an aggregate MPDU (A-MPDU) 530, and ii) a second PHY data portion in the second frequency segment 512, the second PHY data portion having an S-MPDU 534. The A-MPDU 530 is a MAC layer data unit that includes multiple MPDUs. The S-MPDU 534 is a MAC layer data unit that includes an MPDU delimiter field and an MPDU (or a portion of an MPDU). In an embodiment, the delimiter field of an S-MPDU includes a length subfield that specifies a number of bits in the MPDU (or the portion of the MPDU) within the S-MPDU. In an embodiment, the S-MPDU 534 has a structure the same as or similar to the S-MPDUs 430, 434 described with reference to FIGS. 4B and 4C.

In response to receiving the A-MPDU 530 and the S-MPDU 534, the second communication device generates acknowledgment information and transmits the acknowledgment information to the first communication device in a transmission 540. The transmission 540 includes a first portion 544 in the first frequency segment 508 and a second portion 548 in the second frequency segment 512. In an embodiment, the first portion 544 includes acknowledgment information for data received in the first frequency segment 508 (e.g., the A-MPDU 530), and the second portion 548 includes acknowledgment information for data received in the second frequency segment 512 (e.g., the S-MPDU 534). For example, the second communication device generates a first MAC layer acknowledgment data unit for the data received in the first frequency segment 508 (e.g., the A-MPDU 530), and transmits the first MAC layer acknowledgment data unit in the first frequency segment 508; and the second communication device generates a second MAC layer acknowledgment data unit for the data received in the second frequency segment 512 (e.g., the S-MPDU 534), and transmits the second MAC layer acknowledgment data unit in the second frequency segment 512, according to an embodiment. If the second communication device does not correctly receive the data transmitted in the second frequency segment 512 (e.g., the S-MPDU 534), the second communication device generates a QoS Null frame (or another suitable frame that indicates the data transmitted in the second frequency segment 512 (e.g., the S-MPDU 534) was not correctly received), and transmits the QoS Null frame (or other suitable frame) in the second frequency segment 512, according to an embodiment.

In another embodiment, both the first portion 544 and the second portion 548 include the same acknowledgment information for both data received in the first frequency segment 508 (e.g., the A-MPDU 530), and data received in the second frequency segment 512 (e.g., the S-MPDU 534). For example, the second communication device generates a single MAC layer acknowledgment data unit for both the data received in the first frequency segment 508 (e.g., the A-MPDU 530), and for the data received in the second frequency segment 512 (e.g., the S-MPDU 534); and the second communication device then transmits the single MAC layer acknowledgment data unit in the first frequency segment 508, and transmits a duplicate of the single MAC layer acknowledgment data unit in the second frequency segment 512, according to an embodiment.

In another embodiment, acknowledgment information for both i) data received in the first frequency segment 508 (e.g., the A-MPDU 530), and ii) data received in the second frequency segment 512 (e.g., the S-MPDU 534), is included in a single MAC layer acknowledgment data unit that is transmitted across both the first frequency segment 508 the second frequency segment 512. For example, the second communication device generates a single MAC layer acknowledgment data unit for both the data received in the first frequency segment 508 (e.g., the A-MPDU 530), and for the data received in the second frequency segment 512 (e.g., the S-MPDU 534); and the second communication device then transmits the single MAC layer acknowledgment data unit in a single PPDU that spans both the first frequency segment 508 and the second frequency segment 512, according to an embodiment.

The first communication device selects MPDUs for simultaneous transmission in the communication exchange 500 to ensure that the TID of the MPDU in the S-MPDU 534 is different than the TIDs of any MPDUs in the A-MPDU 530. In another embodiment, the first communication device selects MPDUs for simultaneous transmission in the communication exchange 500 to ensure that the TID of the MPDU in the S-MPDU 534 is the same as the TID of at least one MPDU in the A-MPDU 530. In another embodiment, the first communication device selects MPDUs for simultaneous transmission in the communication exchange 500 to ensure that the TIDs of the MPDU in the S-MPDU 534 all of the MPDUs in the A-MPDU 530 are the same. In another embodiment, the second communication device does not ensure that TIDs of the MPDU in the S-MPDU 534 and the MPDUs in the A-MPDU 530 have the same TID value or different TID values, i.e., the selection of MPDUs for simultaneous transmission in the communication exchange 500 is not based on whether TIDs of the MPDU in the S-MPDU 534 and the MPDUs in the A-MPDU 530 have the same TID value or different TID values.

In some embodiments, the S-MPDU 534 and the A-MPDU 530 are generated according to a single BA agreement. For example, the single BA agreement specifies one or more of: a maximum number of MPDUs with a same TID that can be handled by the second communication device during the BA session, a buffer size of the second communication device for storing MPDUs transmitted by the first communication device during the BA session and having the same TID, etc.

Although FIG. 5 illustrates the simultaneous transmissions 520 beginning at a same time, in other embodiments, the transmissions 520 begin at different times (similar to the discussion with respect to FIG. 4D). Thus, simultaneous transmissions, such as the simultaneous transmissions 520 of FIG. 5, overlap in time, but may begin at a same time, may begin at different times, may end at a same time, and/or may end different times.

Figure 6:
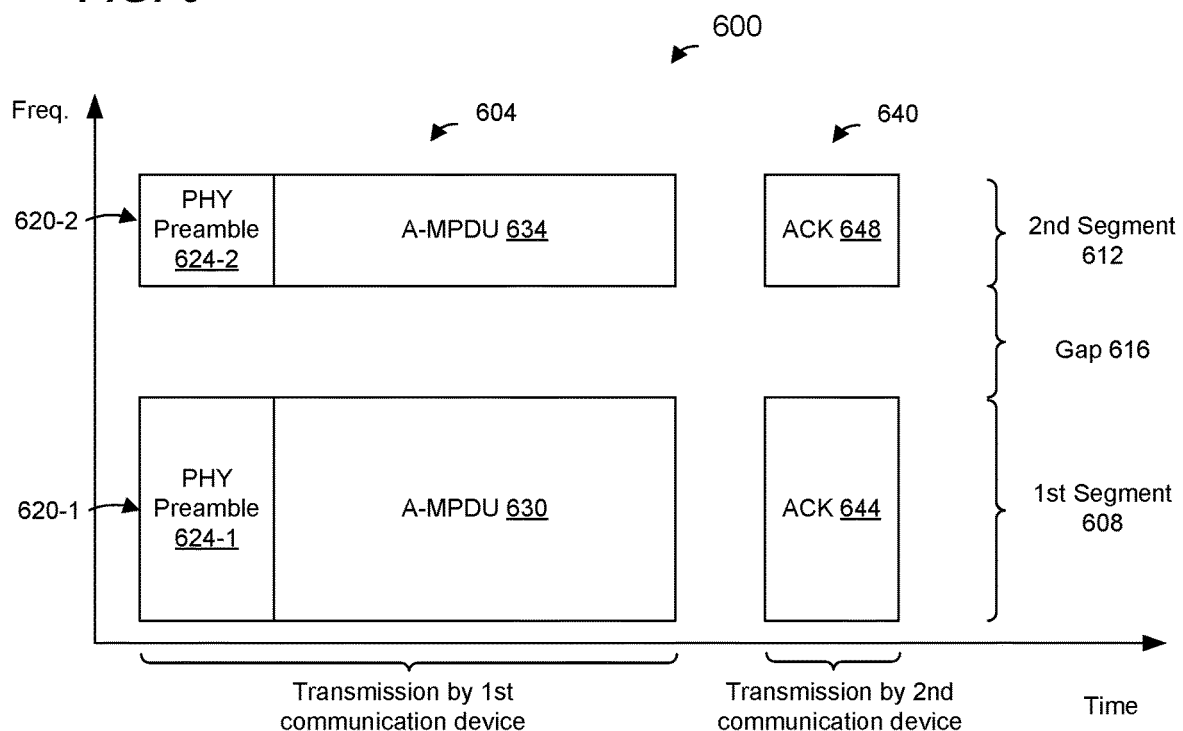
FIG. 6 is a diagram of another example communication exchange in which a first communication device simultaneously transmits multiple MAC layer data units to a second communication device in a WLAN, according to another embodiment.

FIG. 6 is a diagram of another example communication exchange 600 between a first communication device and a second communication device in a WLAN, according to an embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

In the communication exchange 600, the first communication device transmits one or more PPDUs 604 via a communication channel that includes a first frequency segment 608 separate and a second frequency segment 612 separated by a gap 616 in frequency. In an embodiment, the first frequency segment 608 and the second frequency segment 612 are within a single RF band, and the gap 616 corresponds to one or more punctured sub-channels. In another embodiment, the first frequency segment 608 is in a first RF band, the second frequency segment 612 is in a second RF band, and the gap 616 corresponds to a gap between the first and second RF bands.

In an embodiment, the one or more PPDUs 604 consist of a single PPDU 604 comprising a first portion 620-1 in the first frequency segment 608 and a second portion 620-2 in the second frequency segment 612. In an embodiment, the single PPDU 604 comprises an MU PPDU configured for OFDMA communication and (optionally) MU-MIMO communication, but the MU PPDU 604 includes data only for the second communication device. In another embodiment in which the single PPDU 604 comprises an MU PPDU, the MU PPDU 604 includes data for one or more other communication devices, e.g., in one or more other frequency segments (not shown) and/or modulated on one or more different spatial streams (not shown).

In another embodiment, the one or more PPDUs 604 comprises a first PPDU 620-1 in the first frequency segment 608 and a second PPDU 620-2 in the second frequency segment 612. In an embodiment, the one or more PPDUs 604 include data only for the second communication device. In another embodiment, the one or more PPDUs 604 include an MU PPDU having data for the second communication device and one or more other communication devices.

The one or more PPDUs 604 include a PHY preamble(s) 624.

The one or more PPDUs 604 further comprise i) a first PHY data portion in the first frequency segment 608, the first PHY data portion having a first aggregate MPDU (A-MPDU) 630, and ii) a second PHY data portion in the second frequency segment 612, the second PHY data portion having a second A-MPDU 634. The first A-MPDU 630 is a MAC layer data unit that includes multiple MPDUs, and the second A-MPDU 634 is a MAC layer data unit that includes multiple MPDUs.

In response to receiving the first A-MPDU 630 and the second A-MPDU 634, the second communication device generates acknowledgment information and transmits the acknowledgment information to the first communication device in a transmission 640. The transmission 640 includes a first portion 644 in the first frequency segment 608 and a second portion 648 in the second frequency segment 612. In an embodiment, the first portion 644 includes acknowledgment information for data received in the first frequency segment 608 (e.g., the first A-MPDU 630), and the second portion 648 includes acknowledgment information for data received in the second frequency segment 612 (e.g., the second A-MPDU 634). For example, the second communication device generates a first MAC layer acknowledgment data unit for the data received in the first frequency segment 608 (e.g., the first A-MPDU 630), and transmits the first MAC layer acknowledgment data unit in the first frequency segment 608; and the second communication device generates a second MAC layer acknowledgment data unit for the data received in the second frequency segment 612 (e.g., the second A-MPDU 634), and transmits the second MAC layer acknowledgment data unit in the second frequency segment 612, according to an embodiment.

In another embodiment, both the first portion 644 and the second portion 648 include the same acknowledgment information for both data received in the first frequency segment 608 (e.g., the first A-MPDU 630), and data received in the second frequency segment 512 (e.g., the second A-MPDU 634). For example, the second communication device generates a single MAC layer acknowledgment data unit for both the data received in the first frequency segment 608 (e.g., the first A-MPDU 630), and for the data received in the second frequency segment 612 (e.g., the second A-MPDU 634); and the second communication device then transmits the single MAC layer acknowledgment data unit in the first frequency segment 608, and transmits a duplicate of the single MAC layer acknowledgment data unit in the second frequency segment 612, according to an embodiment.

In another embodiment, acknowledgment information for both i) data received in the first frequency segment 608 (e.g., the first A-MPDU 630), and ii) data received in the second frequency segment 612 (e.g., the second A-MPDU 634), is included in a single MAC layer acknowledgment data unit that is transmitted across both the first frequency segment 608 the second frequency segment 612. For example, the second communication device generates a single MAC layer acknowledgment data unit for both the data received in the first frequency segment 608 (e.g., the first A-MPDU 630), and for the data received in the second frequency segment 612 (e.g., the second A-MPDU 634); and the second communication device then transmits the single MAC layer acknowledgment data unit in a single PPDU that spans both the first frequency segment 608 and the second frequency segment 612, according to an embodiment.

The first communication device selects MPDUs for simultaneous transmission in the communication exchange 600 to ensure that a total number of different TID values of MPDUs in both the A-MPDU 630 and the A-MPDU 634 is less than or equal to a total number of TID values in a single transmission that the second communication device is capable of handling. For example, prior to the communication exchange 600, the second communication device transmits capability information that includes a parameter specifying the total number of TID values in a single transmission that the second communication device is capable of handling, and the first communication device uses the value of the parameter to select MPDUs to be included in the one or more PPDUs 604.

In an embodiment, at least some MPDUs in the A-MPDU 630 and the A-MPDU 634 are associated with a block acknowledgment (BA) session set up by the first communication device and the second communication device, and the first communication device selects MPDUs for simultaneous transmission in the communication exchange 600 to ensure that a total number of MPDUs with a same TID value in both the A-MPDU 630 and the A-MPDU 634 is less than or equal to a maximum number of MPDUs with a same TID that the second communication device is capable of handling in the BA session. For example, prior to the communication exchange 600, the first communication device and the second communication device set up the BA session, which includes the second communication device transmitting to the first communication device (e.g., in an add block acknowledgment (ADDBA) Response frame or another suitable MAC layer data unit) a parameter specifying a maximum number of MPDUs with a same TID that can be handled by the second communication device during the BA session, and the first communication device uses the value of the parameter to select MPDUs to be included in the one or more PPDUs 604. In an embodiment, the first communication device negotiates and/or sets up a single BA agreement with the second communication device, where the single BA agreement is applied to multiple channel frequency segments (e.g., such as discussed with reference to FIGS. 3A-F). In an embodiment, the first communication device negotiates and/or sets up a single BA agreement with the second communication device, where the single BA agreement is applied to multiple channel frequency segments, and where each channel segment includes a respective primary channel, and a respective backoff counter is used for each channel frequency segment (e.g., such as discussed with reference to FIGS. 3B, D, and F).

In another embodiment, prior to the communication exchange 600, the first communication device and the second communication device set up the BA session, which includes the second communication device transmitting to the first communication device (e.g., in an ADDBA Response frame or another suitable MAC layer data unit) a parameter specifying a maximum number of MPDUs with a same TID in a single A-MPDU that can be handled by the second communication device during the BA session, and the first communication device uses the value of the parameter to select MPDUs to be included in the one or more PPDUs 604. For example, the first communication device selects MPDUs for simultaneous transmission in the communication exchange 600 to ensure that a total number of MPDUs with the same TID value in the A-MPDU 630 is less than or equal to the maximum number specified by the parameter, and to ensure that a total number of MPDUs with the same TID value in the A-MPDU 634 is less than or equal to the maximum number specified by the parameter.

The second communication device communicates to the first communication device a parameter that specifies a minimum spacing between the starts of two adjacent MPDUs within an A-MPDU (referred to by the IEEE 802.11 Standard as the "Minimum MPDU Start Spacing" parameter) to ensure that the second communication device has enough time to process each MPDU within the A-MPDU. However, when the first communication device simultaneously transmits multiple MAC layer data units to the second communication device using techniques such as discussed above, the minimum spacing between the starts of two adjacent MPDUs may not provide sufficient time for the second communication device to properly process each MPDU within the transmission.

Thus, in another embodiment, prior to the communication exchange 600, the second communication device transmits to the first communication device a new parameter that specifies a minimum spacing between the starts of two adjacent MPDUs within an A-MPDU in the context of transmissions such as described with reference to FIGS. 5 and 6, or an update to the Minimum MPDU Start Spacing parameter previously communicated to the first communication device, where the new/updated parameter provides the second communication device with increased time to process each MPDU; and the first communication device uses the value of the new/updated parameter to generate A-MPDU(s) 530, 630, 634 to have a spacing between starts of MPDUs in the A-MPDU(s) 530, 630, 634 that is greater than or equal to the value indicated by the new/updated parameter.

In an embodiment, all of the MPDUs in the A-MPDU 630 and the MPDUs in A-MPDU 634 have same TID. In another embodiment, the first communication device selects MPDUs for simultaneous transmission in the communication exchange 600 to ensure that all of the TID values of all MPDUs in the A-MPDU 630 are different than all of the TID values of all MPDUs in the A-MPDU 634, unless all MPDUs in both the A-MPDU 630 and the A-MPDU 634 have the same TID value. In another embodiment, MPDUs having the same TID value are permitted in both the A-MPDU 630 and the A-MPDU 634 even if all MPDUs in both the A-MPDU 630 and the A-MPDU 634 do not have the same TID value.

In some embodiments, the A-MPDU 634 and the A-MPDU 630 are generated according to a single BA agreement. For example, the single BA agreement specifies one or more of: a maximum number of MPDUs with a same TID that can be handled by the second communication device during the BA session, a buffer size of the second communication device for storing MPDUs transmitted by the first communication device during the BA session and having the same TID, etc.

Although FIG. 6 illustrates the transmissions 620 beginning at a same time, in other embodiments, the transmissions 620 begin at different times (similar to the discussion with respect to FIG. 4D). Thus, simultaneous transmissions, such as the simultaneous transmissions 620 of FIG. 6, overlap in time, but may begin at a same time, may begin at different times, may end at a same time, and/or may end different times.

Referring now to FIGS. 3A-F, 4A, 4D, 5, and 6, although communication channels comprising two frequency segments separated by a gap were discussed for explanatory purposes, in other embodiments three or more MAC data units are simultaneously transmitted via three or more frequency segments separated by two or more gaps in frequency.

Figure 7:
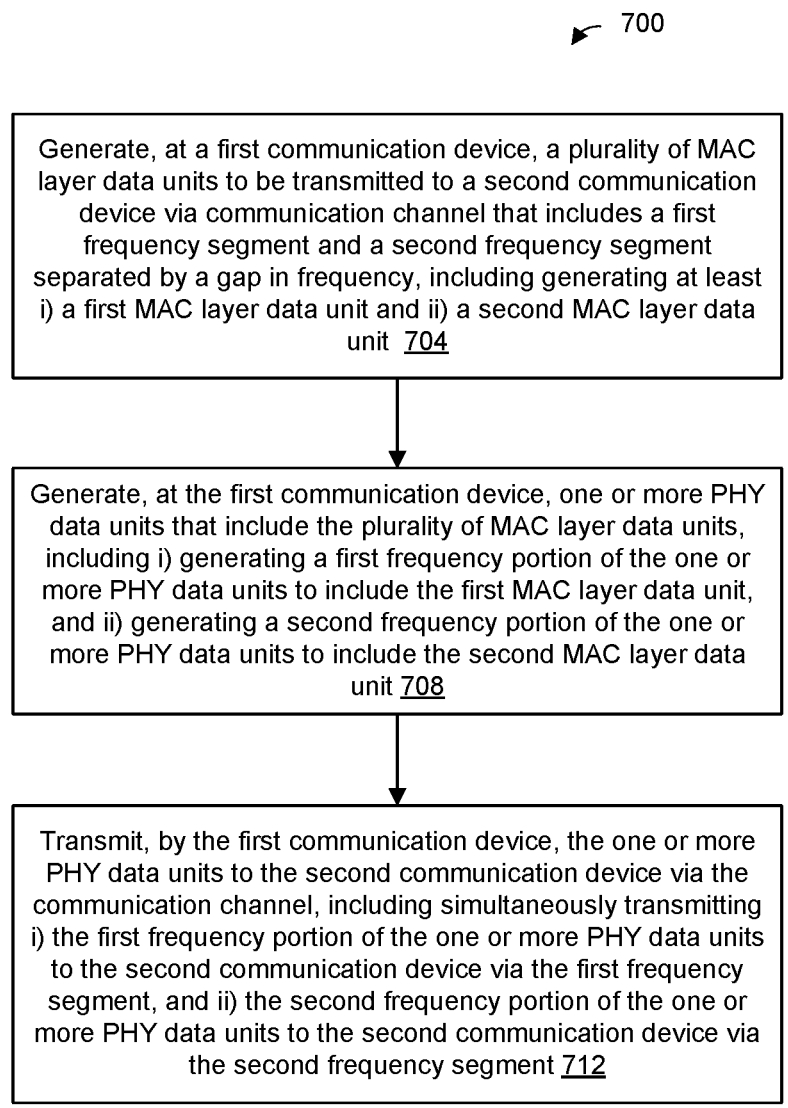
FIG. 7 is a flow diagram of an example method for transmitting data in a wireless communication network, according to another embodiment.

FIG. 7 is a flow diagram of an example method 700 for transmitting data in a wireless communication network, according to an embodiment. The method 700 is implemented in the WLAN 110 of FIG. 1, in an embodiment. In other embodiments, however, the method 700 is implemented in another suitable WLAN different than the WLAN 110.

In various embodiments, the method 700 is implemented with communication channels and/or MAC layer data units such as described with reference to FIGS. 3A-F, 4A-D, 5, and 6. In other embodiments, however, the method 700 is implemented with suitable communication channels and/or suitable MAC layer data units different than those described with reference to FIGS. 3A-F, 4A-D, 5, and 6.

In an embodiment, the network interface device 122 is configured to implement the method 700. In another embodiment, the network interface device 162 is configured to implement the method 700. In other embodiments, the method 700 is implemented by another suitable communication device, such as another suitable WLAN network interface device.

At block 704, a first communication device generates (e.g., the MAC processor 126 generates, the MAC processor 166 generates, etc.) a plurality of MAC layer data units to be transmitted to a second communication device via a communication channel that includes a first frequency segment and a second frequency segment separated from the first frequency segment by a gap in frequency. In an embodiment, the gap in frequency is not used for the communication channel Block 704 includes generating at least i) a first MAC layer data unit and ii) a second MAC layer data unit.

At block 708, the first communication device generates (e.g., the PHY processor 130 generates, the PHY processor 170 generates, etc.) one or more PHY data units that include the plurality of MAC layer data units. Block 708 includes i) generating a first frequency portion of the one or more PHY data units to include the first MAC layer data unit, and ii) generating a second frequency portion of the one or more PHY data units to include the second MAC layer data unit.

In another embodiment, the method 700 includes selecting (e.g., the MAC processor 126 selecting, the MAC processor 166 selecting, the multi-frame transmission controller 142/192 selecting, etc.) the first MAC layer data unit and the second MAC layer data unit for inclusion in the first frequency portion and the second frequency portion, respectively.

In another embodiment, generating the plurality of MAC layer data units at block 704 comprises: generating, at the first communication device, (e.g., the MAC processor 126 generates, the MAC processor 166 generates, etc.) a third MAC layer data unit; partitioning, at the first communication device, the third MAC layer data unit into at least a first fragment and a second fragment; generating, at the first communication device, (e.g., the MAC processor 126 generates, the MAC processor 166 generates, etc.) the first MAC layer data unit to include the first fragment of the third MAC layer data unit; and generating, at the first communication device, (e.g., the MAC processor 126 generates, the MAC processor 166 generates, etc.) the second MAC layer data unit to include the second fragment of the third MAC layer data unit. In an embodiment, generating the first MAC layer data unit includes: appending (e.g., the MAC processor 126 appends, the MAC processor 166 appends, etc.) a first MAC layer delimiter to the first fragment of the third MAC layer data unit; generating the second MAC layer data unit includes appending (e.g., the MAC processor 126 appends, the MAC processor 166 appends, etc.) a second MAC layer delimiter to the second fragment of the third MAC layer data unit; the first frequency portion of the one or more PHY data units is generated, at block 708, to include the first MAC layer data unit and no other MAC layer data units; and the second frequency portion of the one or more PHY data units is generated, at block 708, to include the second MAC layer data unit and no other MAC layer data units.

In another embodiment, the method 700 further includes: appending, at the first communication device, (e.g., the MAC processor 126 appends, the MAC processor 166 appends, etc.) a first MAC layer delimiter to the first MAC layer data unit; and appending, at the first communication device, (e.g., the MAC processor 126 appends, the MAC processor 166 appends, etc.) a second MAC layer delimiter to the second MAC layer data unit; the first frequency portion of the one or more PHY data units is generated, at block 708, to include the first MAC layer data unit with the first MAC layer delimiter, and no other MAC layer data units; and the second frequency portion of the one or more PHY data units is generated, at block 708, to include the second MAC layer data unit with the second MAC layer delimiter, and no other MAC layer data units.

In another embodiment, the first MAC layer data unit is a first single MAC layer data unit; the second MAC layer data unit is an aggregate MAC layer data unit that includes a plurality of second single MAC layer data units; the first frequency portion of the one or more PHY data units is generated, at block 708, to include the first single MAC layer data unit and no other MAC layer data units; and the second frequency portion of the one or more PHY data units is generated, at block 708, to include the aggregate MAC layer data unit and no other MAC layer data units.

In another embodiment, the first MAC layer data unit is a first aggregate MAC layer data unit that includes a plurality of first single MAC layer data units; the second MAC layer data unit is a second aggregate MAC layer data unit that includes a plurality of second single MAC layer data units; the first frequency portion of the one or more PHY data units is generated, at block 708, to include the first aggregate MAC layer data unit and no other MAC layer data units; and the second frequency portion of the one or more PHY data units is generated, at block 708, to include the second aggregate MAC layer data unit and no other MAC layer data units.

In another embodiment in which the first MAC layer data unit is a first aggregate MAC layer data unit and the second MAC layer data unit is a second aggregate MAC layer data unit, the method 700 further comprises: receiving, at the first communication device, a parameter from the second communication device, wherein the parameter specifies a maximum number of different TID values corresponding to single MAC layer data units that can be received by the second communication device in a single transmission, and wherein the first aggregate MAC layer data unit and the second aggregate MAC layer data unit are generated such that a number of different TID values, corresponding to single MAC layer data units in both the first aggregate MAC layer data unit and the second aggregate MAC layer data unit, is less than or equal to the maximum number of different TID values specified by the parameter received from the second communication device. In another embodiment, the first communication device selects (e.g., the MAC processor 126 selects, the MAC processor 166 selects, the multi-frame transmission controller 142/192 selects) MPDUs to be included in the first MAC layer data unit and the second MAC layer data unit such that a number of different TID values, corresponding to single MAC layer data units in both the first aggregate MAC layer data unit and the second aggregate MAC layer data unit, is less than or equal to the maximum number of different TID values specified by the parameter received from the second communication device.

In another embodiment in which the first MAC layer data unit is a first aggregate MAC layer data unit and the second MAC layer data unit is a second aggregate MAC layer data unit, the method 700 further comprises: receiving, at the first communication device, a parameter from the second communication device, wherein the parameter specifies a maximum number of single MAC layer data units having a same TID value that can be received by the second communication device in a single transmission, and wherein the TID indicates at least one of i) a particular traffic class to which the corresponding single MAC layer data unit belongs, and ii) a particular traffic stream to which the corresponding single MAC layer data unit belongs; wherein the first aggregate MAC layer data unit and the second aggregate MAC layer data unit are generated to both include single MAC layer data units having the same TID; and wherein the first aggregate MAC layer data unit and the second aggregate MAC layer data unit are generated such that a number of single MAC layer data units in both of the first aggregate MAC layer data unit and the second aggregate MAC layer data unit having the same TID is not greater than the maximum number of single MAC layer data units specified by the parameter received from the second communication device.

In another embodiment in which the first MAC layer data unit is a first aggregate MAC layer data unit and the second MAC layer data unit is a second aggregate MAC layer data unit, the method 700 further comprises: receiving, at the first communication device, a parameter from the second communication device, wherein the parameter specifies a maximum number of single MAC layer data units having a same TID value that can be received by the second communication device in a single BA session, and wherein the TID indicates at least one of i) a particular traffic class to which the corresponding single MAC layer data unit belongs, and ii) a particular traffic stream to which the corresponding single MAC layer data unit belongs; wherein the first aggregate MAC layer data unit and the second aggregate MAC layer data unit are generated to both include single MAC layer data units having the same TID; and wherein the first aggregate MAC layer data unit and the second aggregate MAC layer data unit are generated such that a number of single MAC layer data units in both of the first aggregate MAC layer data unit and the second aggregate MAC layer data unit having the same TID will not cause the maximum number of single MAC layer data units specified by the parameter to be exceeded in the BA session. For example, the parameter that specifies the maximum number of single MAC layer data units having the same TID value that can be received in a single BA session corresponds to a BA buffer size negotiated for a BA session, according to an embodiment. As an illustrative example, the first communication device transmits A-MPDU1 with an Ack Policy set to Block Ack for a TID 5 in a first frequency segment and simultaneously transmits A-MPDU2 with an Ack Policy set to Block Ack for the TID 5 in a second frequency segment; then transmits A-MPDU3 with an Ack Policy set to Implicit block acknowledgment request (BAR) for the TID 5 in the first frequency segment, and simultaneously transmits A-MPDU4 with an Ack Policy set to Implicit BAR for the TID 5 in the second frequency segment; then the second communication device receives a BA frame in the first frequency segment, and simultaneously receives a second BA in the second frequency segment. In this example, the second communication device ensures that the number of frames in A-MPDU1 through A-MPDU4 is not more than the BA buffer size agreed to in the BA session negotiation.

In another embodiment, the first communication device selects (e.g., the MAC processor 126 selects, the MAC processor 166 selects, the multi-frame transmission controller 142/192 selects) MPDUs to be included in the first MAC layer data unit and the second MAC layer data unit such that a number of single MAC layer data units in both of the first aggregate MAC layer data unit and the second aggregate MAC layer data unit having the same TID value is not greater than the maximum number of single MAC layer data units specified by the parameter received from the second communication device.

In another embodiment in which the first MAC layer data unit is a first aggregate MAC layer data unit and the second MAC layer data unit is a second aggregate MAC layer data unit and in which at least some MPDUs in the first aggregate data unit and in the second MAC layer data unit are associated with a BA session set up by the first communication device and the second communication device, the method 700 includes the first communication device selecting (e.g., the MAC processor 126 selecting, the MAC processor 166 selecting, the multi-frame transmission controller 142/192 selecting) MPDUs for inclusion in the first aggregate MAC layer data unit and the second MAC layer data unit to ensure that a total number of MPDUs with a same TID value in both the first aggregate MAC layer data unit and the second MAC layer data unit is less than or equal to a maximum number of MPDUs with a same TID that the second communication device is capable of handling in the BA session. For example, the method 700 further comprises, in another embodiment, the first communication device receiving a MAC layer data unit, such as ADDBA Response frame or another suitable MAC layer data unit, that includes a parameter specifying a maximum number of MPDUs with a same TID that can be handled by the second communication device during the BA session, and the first communication device uses (e.g., the MAC processor 126 uses, the MAC processor 166 uses, the multi-frame transmission controller 142/192 uses) the value of the parameter to select MPDUs to be included in the first aggregate MAC layer data unit and the second MAC layer data unit.

In another embodiment in which the first MAC layer data unit is a first aggregate MAC layer data unit and the second MAC layer data unit is a second aggregate MAC layer data unit and in which at least some MPDUs in the first aggregate data unit and in the second MAC layer data unit are associated with a BA session set up by the first communication device and the second communication device, the method 700 includes the first communication device selecting (e.g., the MAC processor 126 selecting, the MAC processor 166 selecting, the multi-frame transmission controller 142/192 selecting) MPDUs for inclusion in the first aggregate MAC layer data unit and the second MAC layer data unit such that a total number of MPDUs with the same TID value in the first MAC layer data unit is less than or equal to a maximum number of MPDUs in a single A-MPDU the second communication device is capable of handling in the BA session, and such that a total number of MPDUs with the same TID value in the second MAC layer data unit is less than or equal to the maximum number of MPDUs in a single A-MPDU. For example, the method 700 further comprises, in another embodiment, the first communication device receiving a MAC layer data unit, such as ADDBA Response frame or another suitable MAC layer data unit, that includes a parameter specifying a maximum number of MPDUs with a same TID in a single A-MPDU that can be handled by the second communication device during the BA session, and the first communication device uses (e.g., the multi-frame transmission controller 142/192 uses) the value of the parameter to select MPDUs to be included in the first aggregate MAC layer data unit and the second MAC layer data unit.

In another embodiment, the first MAC layer data unit and the second MAC layer data unit correspond to a same TID. In another embodiment, the first MAC layer data unit and the second MAC layer data unit correspond to different TIDs.

At block 712, the first communication device transmits the one or more PHY data units to the second communication device via the communication channel Block 708 includes simultaneously transmitting i) the first frequency portion of the one or more PHY data units to the second communication device via the first frequency segment, and ii) the second frequency portion of the one or more PHY data units to the second communication device via the second frequency segment.

In another embodiment, the method 700 further comprises the first communication device negotiating and/or setting up a BA agreement with the second communication device, where the BA agreement is applied to multiple channel frequency segments (e.g., such as discussed with reference to FIGS. 3A-F). In another embodiment, the method 700 further comprises the first communication device negotiating and/or setting up a BA agreement with the second communication device, where the BA agreement is applied to multiple channel frequency segments, and where each channel segment includes a respective primary channel, and a respective backoff counter is used for each channel frequency segment (e.g., such as discussed with reference to FIGS. 3B, D, and F).

Figure 8:
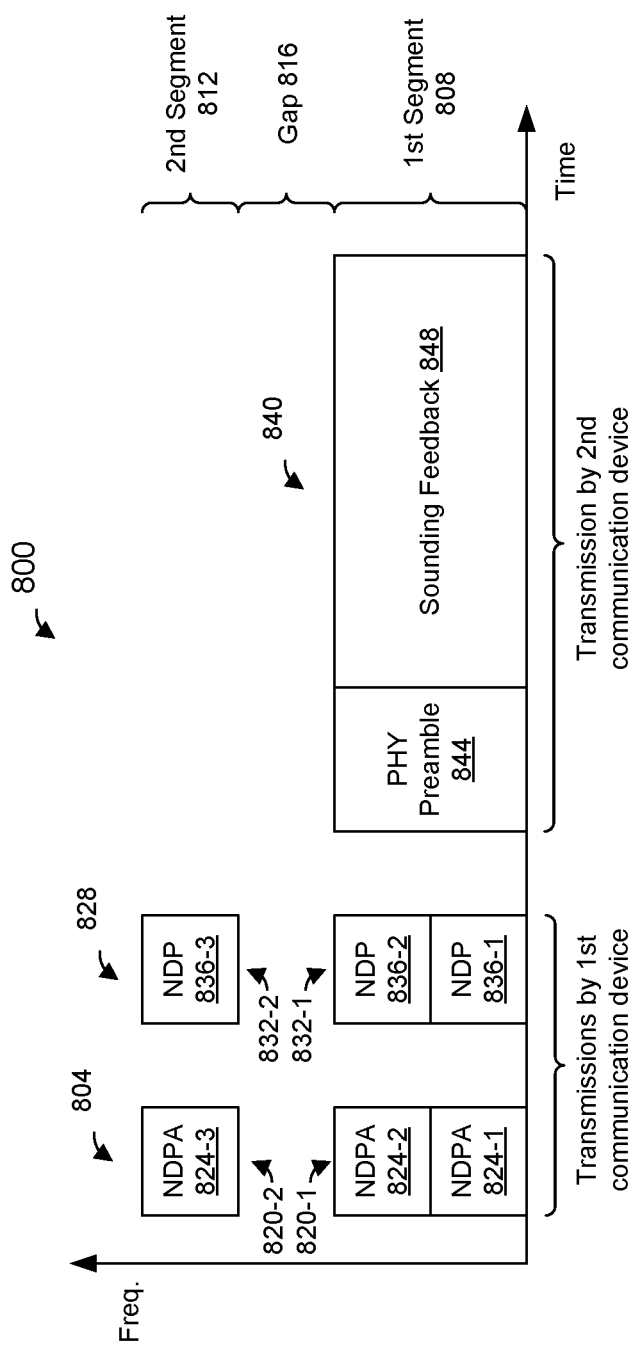
FIG. 8 is a diagram of an example channel sounding procedure between a first communication device and a second communication device in a WLAN, according to an embodiment.

In other aspects, a channel sounding procedure is used to obtain a channel estimate and/or a beamforming matrix for a communication channel that includes a first frequency segment and a second frequency segment separated by a gap in frequency. FIG. 8 is a diagram of an example channel sounding procedure 800 between a first communication device and a second communication device in a WLAN, according to an embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

In the sounding procedure 800, the first communication device transmits one or more PPDUs 804 via a communication channel having a first frequency segment 808 and a second frequency segment 812 separated by a gap 816 in frequency. In an embodiment, the first frequency segment 808 and the second frequency segment 812 are within a single RF band, and the gap 816 corresponds to one or more punctured sub-channels. In another embodiment, the first frequency segment 808 is in a first RF band, the second frequency segment 812 is in a second RF band, and the gap 816 corresponds to a gap between the first and second RF bands.

In an embodiment, the one or more PPDUs 804 comprise a plurality of PPDUs 804, where each PPDU 804 includes a respective null data packet announcement (NDPA) frame 824. In an embodiment, each PPDU 804 has a PHY format corresponding to a legacy WLAN protocol, and the PPDUs 804 are duplicate PPDUs transmitted in respective sub-channels. A first subset 820-1 of the PPDUs 804 is transmitted in the first frequency segment 808, and a second subset 820-2 of the PPDUs 804 is transmitted in the second frequency segment 812.

A particular time duration (e.g., a short interframe space (SIFS) as defined by the IEEE 802.11 Standard, or another suitable time duration) after an end of transmission of the PPDUs 804, the first communication device transmits one or more PPDUs 828 via the communication channel. In an embodiment, the one or more PPDUs 828 comprise a plurality of PPDUs 836, where each PPDU 836 corresponds to a null data packet (NDP). Each NDP 836 includes training signals for obtaining channel estimate data for the communication channel.

In an embodiment, each NDP 836 has a PHY format corresponding to a single user (SU) PHY PPDU format, and the NDPs 836-1 are duplicate NDPs transmitted in respective sub-channels. A first subset 832-1 of the NDPs 836 is transmitted in the first frequency segment 808, and a second subset 836-2 of the NDPs 836 is transmitted in the second frequency segment 812.

In response to receiving the NDPs 836, the second communication device generates channel estimate data for the first frequency segment 808 and the second frequency segment 812. Optionally, the second communication device uses the channel estimate data to generate beamforming matrix data. In an embodiment, the beamforming matrix data corresponds to a beamforming matrix that the first communication device can use to perform beamforming when the first communication device transmits to the second communication device.

The second communication devices then generates a PPDU 840 to send sounding feedback data (e.g., channel estimate data or beamforming matrix data) to the first communication device. The PPDU 840 is generated to have a bandwidth corresponding to the first frequency segment 808. The PPDU 840 includes a PHY preamble 844 and a PHY data portion 848 that includes the channel estimate data.

In an embodiment, the PPDU 840 is generated to have a SU PPDU format. In another embodiment, the PPDU 840 is generated to have an MU PPDU format. In an embodiment in which the PPDU 840 is generated to have the MU PPDU format, the second communication device transmits the PPDU 840 simultaneously with one or more other PPDUs (not shown) transmitted by one or more other communication devices as part of an uplink MU transmission.

A particular time duration (e.g., SIFS as defined by the IEEE 802.11 Standard, or another suitable time duration) after an end of reception of the NDPs 836, the second communication device transmits the PPDU 840 to the first communication device via the first frequency segment 808.

Thus, in the embodiment illustrated in FIG. 8, sounding feedback for both frequency segments 808, 812 is transmitted in only one of the frequency segments 808, 812.

Although FIG. 8 illustrates the transmissions 820 and 832 beginning at respective same times, in other embodiments, the transmissions 820 and 832 begin at different times (similar to the discussion with respect to FIG. 4D). Thus, simultaneous transmissions, such as the simultaneous transmissions 820 and 832 of FIG. 8, overlap in time, but may begin at a same time, may begin at different times, may end at a same time, and/or may end different times.

Figure 9:
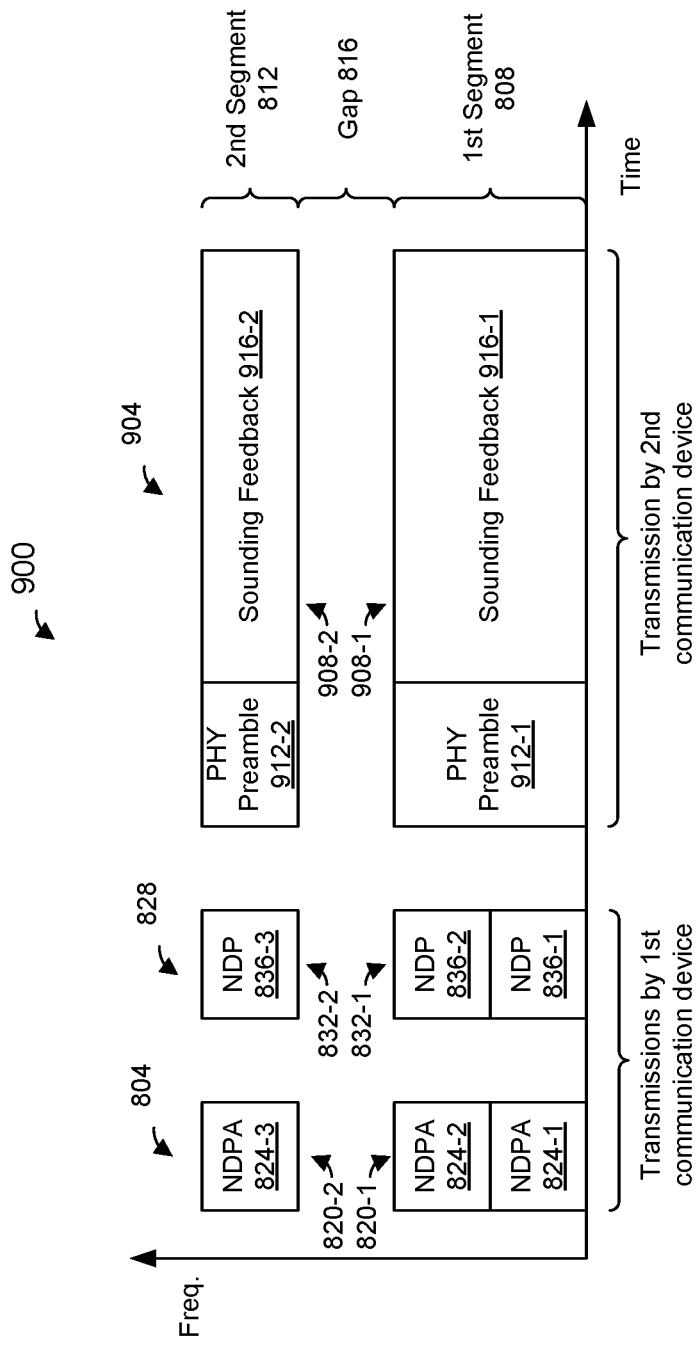
FIG. 9 is a diagram of another example channel sounding procedure in a WLAN, according to another embodiment.

FIG. 9 is a diagram of another example channel sounding procedure 900 between a first communication device and a second communication device in a WLAN, according to another embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

The sounding procedure 900 is similar to the sounding procedure 800 of FIG. 8, and like-numbered elements are not described in detail for purposes of brevity.

In response to receiving the NDPs 836, the second communication device generates channel estimate data for the first frequency segment 808 and the second frequency segment 812. Optionally, the second communication device uses the channel estimate data to generate beamforming matrix data. In an embodiment, the beamforming matrix data corresponds to a beamforming matrix that the first communication device can use to perform beamforming when the first communication device transmits to the second communication device.

The second communication device generates a plurality of MAC data units that include sounding feedback (e.g., the channel estimate data or the beamforming matrix data). For example, the second communication device generates one MAC layer data unit that includes both sounding feedback data for the first frequency segment 808 (e.g., channel estimate data or beamforming matrix data for the first frequency segment 808) and sounding feedback data for the second frequency segment 812 (e.g., channel estimate data or beamforming matrix data for the second frequency segment 812), according to an embodiment. Continuing with this example, in a manner similar to the techniques described above with reference to FIGS. 4A and 4B, the second communication device partitions the one MAC layer data unit into a plurality of portions (e.g., a first portion and a second portion) and generates respective S-MPDUs to respectively include the portions of the one MAC layer data unit.

As another example, the second communication device generates a plurality of MAC layer data units that respectively include i) sounding feedback data for the first frequency segment 808 (e.g., channel estimate data or beamforming matrix data for the first frequency segment 808) and ii) sounding feedback data for the second frequency segment 812 (e.g., channel estimate data or beamforming matrix data for the second frequency segment 812), according to an embodiment. Continuing with this example, in a manner similar to the techniques described above with reference to FIGS. 4A and 4C, the second communication device generates a first S-MPDU to include sounding feedback data for the first frequency segment 808, and generates a second S-MPDU to include sounding feedback data for the second frequency segment 812.

The second communication generates one or more PPDUs 904 to include the sounding feedback data. In an embodiment, the PPDU 904 is generated to have a SU PPDU format. In another embodiment, the PPDU 904 is generated to have an MU PPDU format. In an embodiment in which the PPDU 904 is generated to have the MU PPDU format, the second communication device transmits the PPDU 904 simultaneously with one or more other PPDUs (not shown) transmitted by one or more other communication devices as part of an uplink MU transmission.

In another embodiment, the one or more PPDUs 904 comprises a first PPDU 908-1 in the first frequency segment 808 and second PPDU 908-2 in the second frequency segment 812. The one or more PPDUs 904 comprise a PHY preamble(s) 912.

The one or more PPDUs 904 further comprise i) a first PHY data portion in the first frequency segment 808, the first PHY data portion having a first S-MPDU 916-1, and ii) a second PHY data portion in the second frequency segment 812, the second PHY data portion having a second S-MPDU 916-2. Each S-MPDU 916 has a format such as described with reference to FIGS. 4A-C, according to some embodiments.

In an embodiment in which the second communication device generates one MAC layer data unit that includes both sounding feedback data for the first frequency segment 808 (e.g., channel estimate data or beamforming matrix data for the first frequency segment 808) and sounding feedback data for the second frequency segment 812 (e.g., channel estimate data or beamforming matrix data for the second frequency segment 812), the first S-MPDU 916-1 comprises a first portion of the one MAC layer data unit, and the second S-MPDU 916-2 comprises a second portion of the one MAC layer data unit.

In another embodiment in which the second communication device generates a plurality of MAC layer data units that respectively include i) sounding feedback data for the first frequency segment 808 (e.g., channel estimate data or beamforming matrix data for the first frequency segment 808) and ii) sounding feedback data for the second frequency segment 812 (e.g., channel estimate data or beamforming matrix data for the second frequency segment 812), the first S-MPDU 916-1 comprises sounding feedback data for the first frequency segment 808, and the second S-MPDU 916-2 comprises sounding feedback data for the second frequency segment 812. In another embodiment in which the second communication device generates a plurality of MAC layer data units that respectively include i) sounding feedback data for the first frequency segment 808 (e.g., channel estimate data or beamforming matrix data for the first frequency segment 808) and ii) sounding feedback data for the second frequency segment 812 (e.g., channel estimate data or beamforming matrix data for the second frequency segment 812), the first S-MPDU 916-1 is replaced with an A-MPDU having multiple frames (e.g., if an amount of sounding feedback data to be transmitted in the first frequency segment 808 exceeds a maximum MPDU length (e.g., exceeds 11454 octets)), and/or the second S-MPDU 916-2 is replaced with an A-MPDU having multiple frames (e.g., if an amount of sounding feedback data if an amount of sounding feedback data to be transmitted in the second frequency segment 812 exceeds a maximum MPDU length (e.g., exceeds 11454 octets)).

A particular time duration (e.g., SIFS as defined by the IEEE 802.11 Standard, or another suitable time duration) after an end of reception of the NDPs 836, the second communication device transmits the one or more PPDUs 904 to the first communication device via the communication channel. For example, the second communication device transmits the first portion 908-1 to the first communication device via the first frequency segment 808, and transmits the second portion 908-2 to the first communication device via the first frequency segment 812.

Although FIG. 9 illustrates the transmissions 820, 832, and 908 beginning at respective same times, in other embodiments, the transmissions 820, 832, and 908 begin at different times (similar to the discussion with respect to FIG. 4D). Thus, simultaneous transmissions, such as the simultaneous transmissions 820, 832, and 908 of FIG. 9, overlap in time, but may begin at a same time, may begin at different times, may end at a same time, and/or may end different times.

Figure 10:
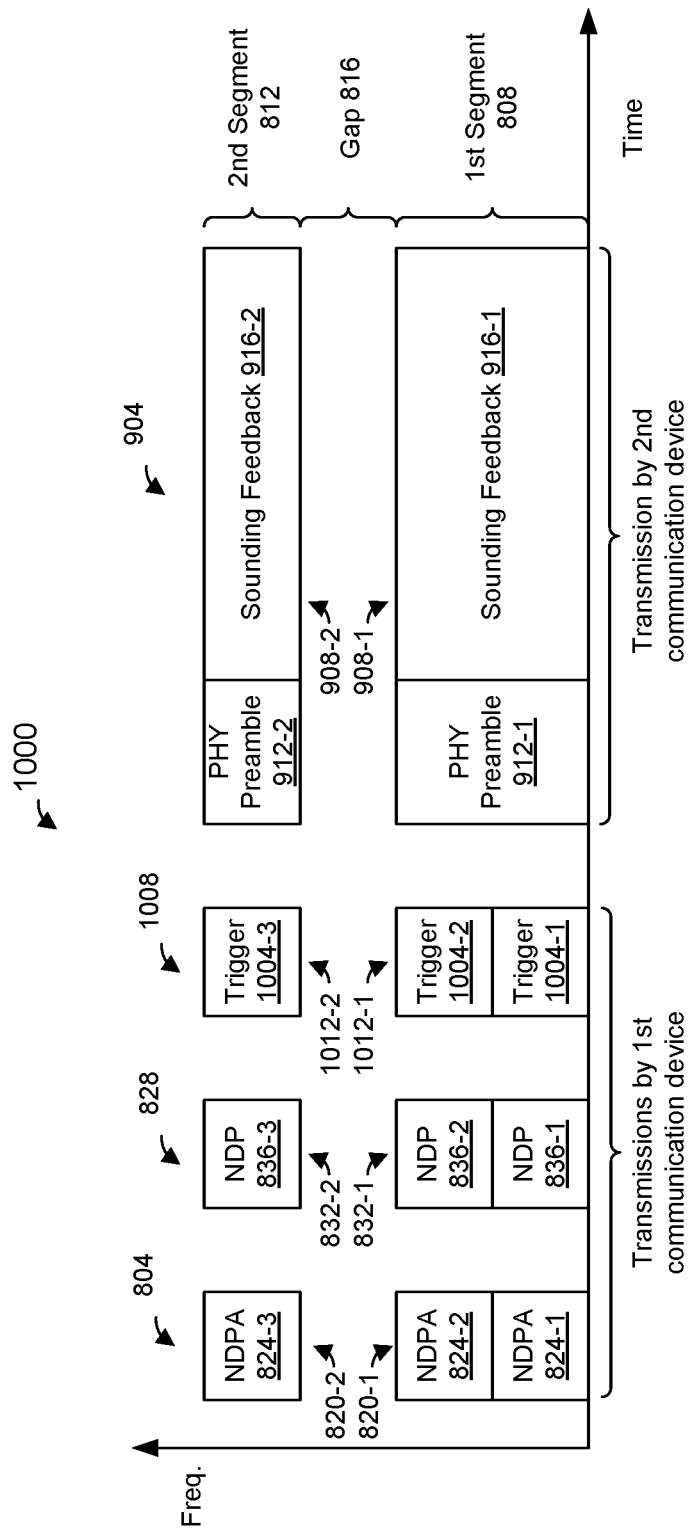
FIG. 10 is a diagram of another example channel sounding procedure in a WLAN, according to another embodiment.

FIG. 10 is a diagram of another example channel sounding procedure 1000 between a first communication device and a second communication device in a WLAN, according to another embodiment. In an embodiment, the first communication device is the AP 114 of FIG. 1 and the second communication device is the client station 154-1 of FIG. 1. In another embodiment, the first communication device is the client station 154-1 and the second communication device is the AP 114. In other embodiments, the first communication device and the second communication device are other suitable communication devices operating in another suitable wireless communication network other than the WLAN 110 of FIG. 1.

The sounding procedure 1000 is similar to the sounding procedure 900 of FIG. 9, and like-numbered elements are not described in detail for purposes of brevity.

The first communication device generates one or more trigger frames 1012 to trigger transmission, by the second communication device, of the one or more PPDUs 904 that include the sounding feedback. After transmitting the NDPs 836, the second communication device transmits one or more PPDUs 1008 that include the one or more trigger frames 1004. In an embodiment, the one or more PPDUs 1008 comprise a plurality of PPDUs 1008, where each PPDU 1008 includes a respective trigger frame 1012. In an embodiment, each PPDU 1008 has a PHY format corresponding to an SU PHY PPDU format, and the trigger frames 1004 are duplicate trigger frames transmitted in respective sub-channels. A first subset 1012-1 of the trigger frames 1004 is transmitted in the first frequency segment 808, and a second subset 1016-2 of the trigger frames 1004 is transmitted in the second frequency segment 812.

In response to receiving the trigger frame(s) 1004 and a particular time duration (e.g., SIFS as defined by the IEEE 802.11 Standard, or another suitable time duration) after an end of reception of the trigger frame(s) 1004, the second communication device transmits the one or more PPDUs 904 to the first communication device via the communication channel. For example, the second communication device transmits the first portion 908-1 to the first communication device via the first frequency segment 808, and transmits the second portion 908-2 to the first communication device via the first frequency segment 812.

Although FIG. 10 illustrates the transmissions 820, 832, 908, and 1012 beginning at respective same times, in other embodiments, the transmissions 820, 832, 908, and 1012 begin at different times (similar to the discussion with respect to FIG. 4D). Thus, simultaneous transmissions, such as the simultaneous transmissions 820, 832, 908, and 1012 of FIG. 10, overlap in time, but may begin at a same time, may begin at different times, may end at a same time, and/or may end different times.

Figure 11:
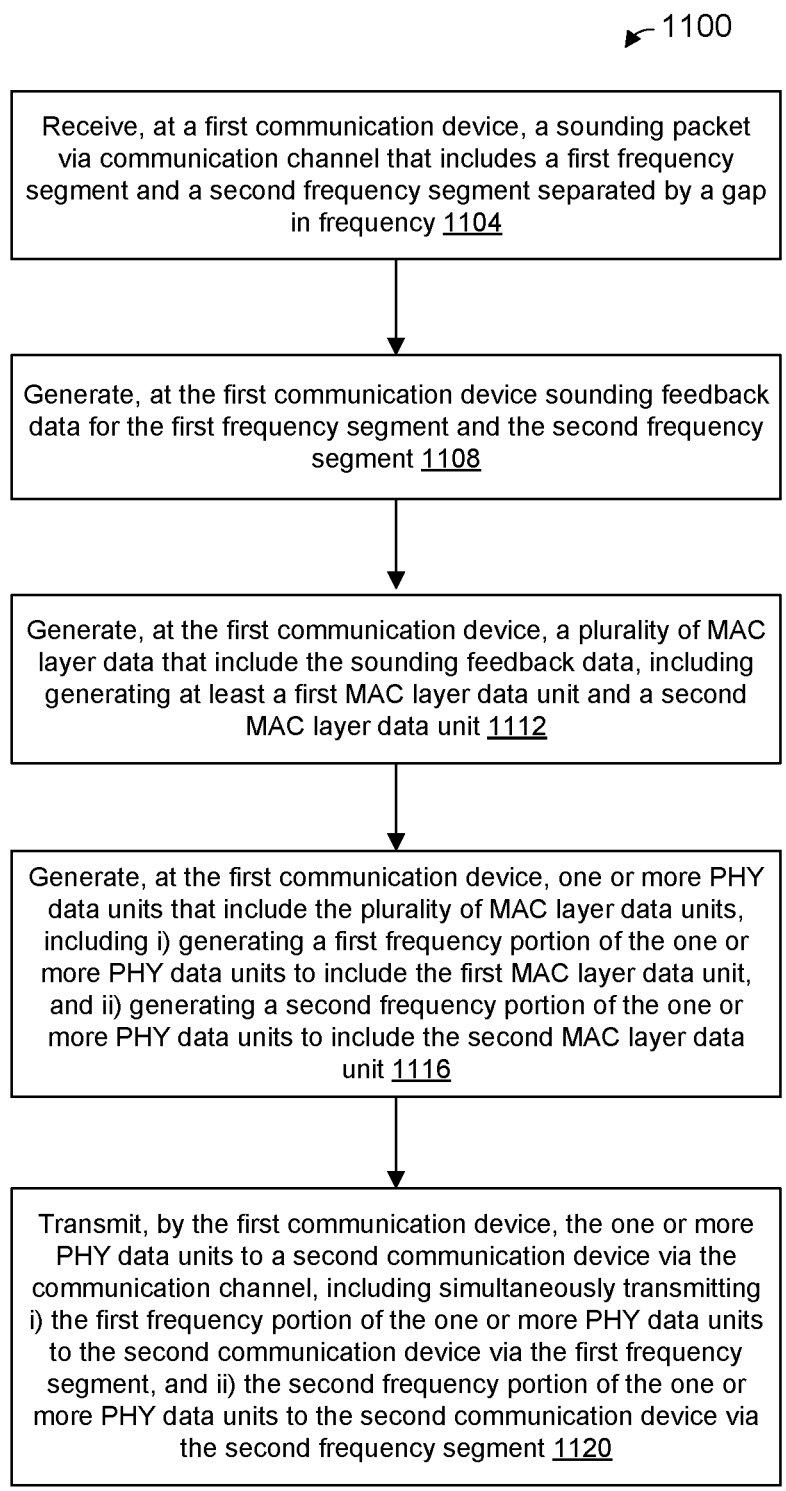
FIG. 11 is a flow diagram of an example method for communicating sounding feedback in a wireless communication network, according to an embodiment.

FIG. 11 is a flow diagram of an example method 1100 for communicating sounding feedback in a wireless communication network, according to an embodiment. The method 1100 is implemented in the WLAN 110 of FIG. 1, in an embodiment. In other embodiments, however, the method 1100 is implemented in another suitable WLAN different than the WLAN 110.

In various embodiments, the method 1100 is implemented with communication channels and/or MAC layer data units such as described with reference to FIGS. 3A-F, 4A-C, 5, and 6. In other embodiments, however, the method 1100 is implemented with suitable communication channels and/or suitable MAC layer data units different than those described with reference to FIGS. 3A-F, 4A-C, 5, and 6.

In various embodiments, the method 1100 is implemented in the context of a sounding exchange such as described with reference to FIGS. 8-10. In other embodiments, however, the method 1100 is implemented in the context of another suitable sounding exchange different than the sounding exchanges described with reference to FIGS. 8-10.

In an embodiment, the network interface device 122 is configured to implement the method 1100. In another embodiment, the network interface device 162 is configured to implement the method 1100. In other embodiments, the method 1100 is implemented by another suitable communication device, such as another suitable WLAN network interface device.

At block 1104, a first communication device receives a sounding packet via a communication channel that includes a first frequency portion and a second frequency portion separate by a gap in frequency that is not used for the communication channel. In an embodiment, the sounding packet includes training signals for obtaining channel estimate data and/or beamforming data for the communication channel. In an embodiment, the sounding packet includes i) a first portion received via the first frequency portion of the communication channel and ii) a second portion received via the second frequency portion of the communication channel.

At block 1108, the first communication device generates sounding feedback data for the first frequency portion of the communication channel and the second frequency portion of the communication channel based on reception of the training signals in the sounding packet. In an embodiment, the sounding feedback data includes i) first sounding feedback data corresponding to a first channel estimate of the first frequency segment of the communication channel, and ii) second sounding feedback data corresponding to a second channel estimate of the second frequency segment of the communication channel. In an embodiment, the first sounding feedback data includes first channel estimate data corresponding to the first channel estimate of the first frequency segment of the communication channel, and the second sounding feedback data includes second channel estimate data corresponding to the second channel estimate of the second frequency segment of the communication channel. In another embodiment, the first sounding feedback data includes first beamforming data generated from the first channel estimate of the first frequency segment of the communication channel, and the second sounding feedback data includes second beamforming data generated from the second channel estimate of the second frequency segment of the communication channel.

At block 1112, the first communication device generates a plurality of MAC layer data units to include the sounding feedback data generated at block 1108, including generating at least i) a first MAC layer data unit to be transmitted via the first frequency segment of the communication channel, and ii) a second MAC layer data unit to be transmitted via the second frequency segment of the communication channel.

In an embodiment in which the sounding feedback data includes i) the first sounding feedback data corresponding to the first channel estimate of the first frequency segment of the communication channel, and ii) the second sounding feedback data corresponding to the second channel estimate of the second frequency segment of the communication channel, generating the plurality of MAC layer data units at block 112 includes: generating, at the first communication device, a third MAC layer data unit that includes the first sounding feedback data and the second sounding feedback data; partitioning, at the first communication device, the third MAC layer data unit into at least a first fragment and a second fragment; generating, at the first communication device, the first MAC layer data unit to include the first fragment of the third MAC layer data unit; and generating, at the first communication device, the second MAC layer data unit to include the second fragment of the third MAC layer data unit. In another embodiment, generating the plurality of MAC layer data units at block 112 includes: appending a first MAC layer delimiter to the first fragment of the third MAC layer data unit; appending a second MAC layer delimiter to the second fragment of the third MAC layer data unit.

In another embodiment in which the sounding feedback data includes i) the first sounding feedback data corresponding to the first channel estimate of the first frequency segment of the communication channel, and ii) the second sounding feedback data corresponding to the second channel estimate of the second frequency segment of the communication channel, generating the plurality of MAC layer data units at block 112 includes: generating, at the first communication device, the first MAC layer data unit to include the first sounding feedback data; and generating, at the first communication device, the second MAC layer data unit to include the second sounding feedback data. In another embodiment: generating the first MAC layer data unit includes appending a first MAC layer delimiter to the first fragment of the third MAC layer data unit, and the generating the second MAC layer data unit includes appending a second MAC layer delimiter to the second MAC layer data unit.

At block 1116, the first communication device generates one or more PHY data units to include the plurality of MAC layer data units. Generating the one or more PHY data units includes i) generating a first frequency portion of the one or more PHY data units to include the first MAC layer data unit, and ii) generating a second frequency portion of the one or more PHY data units to include the second MAC layer data unit. In an embodiment, the one or more PHY data units consists of a single PHY data unit that, when transmitted, spans i) the first frequency segment of the communication channel and ii) the second frequency segment of the communication channel. In another embodiment, the one or more PHY data units comprises i) a first PHY data unit that, when transmitted, spans the first frequency segment of the communication channel and ii) a second PHY data unit that, when transmitted, spans the second frequency segment of the communication channel.

At block 1120, the first communication device transmits the one or more PHY data units to a second communication device, including simultaneously i) transmitting the first frequency portion of the one or more PHY data units via the first frequency segment of the communication channel, and ii) transmitting the second frequency portion of the one or more PHY data units via the second frequency segment of the communication channel. In an embodiment in which the one or more PHY data units comprise the first PHY data unit and the second PHY data unit, transmitting the one or more PHY data units at block 1120 comprises simultaneously i) transmitting the first PHY data unit via the first frequency segment of the communication channel, and ii) transmitting the second PHY data unit via the second frequency segment of the communication channel.

Figure 12:
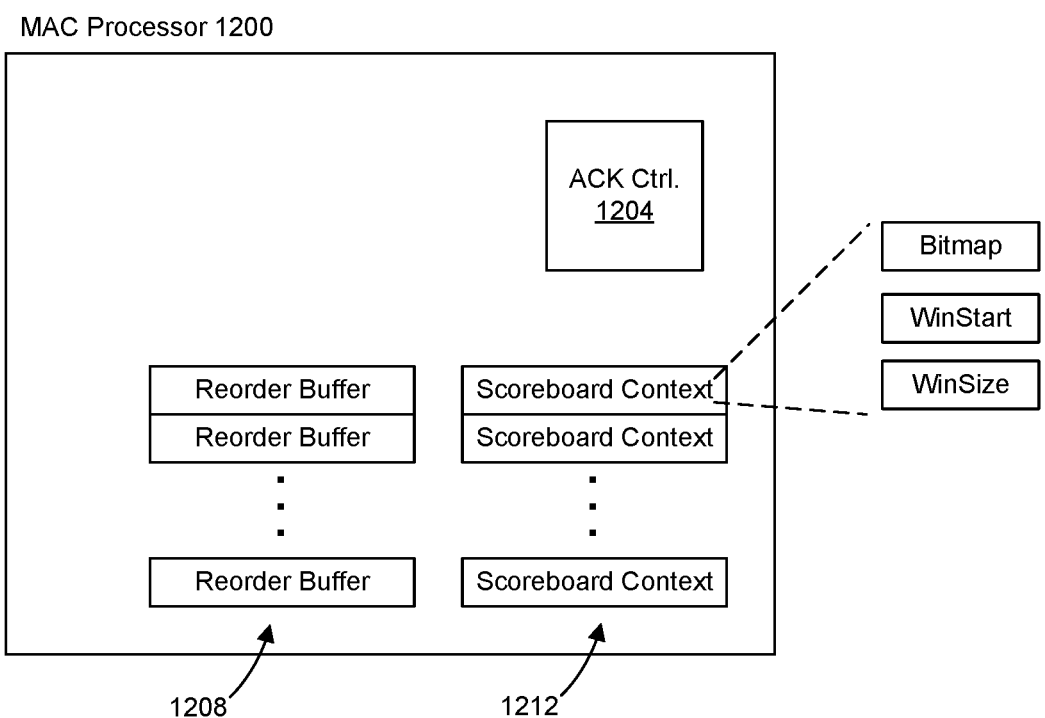
FIG. 12 is a simplified block diagram of an example MAC Processor used in the WLAN of FIG. 1, according to an embodiment.

FIG. 12 is a simplified block diagram of an example MAC Processor 1200, according to an embodiment. Referring now to FIGS. 1 and 12, the MAC processor 1200 is used for the MAC processor 126 and/or used for the MAC processor 166, according to some embodiments. In other embodiments, the MAC processor 1200 is not used for the MAC processor 126, and/or the MAC processor 166.

FIG. 12 illustrates various acknowledgment related components of the MAC processor 1200. Other components of the MAC processor 1200 are not illustrated in FIG. 12 for brevity and to avoid obscuring description of the various acknowledgment related components of the MAC processor 1200.

The MAC processor 1200 includes an acknowledgment controller 1204 that is configured to control the MAC processor 1200 to generate acknowledgment frames. For example, the acknowledgment (ACK) controller 1204 is configured to control the MAC processor 1200 to generate an ACK frame that acknowledges a single MAC layer data unit such as an MPDU, an S-MPDU, etc. In some embodiments, the acknowledgment controller 1204 is additionally configured to control the MAC processor 1200 to generate a block acknowledgment (BlockAck) frame that acknowledges multiple MAC layer data units having a common TA, TID pair. In some embodiments, the acknowledgment controller 1204 is additionally or alternatively configured to control the MAC processor 1200 to generate a multi-TID BlockAck frame that acknowledges multiple MAC layer data units with a same TA, but having different TIDs. In some embodiments, the acknowledgment controller 1204 is additionally or alternatively configured to control the MAC processor 1200 to generate a multi-station (multi-STA) BlockAck frame that is structured to permit acknowledgment of multiple MAC layer data units with different TAs and optionally different TIDs. Referring to FIGS. 4A, 5 and 6, for instance, the acknowledgment controller 1204 is configured to control the MAC processor 1200 to generate the acknowledgments 444, 448, 544, 548, 644, 648, each of which are ACK frames, BlockAck frames, multi-TID BlockAck frames, multi-STA BlockAck frames in various embodiments.

In an embodiment, the acknowledgment controller 1204 is implemented by a processor configured to execute machine readable instructions stored in a memory device (not shown) such as a RAM, a read ROM, a flash memory, etc. In another embodiment, the acknowledgment controller 1204 includes a hardware state machine.

The MAC processor 1200 also includes a plurality of reorder buffers 1208. Each reorder buffer comprises memory locations for storing received MAC layer data units for the purpose of storing received MAC layer data units in a block acknowledgment session and reordering received MAC layer data units when necessary. For example, an ordered sequence of frames with a same TID have respective sequence numbers (e.g., in the MAC header) corresponding to the order. When a communication device receives, via multiple frequency segments, frames that correspond to the ordered sequence of frames (e.g., all having the same TID), the received frames are stored in respective locations in the reorder buffer that correspond to the sequence numbers of the frames. If there is a "hole" in the reorder buffer where a frame within the sequence is missing, the MAC processor 1200 continues to store other frames in the sequence on either side of the "hole" while waiting to receive the missing frame. Once a contiguous set of frames are stored in the reorder buffer this indicates that there are no missing frames within the contiguous set, and the contiguous set of frames are released from the reorder buffer in the correct order.

The ACK controller 1204 is configured to assign a respective reorder buffer 1208 to a respective TA, TID pair, and the MAC processor 1200 stores received MAC layer data units having the respective TA, TID pair in the respective reorder buffer 1208, according to an embodiment. The plurality of reorder buffers 1208 are implemented in a memory device (e.g., a random access memory (RAM), a Flash memory, a register file, etc.) included in, or coupled to, the MAC processor 1200.

The MAC processor 1200 also includes a plurality of scoreboard context control entries 1212. Each scoreboard context control entry 1212 comprises memory locations for storing information associated with a BA session, such as i) a bitmap to record correctly received MAC layer data units (e.g., MPDUs) in the BA session, ii) a starting sequence number corresponding to a BA window (e.g., a BA window starting sequence number (WinStart)), iii) a number of MAC layer data units in the BA window (WinSize), etc. The scoreboard context control entry 1212 facilitates the MAC processor 1200 in keeping track of received frames that are part of a BA session, so that the MAC processor 1200 can generate a BA frame that correctly indicates which frames in the BA session have been received and which frames in the BA session were not received.

The ACK controller 1204 is configured to assign a respective scoreboard context control entry 1212 to a respective TA, TID pair; and the ACK controller 1204 is configured to update the respective scoreboard context control entry 1212 in response to the MAC processor 1200 receiving a MAC layer data unit having the respective TA, TID pair, according to an embodiment. In another embodiment, the ACK controller 1204 is configured to assign a respective scoreboard context control entry 1212 to a respective TA, TID, frequency segment tuple; and the ACK controller 1204 is configured to update the respective scoreboard context control entry 1212 in response to the MAC processor 1200 receiving a MAC layer data unit via the respective frequency segment and having the respective TA, TID pair, according to an embodiment.

The plurality of scoreboard context control entries 1212 are implemented in a memory device (e.g., a RAM, a Flash memory, a register file, etc.) included in, or coupled to, the MAC processor 1200. In some embodiments, a single memory device implements the plurality of reorder buffers 1208 and the plurality of scoreboard context control entries 1212; whereas in other embodiments, a first memory device implements the plurality of reorder buffers 1208 and a second memory device implements the plurality of scoreboard context control entries 1212.

In some embodiments, the MAC processor 1200 is configured to transmit different acknowledgment data units in respective frequency segments even when MAC layer data units received via the different frequency segments correspond to a single TID, TA pair. For example, referring to FIG. 6, the ACK frame 644 only acknowledges MPDUs in the A-MPDU 630 and the ACK frame 648 only acknowledges MPDUs in the A-MPDU 634 even if one or more MPDUs in the A-MPDU 630 correspond to a same TID, TA pair as one or more MPDUs in the A-MPDU 634. In such embodiments and in the context of the illustrative example of FIG. 6, the ACK controller 1204 assigns a first scoreboard context control entry 1212 to the same TA, TID pair for the first frequency segment 608, and assigns a second scoreboard context control entry 1212 to the same TA, TID pair for the second frequency segment 612. In such embodiments, the ACK controller 1204 is configured to update the first scoreboard context control entry 1212 in response to the MAC processor 1200 receiving a MAC layer data unit with the TA, TID pair via the first frequency segment 608, and to update the second scoreboard context control entry 1212 in response to the MAC processor 1200 receiving a MAC layer data unit with the TA, TID pair via the second frequency segment 612.

In embodiments in which the ACK controller 1204 is configured to maintain a respective scoreboard context control entry 1212 for a respective TA, TID, frequency segment tuple, the MAC processor 1200 is configured to generate a BlockAck frame for received MAC layer data units corresponding to the respective TA, TID, frequency segment tuple, and generating the BlockAck frame comprises including the bitmap from the respective scoreboard context control entry 1212 in the BlockAck frame.

In other embodiments, the MAC processor 1200 is configured to generate a single acknowledgment data unit when MAC layer data units received via the different frequency segments correspond to a single TID, TA pair. In such embodiments and in the context of the illustrative example of FIG. 6, the ACK controller 1204 assigns a scoreboard context control entry 1212 to the same TA, TID pair; and the ACK controller 1204 is configured to update the scoreboard context control entry 1212 in response to the MAC processor 1200 receiving a MAC layer data unit with the TA, TID pair via either the first frequency segment 608 or the second frequency segment 612.

In embodiments in which the ACK controller 1204 is configured to maintain a respective scoreboard context control entry 1212 for a respective TA, TID pair, the MAC processor 1200 is configured to generate a BlockAck frame for received MAC layer data units corresponding to the respective TA, TID pair via any of the frequency segments, and generating the BlockAck frame comprises including the bitmap from the respective scoreboard context control entry 1212 in the BlockAck frame.

Figure 13:
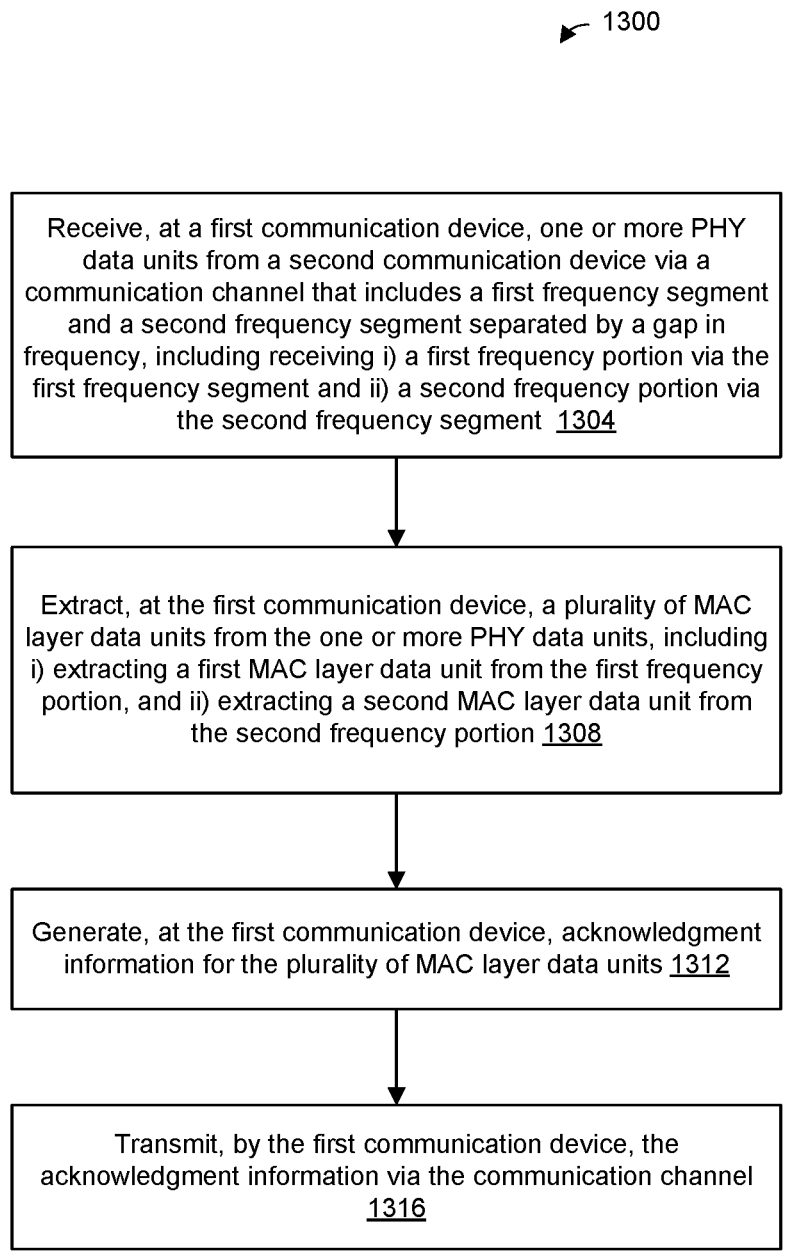
FIG. 13 is a flow diagram of an example method for acknowledging data transmitted in a wireless communication network, according to an embodiment.

FIG. 13 is a flow diagram of an example method 1300 for acknowledging data transmitted in a wireless communication network, according to an embodiment. The method 1300 is implemented in the WLAN 110 of FIG. 1, in an embodiment. In other embodiments, however, the method 1300 is implemented in another suitable WLAN different than the WLAN 110.

In various embodiments, the method 1300 is implemented with communication channels and/or MAC layer data units such as described with reference to FIGS. 3A-F, 4A-C, 5, and 6. In other embodiments, however, the method 1300 is implemented with suitable communication channels and/or suitable MAC layer data units different than those described with reference to FIGS. 3A-F, 4A-C, 5, and 6.

In an embodiment, the network interface device 122 is configured to implement the method 1300. In another embodiment, the network interface device 162 is configured to implement the method 1300. In other embodiments, the method 1300 is implemented by another suitable communication device, such as another suitable WLAN network interface device.

In an embodiment, the MAC processor 1200 (FIG. 12) is configured to implement portions of the method 1300. In another embodiment, the network interface device 162 is configured to implement the method 1300. In other embodiments, the method 1300 is implemented using another suitable communication device, such as another suitable MAC processor.

At block 1304, a first communication device receives (e.g., the PHY processor 130 receives, the PHY processor 170 receives, etc.) one or more PHY data units from a second communication device via a communication channel that includes a first frequency segment and a second frequency segment separated by a gap in frequency. In an embodiment, the gap is not used for the communication channel. In an embodiment, receiving the one or more PHY data units at block 1304 includes simultaneously i) receiving a first frequency portion of the one or more PHY data units via the first frequency segment of the communication channel, and ii) receiving a second frequency portion of the one or more PHY data units via the second frequency segment of the communication channel.

At block 1308, the first communication device extracts (e.g., the MAC processor 126 extracts, the MAC processor 166 extracts, etc.) a plurality of MAC layer data units from the one or more PHY data units, including i) extracting a first MAC layer data unit from the first frequency portion of the one or more PHY data units, and ii) extracting a second MAC layer data unit from the second frequency portion of the one or more PHY data units, wherein the plurality of MAC layer data units are from the second communication device.

At block 1312, the first communication device generates (e.g., the MAC processor 126 generates, the MAC processor 166 generates, the acknowledgment controller 1204 generates, etc.) acknowledgement information for the plurality of MAC layer data units.

At block 1316, the first communication device transmits (e.g., the PHY processor 130 transmits, the PHY processor 170 transmits, etc.) the acknowledgment information to the second communication device via the communication channel that includes the first frequency segment and the second frequency segment separated by the gap in frequency.

In another embodiment, transmitting the acknowledgment information to the second communication device comprises at least one of: i) transmitting, by the first communication device, acknowledgment information for the first MAC layer data unit via the second frequency segment; and ii) transmitting, by the first communication device, acknowledgment information for the second MAC layer data unit via the first frequency segment.

In another embodiment, the first MAC layer data unit extracted from the first frequency portion of the one or more PHY data units includes a first fragment of a third MAC layer data unit, and the second MAC layer data unit extracted from the second frequency portion of the one or more PHY data units includes a second fragment of the third MAC layer data unit; generating the acknowledgment information at block 1312 includes generating an acknowledgment frame to acknowledge the third MAC layer data unit; and transmitting the acknowledgment information at block 1316 includes: transmitting the acknowledgment frame to the second communication device via the first frequency segment of the communication channel, and transmitting a duplicate of the acknowledgment frame to the second communication device via the second frequency segment of the communication channel.

In another embodiment, generating the acknowledgment information at block 1312 includes: generating a first acknowledgment frame to acknowledge the first MAC layer data unit, and generating a second acknowledgment frame to acknowledge the second MAC layer data unit; and transmitting the acknowledgment information at block 1316 includes: transmitting the first acknowledgment frame to the second communication device via the first frequency segment of the communication channel, and transmitting the second acknowledgment frame to the second communication device via the second frequency segment of the communication channel.

In another embodiment, generating the acknowledgment information at block 1312 includes: generating a block acknowledgment frame to acknowledge the first MAC layer data unit and the second MAC layer data unit; and transmitting the acknowledgment information at block 1316 includes: transmitting the block acknowledgment frame to the second communication device via the communication channel. In one embodiment, transmitting the block acknowledgment frame to the second communication device via the communication channel includes transmitting the block acknowledgment frame via the first frequency segment of the communication channel, and transmitting a duplicate of the block acknowledgment frame via the second frequency segment of the communication channel. In another embodiment, transmitting the block acknowledgment frame to the second communication device via the communication channel includes transmitting the block acknowledgment frame in a PHY data unit that spans the first frequency segment of the communication channel and the second frequency segment of the communication channel.

In another embodiment, the first MAC layer data unit is a first A-MPDU that includes one or more first MPDUs i) corresponding to a TID, and ii) having a transmitter address; the second MAC layer data unit is a second A-MPDU that includes one or more second MPDUs i) corresponding to the TID, and ii) having the transmitter address; the method 1300 further comprises: storing, at the first communication device, (e.g., the MAC processor 126 stores, the MAC processor 166 stores, the acknowledgment controller 1204 stores, etc.) in a reorder buffer corresponding to i) the TID, and ii) the transmitter address: i) the one or more first MPDUs received via the first frequency segment and ii) the one or more second MPDUs received via the second frequency segment.

In another embodiment, the method 1300 further comprises: maintaining (e.g., the MAC processor 126 maintains, the MAC processor 166 maintains, the acknowledgment controller 1204 maintains, etc.) a scoreboard context control entry corresponding to i) the TID, and ii) the transmitter address, wherein the scoreboard context control entry is configured to store information corresponding to a block acknowledgment (BA) session including i) a bitmap to record correctly received MPDUs in the BA session, and ii) a starting sequence number corresponding to a BA window; and maintaining the scoreboard context control entry comprises: in response to correctly receiving the one or more first MPDUs via the first frequency segment: updating (e.g., the MAC processor 126 updates, the MAC processor 166 updates, the acknowledgment controller 1204 updates, etc.) the bitmap of the scoreboard context control entry, and in response to correctly receiving the one or more second MPDUs via the second frequency segment: updating the bitmap of the scoreboard context control entry.

In another embodiment, the method 1300 further comprises: maintaining (e.g., the MAC processor 126 maintains, the MAC processor 166 maintains, the acknowledgment controller 1204 maintains, etc.) a first scoreboard context control entry corresponding to i) the TID, ii) the transmitter address, and iii) the first frequency segment, wherein the first scoreboard context control entry is configured to store information corresponding to a first block acknowledgment (BA) session including i) a first bitmap to record correctly received MPDUs in the first BA session, and ii) a first starting sequence number corresponding to a first BA window, wherein maintaining the first scoreboard context control entry comprises: in response to correctly receiving the one or more first MPDUs via the first frequency segment: updating (e.g., the MAC processor 126 updates, the MAC processor 166 updates, the acknowledgment controller 1204 updates, etc.) the first bitmap of the first scoreboard context control entry; and maintaining (e.g., the MAC processor 126 maintains, the MAC processor 166 maintains, the acknowledgment controller 1204 maintains, etc.) a second scoreboard context control entry corresponding to i) the TID, ii) the transmitter address, and iii) the second frequency segment, wherein the second scoreboard context control entry is configured to store information corresponding to a second BA session including i) a second bitmap to record correctly received MPDUs in the second BA session, and ii) a second starting sequence number corresponding to a second BA window, wherein maintaining the second scoreboard context control entry comprises: in response to correctly receiving the one or more second MPDUs via the second frequency segment: updating (e.g., the MAC processor 126 updates, the MAC processor 166 updates, the acknowledgment controller 1204 updates, etc.) the second bitmap of the second scoreboard context control entry.

In another embodiment, the method 1300 further comprises the first communication device negotiating and/or setting up a single BA agreement with the second communication device, where the single BA agreement is applied to multiple channel frequency segments (e.g., such as discussed with reference to FIGS. 3A-F). In another embodiment, the method 1300 further comprises the first communication device negotiating and/or setting up a single BA agreement with the second communication device, where the single BA agreement is applied to multiple channel frequency segments, and where each channel segment includes a respective primary channel, and a respective backoff counter is used for each channel frequency segment (e.g., such as discussed with reference to FIGS. 3B, D, and F).

Embodiment 1

A method for transmitting packets in a wireless communication network, the method comprising: generating, at a first communication device, a plurality of media access control (MAC) layer data units to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, and wherein the plurality of MAC layer data units includes at least i) a first MAC layer data unit and ii) a second MAC layer data unit; generating, at the first communication device, one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit; and transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

Embodiment 2

The method of embodiment 1, wherein generating the plurality of MAC layer data units comprises: generating, at the first communication device, a third MAC layer data unit; and partitioning, at the first communication device, the third MAC layer data unit into at least a first fragment and a second fragment; generating, at the first communication device, the first MAC layer data unit to include the first fragment of the third MAC layer data unit; and generating, at the first communication device, the second MAC layer data unit to include the second fragment of the third MAC layer data unit.

Embodiment 3

The method of embodiment 2, wherein: generating the first MAC layer data unit includes appending a first MAC layer delimiter to the first fragment of the third MAC layer data unit; generating the second MAC layer data unit includes appending a second MAC layer delimiter to the second fragment of the third MAC layer data unit; and the one or more PHY data units are generated to: include, within the first frequency portion of the one or more PHY data units, the first MAC layer data unit and no other MAC layer data units, and include, within the second frequency portion of the one or more PHY data units, the second MAC layer data unit and no other MAC layer data units.

Embodiment 4

The method of embodiment 1, further comprising: appending, at the first communication device, a first MAC layer delimiter to the first MAC layer data unit; and appending, at the first communication device, a second MAC layer delimiter to the second MAC layer data unit; wherein the one or more PHY data units are generated to: include, within the first frequency portion of the one or more PHY data units, the first MAC layer data unit with the first MAC layer delimiter, and no other MAC layer data units, and include, within the second frequency portion of the one or more PHY data units, the second MAC layer data unit with the second MAC layer delimiter, and no other MAC layer data units.

Embodiment 5

The method of embodiment 1, wherein: the first MAC layer data unit is a first single MAC layer data unit; the second MAC layer data unit is an aggregate MAC layer data unit that includes a plurality of second single MAC layer data units; and the one or more PHY data units are generated to: include, within the first frequency portion of the one or more PHY data units, the first single MAC layer data unit and no other MAC layer data units, and include, within the second frequency portion of the one or more PHY data units, the aggregate MAC layer data unit and no other MAC layer data units.

Embodiment 6

The method of embodiment 1, wherein: the first MAC layer data unit is a first aggregate MAC layer data unit that includes a plurality of first single MAC layer data units; the second MAC layer data unit is a second aggregate MAC layer data unit that includes a plurality of second single MAC layer data units; and the one or more PHY data units are generated to: include, within the first frequency portion of the one or more PHY data units, the first aggregate MAC layer data unit and no other MAC layer data units, and include, within the second frequency portion of the one or more PHY data units, the second aggregate MAC layer data unit and no other MAC layer data units.

Embodiment 7

The method of embodiment 6, further comprising: receiving, at the first communication device, a parameter from the second communication device, wherein the parameter specifies a maximum number of different traffic identifiers (TIDs) corresponding to single MAC layer data units that can be received by the second communication device in a single transmission, and wherein each TID indicates at least one of i) a particular traffic class to which the corresponding single MAC layer data unit belongs, and ii) a particular traffic stream to which the corresponding single MAC layer data unit belongs; wherein the first aggregate MAC layer data unit and the second aggregate MAC layer data unit are generated such that a number of different traffic identifiers TIDs, corresponding to single MAC layer data units in both the first aggregate MAC layer data unit and the second aggregate MAC layer data unit, is not greater than the maximum number of different traffic identifiers TIDs specified by the parameter received from the second communication device.

Embodiment 8

The method of embodiment 6, further comprising: receiving, at the first communication device, a parameter from the second communication device, wherein the parameter specifies a maximum number of single MAC layer data units having a same traffic identifier (TID) that can be received by the second communication device in a single transmission, and wherein the TID indicates at least one of i) a particular traffic class to which the corresponding single MAC layer data unit belongs, and ii) a particular traffic stream to which the corresponding single MAC layer data unit belongs; wherein the first aggregate MAC layer data unit and the second aggregate MAC layer data unit are generated to both include single MAC layer data units having the same TID; and wherein the first aggregate MAC layer data unit and the second aggregate MAC layer data unit are generated such that a number of single MAC layer data units in both of the first aggregate MAC layer data unit and the second aggregate MAC layer data unit having the same TID is not greater than the maximum number of single MAC layer data units specified by the parameter received from the second communication device.

Embodiment 9

The method of embodiment 6, further comprising: receiving, at the first communication device, a first parameter from the second communication device, wherein the first parameter specifies a first minimum spacing between starts of MAC protocol data units (MPDUs) in aggregate MPDUs (A-MPDUs); and receiving, at the first communication device, a second parameter from the second communication device, wherein the second parameter specifies a second minimum spacing between starts of MPDUs in A-MPDUs, wherein the second minimum spacing is greater than the first minimum spacing; wherein the first aggregate MAC layer data unit and the second aggregate MAC layer data unit are generated according to the second minimum spacing.

Embodiment 10

A first communication device for communicating in a wireless communication network, the first communication device comprising: a wireless network interface device comprising one or more integrated circuits (ICs) configured to: generate a plurality of media access control (MAC) layer data units to be transmitted to a second communication device via a communication channel that includes a first frequency segment and a second frequency segment, wherein a gap in frequency between the first frequency segment and the second frequency segment is not used for the communication channel, and wherein the plurality of MAC layer data units includes at least i) a first MAC layer data unit and ii) a second MAC layer data unit; wherein the one or more ICs are further configured to: generate one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit, and transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

Embodiment 11

The first communication device of embodiment 10, wherein the one or more ICs are further configured to: generate a third MAC layer data unit; and partition the third MAC layer data unit into at least a first fragment and a second fragment; generate the first MAC layer data unit to include the first fragment of the third MAC layer data unit; and generate the second MAC layer data unit to include the second fragment of the third MAC layer data unit.

Embodiment 12

The first communication device of embodiment 11, wherein the one or more ICs are further configured to: append a first MAC layer delimiter to the first fragment of the third MAC layer data unit; append a second MAC layer delimiter to the second fragment of the third MAC layer data unit; and generate the one or more PHY data units to: include, within the first frequency portion of the one or more PHY data units, the first MAC layer data unit and no other MAC layer data units, and include, within the second frequency portion of the one or more PHY data units, the second MAC layer data unit and no other MAC layer data units.

Embodiment 13

The first communication device of embodiment 10, wherein the one or more ICs are further configured to: append a first MAC layer delimiter to the first MAC layer data unit; append a second MAC layer delimiter to the second MAC layer data unit; and generate the one or more PHY data units to: include, within the first frequency portion of the one or more PHY data units, the first MAC layer data unit with the first MAC layer delimiter, and no other MAC layer data units, and include, within the second frequency portion of the one or more PHY data units, the second MAC layer data unit with the second MAC layer delimiter, and no other MAC layer data units.

Embodiment 14

The first communication device of embodiment 10, wherein: the first MAC layer data unit is a first single MAC layer data unit; the second MAC layer data unit is an aggregate MAC layer data unit that includes a plurality of second single MAC layer data units; and wherein the one or more ICs are further configured to generate the one or more PHY data units to: include, within the first frequency portion of the one or more PHY data units, the first single MAC layer data unit and no other MAC layer data units, and include, within the second frequency portion of the one or more PHY data units, the aggregate MAC layer data unit and no other MAC layer data units.

Embodiment 15

The first communication device of embodiment 10, wherein: the first MAC layer data unit is a first aggregate MAC layer data unit that includes a plurality of first single MAC layer data units; the second MAC layer data unit is a second aggregate MAC layer data unit that includes a plurality of second single MAC layer data units; and wherein the one or more ICs are further configured to generate the one or more PHY data units to: include, within the first frequency portion of the one or more PHY data units, the first aggregate MAC layer data unit and no other MAC layer data units; and include, within the second frequency portion of the one or more PHY data units, the second aggregate MAC layer data unit and no other MAC layer data units.

Embodiment 16

The first communication device of embodiment 15, wherein the one or more ICs are further configured to: receive a parameter from the second communication device, wherein the parameter specifies a maximum number of different traffic identifiers (TIDs) corresponding to single MAC layer data units that can be received by the second communication device in a single transmission, and wherein each TID indicates at least one of i) a particular traffic class to which the corresponding single MAC layer data unit belongs, and ii) a particular traffic stream to which the corresponding single MAC layer data unit belongs; and generate the first aggregate MAC layer data unit and the second aggregate MAC layer data unit such that a number of different traffic identifiers TIDs, corresponding to single MAC layer data units in both the first aggregate MAC layer data unit and the second aggregate MAC layer data unit, is not greater than the maximum number of different traffic identifiers TIDs specified by the parameter received from the second communication device.

Embodiment 17

The first communication device of embodiment 15, wherein the one or more ICs are further configured to: receive a parameter from the second communication device, wherein the parameter specifies a maximum number of single MAC layer data units having a same traffic identifier (TID) that can be received by the second communication device in a single transmission, and wherein the TID indicates at least one of i) a particular traffic class to which the corresponding single MAC layer data unit belongs, and ii) a particular traffic stream to which the corresponding single MAC layer data unit belongs; generate the first aggregate MAC layer data unit and the second aggregate MAC layer data unit to both include single MAC layer data units having the same TID; and generate the first aggregate MAC layer data unit and the second aggregate MAC layer data unit such that a number of single MAC layer data units in both of the first aggregate MAC layer data unit and the second aggregate MAC layer data unit having the same TID is not greater than the maximum number of single MAC layer data units specified by the parameter received from the second communication device.

Embodiment 18

The first communication device of embodiment 15, wherein the one or more ICs are further configured to: receive a first parameter from the second communication device, wherein the first parameter specifies a first minimum spacing between starts of MAC protocol data units (MPDUs) in aggregate MPDUs (A-MPDUs); receive a second parameter from the second communication device, wherein the second parameter specifies a second minimum spacing between starts of MPDUs in A-MPDUs, wherein the second minimum spacing is greater than the first minimum spacing; and generate the first aggregate MAC layer data unit and the second aggregate MAC layer data unit according to the second minimum spacing.

Embodiment 19

The first communication device of any of embodiments 10-18, wherein: the wireless network interface device comprises one or more transceivers implemented on the one more ICs.

Embodiment 20

The first communication device of embodiment 19, further comprising: one or more antennas coupled to the one or more transceivers.

Embodiment 21

A method for acknowledging data transmitted in a wireless communication network, the method comprising: receiving, at a first communication device, one or more physical layer (PHY) data units from a second communication device via a communication channel that includes a first frequency segment and a second frequency segment separated from the first frequency segment by a gap in frequency, wherein the gap is not used for the communication channel, and wherein receiving the one or more PHY data units includes simultaneously i) receiving a first frequency portion of the one or more PHY data units via the first frequency segment of the communication channel, and ii) receiving a second frequency portion of the one or more PHY data units via the second frequency segment of the communication channel; extracting, at the first communication device, a plurality of media access control (MAC) layer data units from the one or more PHY data units, including i) extracting a first MAC layer data unit from the first frequency portion of the one or more PHY data units, and ii) extracting a second MAC layer data unit from the second frequency portion of the one or more PHY data units, wherein the plurality of MAC layer data units are from the second communication device; generating, at the first communication device, acknowledgement information for the plurality of MAC layer data units; and transmitting, by the first communication device, the acknowledgment information to the second communication device via one or both of i) the first frequency segment and ii) the second frequency segment.

Embodiment 22

The method of embodiment 21, wherein transmitting the acknowledgment information to the second communication device comprises at least one of: transmitting, by the first communication device, acknowledgment information for the first MAC layer data unit via the second frequency segment; and transmitting, by the first communication device, acknowledgment information for the second MAC layer data unit via the first frequency segment.

Embodiment 23

The method of embodiment 21, wherein: the first MAC layer data unit extracted from the first frequency portion of the one or more PHY data units includes a first fragment of a third MAC layer data unit; the second MAC layer data unit extracted from the second frequency portion of the one or more PHY data units includes a second fragment of the third MAC layer data unit; and generating the acknowledgment information includes generating an acknowledgment frame to acknowledge receipt of the third MAC layer data unit.

Embodiment 24

The method of embodiment 23, wherein: transmitting the acknowledgment information includes transmitting the acknowledgment frame to the second communication device via the first frequency segment of the communication channel, and transmitting a duplicate of the acknowledgment frame to the second communication device via the second frequency segment of the communication channel.

Embodiment 25

The method of embodiment 21, wherein: generating the acknowledgment information includes: generating a first acknowledgment frame to acknowledge receipt of the first MAC layer data unit, and generating a second acknowledgment frame to acknowledge receipt of the second MAC layer data unit; and transmitting the acknowledgment information includes: transmitting the first acknowledgment frame to the second communication device via the first frequency segment of the communication channel, and transmitting the second acknowledgment frame to the second communication device via the second frequency segment of the communication channel.

Embodiment 26

The method of embodiment 21, wherein: generating the acknowledgment information includes: generating a block acknowledgment frame to acknowledge receipt of the first MAC layer data unit and receipt of the second MAC layer data unit; and transmitting the acknowledgment information includes: transmitting the block acknowledgment frame to the second communication device via the communication channel.

Embodiment 27

The method of embodiment 26, wherein transmitting the block acknowledgment frame to the second communication device via the communication channel includes: transmitting the block acknowledgment frame via the first frequency segment of the communication channel; and transmitting a duplicate of the block acknowledgment frame via the second frequency segment of the communication channel.

Embodiment 28

The method of embodiment 26, wherein transmitting the block acknowledgment frame to the second communication device via the communication channel includes: transmitting the block acknowledgment frame in a PHY data unit that spans the first frequency segment of the communication channel and the second frequency segment of the communication channel.

Embodiment 29

The method of embodiment 26, wherein: the first MAC layer data unit is a first aggregate MAC protocol data unit (A-MPDU) that includes one or more first MAC protocol data units (MPDUs) i) corresponding to a traffic identifier (TID), and ii) having a transmitter address; the second MAC layer data unit is a second A-MPDU that includes one or more second MPDUs i) corresponding to the TID, and ii) having the transmitter address; the method further comprises: storing, at the first communication device, in a reorder buffer corresponding to i) the TID, and ii) the transmitter address: i) the one or more first MPDUs received via the first frequency segment and ii) the one or more second MPDUs received via the second frequency segment.

Embodiment 30

The method of embodiment 29, further comprising: maintaining a scoreboard context control entry corresponding to i) the TID, and ii) the transmitter address, wherein the scoreboard context control entry is configured to store information corresponding to a block acknowledgment (BA) session including i) a bitmap to record correctly received MPDUs in the BA session, and ii) a starting sequence number corresponding to a BA window, wherein maintaining the scoreboard context control entry comprises: in response to correctly receiving the one or more first MPDUs via the first frequency segment: updating the bitmap of the scoreboard context control entry, and in response to correctly receiving the one or more second MPDUs via the second frequency segment: updating the bitmap of the scoreboard context control entry.

Embodiment 31

The method of embodiment 29, further comprising: maintaining a first scoreboard context control entry corresponding to i) the TID, ii) the transmitter address, and iii) the first frequency segment, wherein the first scoreboard context control entry is configured to store information corresponding to a first block acknowledgment (BA) session including i) a first bitmap to record correctly received MPDUs in the first BA session, and ii) a first starting sequence number corresponding to a first BA window, wherein maintaining the first scoreboard context control entry comprises: in response to correctly receiving the one or more first MPDUs via the first frequency segment: updating the first bitmap of the first scoreboard context control entry; and maintaining a second scoreboard context control entry corresponding to i) the TID, ii) the transmitter address, and iii) the second frequency segment, wherein the second scoreboard context control entry is configured to store information corresponding to a second BA session including i) a second bitmap to record correctly received MPDUs in the second BA session, and ii) a second starting sequence number corresponding to a second BA window, wherein maintaining the second scoreboard context control entry comprises: in response to correctly receiving the one or more second MPDUs via the second frequency segment: updating the second bitmap of the second scoreboard context control entry.

Embodiment 32

A first communication device for communicating in a wireless communication network, the first communication device comprising: a wireless network interface device comprising one or more integrated circuits (ICs) configured to: receive one or more physical layer (PHY) data units from a second communication device via a communication channel that includes a first frequency segment and a second frequency segment separated from the first frequency segment by a gap in frequency, wherein the gap is not used for the communication channel, and wherein receiving the one or more PHY data units includes simultaneously i) receiving a first frequency portion of the one or more PHY data units via the first frequency segment of the communication channel, and ii) receiving a second frequency portion of the one or more PHY data units via the second frequency segment of the communication channel; and wherein the one or more ICs are further configured to: extract a plurality of media access control (MAC) layer data units from the one or more PHY data units, including i) extracting a first MAC layer data unit from the first frequency portion of the one or more PHY data units, and ii) extracting a second MAC layer data unit from the second frequency portion of the one or more PHY data units, wherein the plurality of MAC layer data units are from the second communication device, generate acknowledgement information for the plurality of MAC layer data units, and transmit the acknowledgment information to the second communication device via one or both of i) the first frequency segment and ii) the second frequency segment.

Embodiment 33

The first communication device of embodiment 32, wherein the one or more ICs are further configured to: transmit acknowledgment information for the first MAC layer data unit via the second frequency segment; and transmit acknowledgment information for the second MAC layer data unit via the first frequency segment.

Embodiment 34

The first communication device of embodiment 32, wherein: the first MAC layer data unit extracted from the first frequency portion of the one or more PHY data units includes a first fragment of a third MAC layer data unit; the second MAC layer data unit extracted from the second frequency portion of the one or more PHY data units includes a second fragment of the third MAC layer data unit; and the one or more ICs are further configured to: generate an acknowledgment frame to acknowledge receipt of the third MAC layer data unit.

Embodiment 35

The first communication device of embodiment 34, wherein the one or more ICs are further configured to: transmit the acknowledgment frame to the second communication device via the first frequency segment of the communication channel, and transmit a duplicate of the acknowledgment frame to the second communication device via the second frequency segment of the communication channel.

Embodiment 36

The first communication device of embodiment 32, wherein the one or more ICs are further configured to: generate a first acknowledgment frame to acknowledge receipt of the first MAC layer data unit; generate a second acknowledgment frame to acknowledge receipt of the second MAC layer data unit; transmit the first acknowledgment frame to the second communication device via the first frequency segment of the communication channel; and transmit the second acknowledgment frame to the second communication device via the second frequency segment of the communication channel.

Embodiment 37

The first communication device of embodiment 32, wherein the one or more ICs are further configured to: generate a block acknowledgment frame to acknowledge receipt of the first MAC layer data unit and receipt of the second MAC layer data unit; and transmit the block acknowledgment frame to the second communication device via the communication channel.

Embodiment 38

The first communication device of embodiment 37, wherein the one or more ICs are further configured to: transmit the block acknowledgment frame via the first frequency segment of the communication channel; and transmit a duplicate of the block acknowledgment frame via the second frequency segment of the communication channel.

Embodiment 39

The first communication device of embodiment 37, wherein the one or more ICs are further configured to: transmit the block acknowledgment frame in a PHY data unit that spans the first frequency segment of the communication channel and the second frequency segment of the communication channel.

Embodiment 40

The first communication device of embodiment 37, wherein: the first MAC layer data unit is a first aggregate MAC protocol data unit (A-MPDU) that includes one or more first MAC protocol data units (MPDUs) i) corresponding to a traffic identifier (TID), and ii) having a transmitter address; the second MAC layer data unit is a second A-MPDU that includes one or more second MPDUs i) corresponding to the TID, and ii) having the transmitter address; the network interface device includes a reorder buffer corresponding to i) the TID, and ii) the transmitter address; and the one or more ICs are further configured to: store in the reorder buffer corresponding to i) the TID, and ii) the transmitter address: i) the one or more first MPDUs received via the first frequency segment and ii) the one or more second MPDUs received via the second frequency segment.

Embodiment 41

The first communication device of embodiment 40, wherein: the network interface device includes a memory having a scoreboard context control entry corresponding to i) the TID, and ii) the transmitter address, wherein the scoreboard context control entry is configured to store information corresponding to a block acknowledgment (BA) session including i) a bitmap to record correctly received MPDUs in the BA session, and ii) a starting sequence number corresponding to a BA window; and the one or more ICs are further configured to: maintain the scoreboard context control entry corresponding to i) the TID, and ii) the transmitter address, including: in response to correctly receiving the one or more first MPDUs via the first frequency segment: updating the bitmap of the scoreboard context control entry, and in response to correctly receiving the one or more second MPDUs via the second frequency segment: updating the bitmap of the scoreboard context control entry.

Embodiment 42

The first communication device of embodiment 40, wherein: the network interface device includes a memory having: a first scoreboard context control entry corresponding to i) the TID, ii) the transmitter address, and iii) the first frequency segment, wherein the first scoreboard context control entry is configured to store information corresponding to a first block acknowledgment (BA) session including i) a first bitmap to record correctly received MPDUs in the first BA session, and ii) a first starting sequence number corresponding to a first BA window, and a second scoreboard context control entry corresponding to i) the TID, ii) the transmitter address, and iii) the second frequency segment, wherein the second scoreboard context control entry is configured to store information corresponding to a second BA session including i) a second bitmap to record correctly received MPDUs in the second BA session, and ii) a second starting sequence number corresponding to a second BA window; the one or more ICs are further configured to: maintain the first scoreboard context control entry corresponding to i) the TID, ii) the transmitter address, and iii) the first frequency segment, including: in response to correctly receiving the one or more first MPDUs via the first frequency segment: updating the first bitmap of the first scoreboard context control entry; and the one or more ICs are further configured to: maintain the second scoreboard context control entry corresponding to i) the TID, ii) the transmitter address, and iii) the second frequency segment, including: in response to correctly receiving the one or more second MPDUs via the second frequency segment: updating the second bitmap of the second scoreboard context control entry.

Embodiment 43

A method for communicating sounding feedback in a wireless communication network, the sounding feedback associated with an estimate of a communication channel that includes a first frequency segment and a second frequency segment separated from the first frequency segment by a gap in frequency that is not used for the communication channel, the method comprising: receiving, at a first communication device, a sounding packet via the communication channel, wherein the sounding packet includes training signals for obtaining channel estimate data and/or beamforming data for the communication channel, and wherein the sounding packet includes i) a first portion received via the first frequency segment of the communication channel and ii) a second portion received via the second frequency segment of the communication channel; generating, at the first communication device, sounding feedback data for the first frequency segment of the communication channel and the second frequency segment of the communication channel based on reception of the training signals in the sounding packet; generating, at the first communication device, a plurality of media access control (MAC) layer data units to include the sounding feedback data, including generating at least i) a first MAC layer data unit to be transmitted via the first frequency segment of the communication channel, and ii) a second MAC layer data unit to be transmitted via the second frequency segment of the communication channel; generating, at the first communication device, one or more physical layer (PHY) data units to include the plurality of MAC layer data units, including i) generating a first frequency portion of the one or more PHY data units to include the first MAC layer data unit, and ii) generating a second frequency portion of the one or more PHY data units to include the second MAC layer data unit; and transmitting, by the first communication device, the one or more PHY data units packet via the communication channel to a second communication device, including simultaneously i) transmitting the first frequency portion of the one or more PHY data units via the first frequency segment of the communication channel, and ii) transmitting the second frequency portion of the one or more PHY data units via the second frequency segment of the communication channel.

Embodiment 44

The method of embodiment 43, wherein generating the sounding feedback data comprises: generating, at the first communication device, first sounding feedback data corresponding to a first channel estimate of the first frequency segment of the communication channel; and generating, at the first communication device, second sounding feedback data corresponding to a second channel estimate of the second frequency segment of the communication channel.

Embodiment 45

The method of embodiment 44, wherein generating the plurality of MAC layer data units comprises: generating, at the first communication device, a third MAC layer data unit to include i) the first sounding feedback data, and ii) the second sounding feedback data; and partitioning, at the first communication device, the third MAC layer data unit into at least i) a first fragment, and ii) a second fragment; wherein the first MAC layer data unit is generated to include the first fragment; and wherein the second MAC layer data unit is generated to include the second fragment.

Embodiment 46

The method of embodiment 44, wherein: the first MAC layer data unit is generated to include the first sounding feedback data; and the second MAC layer data unit is generated to include the second sounding feedback data.

Embodiment 47

A first communication device for communicating in a wireless communication network, the first communication device comprising: a wireless network interface device comprising one or more integrated circuits (ICs) configured to: receive a sounding packet via a communication channel that includes a first frequency segment and a second frequency segment separated from the first frequency segment by a gap in frequency that is not used for the communication channel, wherein the sounding packet includes training signals for obtaining channel estimate data and/or beamforming data for the communication channel, and wherein the sounding packet includes i) a first portion received via the first frequency segment of the communication channel and ii) a second portion received via the second frequency segment of the communication channel; wherein the one or more ICs are further configured to: generate sounding feedback data for the first frequency segment of the communication channel and the second frequency segment of the communication channel based on reception of the training signals in the sounding packet, generate a plurality of media access control (MAC) layer data units to include the sounding feedback data, including generating at least i) a first MAC layer data unit to be transmitted via the first frequency segment of the communication channel, and ii) a second MAC layer data unit to be transmitted via the second frequency segment of the communication channel, generate one or more physical layer (PHY) data units to include the plurality of MAC layer data units, including i) generating a first frequency portion of the one or more PHY data units to include the first MAC layer data unit, and ii) generating a second frequency portion of the one or more PHY data units to include the second MAC layer data unit, and control the wireless network interface to transmit the one or more PHY data units packet via the communication channel to a second communication device, including simultaneously i) transmitting the first frequency portion of the one or more PHY data units via the first frequency segment of the communication channel, and ii) transmitting the second frequency portion of the one or more PHY data units via the second frequency segment of the communication channel.

Embodiment 48

The first communication device of embodiment 47, wherein the one or more ICs are further configured to: generate first sounding feedback data corresponding to a first channel estimate of the first frequency segment of the communication channel; and generate sounding feedback data corresponding to a second channel estimate of the second frequency segment of the communication channel.

Embodiment 49

The first communication device of embodiment 48, wherein the one or more ICs are further configured to: generate a third MAC layer data unit to include i) the first sounding feedback data, and ii) the second sounding feedback data; partition the third MAC layer data unit into at least i) a first fragment, and ii) a second fragment; generate the first MAC layer data unit to include the first fragment; and generate the second MAC layer data unit to include the second fragment.

Embodiment 50

The first communication device of embodiment 48, wherein the one or more ICs are further configured to: generate the first MAC layer data unit to include the first sounding feedback data; and generate the second MAC layer data unit to include the second sounding feedback data.

Embodiment 51

A method for transmitting packets in a wireless communication network, the method comprising: generating, at a first communication device, a plurality of aggregate MAC protocol data units (A-MPDUs) to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, wherein the plurality of A-MPDUs includes at least i) a first A-MPDU and ii) a second A-MPDU, and wherein the plurality of A-MPDUs correspond to a single block acknowledgment (BA) agreement between the first communication device and the second communication device; generating, at the first communication device, one or more PHY data units that include the plurality of A-MPDUs, including i) generating a first frequency portion of the one or more PHY data units to include the first A-MPDU, and ii) generating a second frequency portion of the one or more PHY data units to include the second A-MPDU; and transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

Embodiment 51

A first communication device for communicating in a wireless communication network, the first communication device comprising: a wireless network interface device comprising one or more ICs. The one or more ICs are configured to: generate a plurality of A-MPDUs to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, wherein the plurality of A-MPDUs includes at least i) a first A-MPDU and ii) a second A-MPDU, and wherein the plurality of A-MPDUs correspond to a single BA agreement between the first communication device and the second communication device; generate one or more PHY data units that include the plurality of A-MPDUs, including i) generating a first frequency portion of the one or more PHY data units to include the first A-MPDU, and ii) generating a second frequency portion of the one or more PHY data units to include the second A-MPDU; and transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting packets in a wireless communication network, the method comprising:
generating, at a first communication device, a plurality of media access control (MAC) layer data units to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, and wherein the plurality of MAC layer data units includes at least i) a first MAC layer data unit and ii) a second MAC layer data unit, and wherein the plurality of MAC layer data units are generated such that a number of different traffic identifiers (TIDs), corresponding to single MAC layer data units of the plurality of MAC layer data units received by the second communication device in a single transmission, is not greater than a maximum number of different traffic identifiers TIDs;
generating, at the first communication device, one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit; and
transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

2. The method of claim 1, wherein generating the plurality of MAC layer data units comprises:
generating, at the first communication device, a third MAC layer data unit; and partitioning, at the first communication device, the third MAC layer data unit into at least a first fragment and a second fragment;

generating, at the first communication device, the first MAC layer data unit to include the first fragment of the third MAC layer data unit; and generating, at the first communication device, the second MAC layer data unit to include the second fragment of the third MAC layer data unit.

3. The method of claim 2, wherein:

generating the first MAC layer data unit includes appending a first MAC layer delimiter to the first fragment of the third MAC layer data unit;

generating the second MAC layer data unit includes appending a second MAC layer delimiter to the second fragment of the third MAC layer data unit; and the one or more PHY data units are generated to:
include, within the first frequency portion of the one or more PHY data units, the first MAC layer data unit and no other MAC layer data units, and
include, within the second frequency portion of the one or more PHY data units, the second MAC layer data unit and no other MAC layer data units.

4. The method of claim 1, further comprising:

appending, at the first communication device, a first MAC layer delimiter to the first MAC layer data unit; and appending, at the first communication device, a second MAC layer delimiter to the second MAC layer data unit;

wherein the one or more PHY data units are generated to:
include, within the first frequency portion of the one or more PHY data units, the first MAC layer data unit with the first MAC layer delimiter, and no other MAC layer data units, and
include, within the second frequency portion of the one or more PHY data units, the second MAC layer data unit with the second MAC layer delimiter, and no other MAC layer data units.

5. The method of claim 1, wherein:

the first MAC layer data unit is a first single MAC layer data unit;

the second MAC layer data unit is an aggregate MAC layer data unit that includes a plurality of second single MAC layer data units; and the one or more PHY data units are generated to:
include, within the first frequency portion of the one or more PHY data units, the first single MAC layer data unit and no other MAC layer data units, and
include, within the second frequency portion of the one or more PHY data units, the aggregate MAC layer data unit and no other MAC layer data units.

6. The method of claim 1, wherein:

the first MAC layer data unit is a first aggregate MAC layer data unit that includes a plurality of first single MAC layer data units;

the second MAC layer data unit is a second aggregate MAC layer data unit that includes a plurality of second single MAC layer data units; and the one or more PHY data units are generated to:
include, within the first frequency portion of the one or more PHY data units, the first aggregate MAC layer data unit and no other MAC layer data units, and
include, within the second frequency portion of the one or more PHY data units, the second aggregate MAC layer data unit and no other MAC layer data units.

7. The method of claim 6, further comprising:

receiving, at the first communication device, a parameter from the second communication device, wherein the parameter specifies flail the maximum number of different traffic identifiers (TIDs) corresponding to single MAC layer data units that can be received by the second communication device in flail the single transmission, and wherein each TID indicates at least one of i) a particular traffic class to which the corresponding single MAC layer data unit belongs, and ii) a particular traffic stream to which the corresponding single MAC layer data unit belongs;

wherein the first aggregate MAC layer data unit and the second aggregate MAC layer data unit are generated such that a number of different traffic identifiers TIDs, corresponding to single MAC layer data units in both the first aggregate MAC layer data unit and the second aggregate MAC layer data unit, is not greater than the maximum number of different traffic identifiers TIDs specified by the parameter received from the second communication device.

8. A method for transmitting packets in a wireless communication network, the method comprising:

generating, at a first communication device, a plurality of media access control (MAC) layer data units to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, and wherein the plurality of MAC layer data units includes at least i) a first MAC layer data unit and ii) a second MAC layer data unit;

generating, at the first communication device, one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit;

transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment;

wherein:
the first MAC layer data unit is a first aggregate MAC layer data unit that includes a plurality of first single MAC layer data units;
the second MAC layer data unit is a second aggregate MAC layer data unit that includes a plurality of second single MAC layer data units; and
the one or more PHY data units are generated to:
include, within the first frequency portion of the one or more PHY data units, the first aggregate MAC layer data unit and no other MAC layer data units, and
include, within the second frequency portion of the one or more PHY data units, the second aggregate MAC layer data unit and no other MAC layer data units; and receiving, at the first communication device, a parameter from the second communication device, wherein the parameter specifies a maximum number of single MAC layer data units having a same traffic identifier (TID) that can be received by the second communication device in a single transmission, and wherein the TID indicates at least one of i) a particular traffic class to which the corresponding single MAC layer data unit belongs, and ii) a particular traffic stream to which the corresponding single MAC layer data unit belongs;

wherein the first aggregate MAC layer data unit and the second aggregate MAC layer data unit are generated to both include single MAC layer data units having the same TID; and wherein the first aggregate MAC layer data unit and the second aggregate MAC layer data unit are generated such that a number of single MAC layer data units in both of the first aggregate MAC layer data unit and the second aggregate MAC layer data unit having the same TID is not greater than the maximum number of single MAC layer data units specified by the parameter received from the second communication device.

9. A method for transmitting packets in a wireless communication network, the method comprising:

generating, at a first communication device, a plurality of media access control (MAC) layer data units to be transmitted to a second communication device via a communication channel that includes a first frequency segment and a second frequency segment, the first frequency segment being separated from the second frequency segment by a gap in frequency, wherein the gap in frequency between the first frequency segment and the second frequency segment is not used for the communication channel, and wherein the plurality of MAC layer data units includes at least i) a first MAC layer data unit and ii) a second MAC layer data unit;

generating, at the first communication device, one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit;

transmitting, by the first communication device, the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment;

wherein:

the first MAC layer data unit is a first aggregate MAC layer data unit that includes a plurality of first single MAC layer data units;

the second MAC layer data unit is a second aggregate MAC layer data unit that includes a plurality of second single MAC layer data units; and the one or more PHY data units are generated to:
include, within the first frequency portion of the one or more PHY data units, the first aggregate MAC layer data unit and no other MAC layer data units, and
include, within the second frequency portion of the one or more PHY data units, the second aggregate MAC layer data unit and no other MAC layer data units; and receiving, at the first communication device, a first parameter from the second communication device, wherein the first parameter specifies a first minimum spacing between starts of MAC protocol data units (MPDUs) in aggregate MPDUs (A-MPDUs); and receiving, at the first communication device, a second parameter from the second communication device, wherein the second parameter specifies a second minimum spacing between starts of MPDUs in A-MPDUs, wherein the second minimum spacing is greater than the first minimum spacing;

wherein the first aggregate MAC layer data unit and the second aggregate MAC layer data unit are generated according to the second minimum spacing.

10. A first communication device for communicating in a wireless communication network, the first communication device comprising:

a wireless network interface device comprising one or more integrated circuits (ICs) configured to:
generate a plurality of media access control (MAC) layer data units to be transmitted to a second communication device via a communication channel that includes a first frequency segment and a second frequency segment, wherein a gap in frequency between the first frequency segment and the second frequency segment is not used for the communication channel, and wherein the plurality of MAC layer data units includes at least i) a first MAC layer data unit and ii) a second MAC layer data unit, and wherein the plurality of MAC layer data units are generated such that a number of different traffic identifiers (TIDs), corresponding to single MAC layer data units of the plurality of MAC layer data units received by the second communication device in a single transmission, is not greater than a maximum number of different traffic identifiers TIDs;

wherein the one or more ICs are further configured to:
generate one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit, and
transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment.

11. The first communication device of claim 10, wherein the one or more ICs are further configured to:
generate a third MAC layer data unit; and
partition the third MAC layer data unit into at least a first fragment and a second fragment;
generate the first MAC layer data unit to include the first fragment of the third MAC layer data unit; and
generate the second MAC layer data unit to include the second fragment of the third MAC layer data unit.

12. The first communication device of claim 11, wherein the one or more ICs are further configured to:
append a first MAC layer delimiter to the first fragment of the third MAC layer data unit;
append a second MAC layer delimiter to the second fragment of the third MAC layer data unit; and
generate the one or more PHY data units to:
include, within the first frequency portion of the one or more PHY data units, the first MAC layer data unit and no other MAC layer data units, and
include, within the second frequency portion of the one or more PHY data units, the second MAC layer data unit and no other MAC layer data units.

13. The first communication device of claim 10, wherein the one or more ICs are further configured to:
append a first MAC layer delimiter to the first MAC layer data unit;
append a second MAC layer delimiter to the second MAC layer data unit; and
generate the one or more PHY data units to:
include, within the first frequency portion of the one or more PHY data units, the first MAC layer data unit with the first MAC layer delimiter, and no other MAC layer data units, and
include, within the second frequency portion of the one or more PHY data units, the second MAC layer data unit with the second MAC layer delimiter, and no other MAC layer data units.

14. The first communication device of claim 10, wherein:
the first MAC layer data unit is a first single MAC layer data unit;
the second MAC layer data unit is an aggregate MAC layer data unit that includes a plurality of second single MAC layer data units; and
wherein the one or more ICs are further configured to generate the one or more PHY data units to:
include, within the first frequency portion of the one or more PHY data units, the first single MAC layer data unit and no other MAC layer data units, and
include, within the second frequency portion of the one or more PHY data units, the aggregate MAC layer data unit and no other MAC layer data units.

15. The first communication device of claim 10, wherein:
the first MAC layer data unit is a first aggregate MAC layer data unit that includes a plurality of first single MAC layer data units;
the second MAC layer data unit is a second aggregate MAC layer data unit that includes a plurality of second single MAC layer data units; and
wherein the one or more ICs are further configured to generate the one or more PHY data units to
include, within the first frequency portion of the one or more PHY data units, the first aggregate MAC layer data unit and no other MAC layer data units; and
include, within the second frequency portion of the one or more PHY data units, the second aggregate MAC layer data unit and no other MAC layer data units.

16. The first communication device of claim 15, wherein the one or more ICs are further configured to:
receive a parameter from the second communication device, wherein the parameter specifies the maximum number of different traffic identifiers (TIDs) corresponding to single MAC layer data units that can be received by the second communication device in the single transmission, and wherein each TID indicates at least one of i) a particular traffic class to which the corresponding single MAC layer data unit belongs, and ii) a particular traffic stream to which the corresponding single MAC layer data unit belongs; and
generate the first aggregate MAC layer data unit and the second aggregate MAC layer data unit such that a number of different traffic identifiers TIDs, corresponding to single MAC layer data units in both the first aggregate MAC layer data unit and the second aggregate MAC layer data unit, is not greater than the maximum number of different traffic identifiers TIDs specified by the parameter received from the second communication device.

17. A first communication device for communicating in a wireless communication network, the first communication device comprising:
a wireless network interface device comprising one or more integrated circuits (ICs) configured to:
generate a plurality of media access control (MAC) layer data units to be transmitted to a second communication device via a communication channel that includes a first frequency segment and a second frequency segment, wherein a gap in frequency between the first frequency segment and the second frequency segment is not used for the communication channel, and wherein the plurality of MAC layer data units includes at least i) a first MAC layer data unit and ii) a second MAC layer data unit;
wherein the one or more ICs are further configured to:
generate one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit, and
transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment; wherein:
the first MAC layer data unit is a first aggregate MAC layer data unit that includes a plurality of first single MAC layer data units;
the second MAC layer data unit is a second aggregate MAC layer data unit that includes a plurality of second single MAC layer data units; and
wherein the one or more ICs are further configured to generate the one or more PHY data units to
include, within the first frequency portion of the one or more PHY data units, the first aggregate MAC layer data unit and no other MAC layer data units; and
include, within the second frequency portion of the one or more PHY data units, the second aggregate MAC layer data unit and no other MAC layer data units; and
wherein the one or more ICs are further configured to:
receive a parameter from the second communication device, wherein the parameter specifies a maximum number of single MAC layer data units having a same traffic identifier (TID) that can be received by the second communication device in a single transmission, and wherein the TID indicates at least one of i) a particular traffic class to which the corresponding single MAC layer data unit belongs, and ii) a particular traffic stream to which the corresponding single MAC layer data unit belongs;

generate the first aggregate MAC layer data unit and the second aggregate MAC layer data unit to both include single MAC layer data units having the same TID; and generate the first aggregate MAC layer data unit and the second aggregate MAC layer data unit such that a number of single MAC layer data units in both of the first aggregate MAC layer data unit and the second aggregate MAC layer data unit having the same TID is not greater than the maximum number of single MAC layer data units specified by the parameter received from the second communication device.

18. A first communication device for communicating in a wireless communication network, the first communication device comprising:

a wireless network interface device comprising one or more integrated circuits (ICs) configured to:

generate a plurality of media access control (MAC) layer data units to be transmitted to a second communication device via a communication channel that includes a first frequency segment and a second frequency segment, wherein a gap in frequency between the first frequency segment and the second frequency segment is not used for the communication channel, and wherein the plurality of MAC layer data units includes at least i) a first MAC layer data unit and ii) a second MAC layer data unit;

wherein the one or more ICs are further configured to:

generate one or more physical layer (PHY) data units that include the plurality of MAC layer data units, including i) generating a first frequency portion of the one or more PHY data units to include the first MAC layer data unit, and ii) generating a second frequency portion of the one or more PHY data units to include the second MAC layer data unit, and transmit the one or more PHY data units to the second communication device via the communication channel, including simultaneously transmitting i) the first frequency portion of the one or more PHY data units to the second communication device via the first frequency segment, and ii) the second frequency portion of the one or more PHY data units to the second communication device via the second frequency segment; wherein:

the first MAC layer data unit is a first aggregate MAC layer data unit that includes a plurality of first single MAC layer data units;

the second MAC layer data unit is a second aggregate MAC layer data unit that includes a plurality of second single MAC layer data units; and wherein the one or more ICs are further configured to generate the one or more PHY data units to include, within the first frequency portion of the one or more PHY data units, the first aggregate MAC layer data unit and no other MAC layer data units; and include, within the second frequency portion of the one or more PHY data units, the second aggregate MAC layer data unit and no other MAC layer data units; and wherein the one or more ICs are further configured to:

receive a first parameter from the second communication device, wherein the first parameter specifies a first minimum spacing between starts of MAC protocol data units (MPDUs) in aggregate MPDUs (A-MPDUs);

receive a second parameter from the second communication device, wherein the second parameter specifies a second minimum spacing between starts of MPDUs in A-MPDUs, wherein the second minimum spacing is greater than the first minimum spacing; and generate the first aggregate MAC layer data unit and the second aggregate MAC layer data unit according to the second minimum spacing.

19. The first communication device of claim 10, wherein:

the wireless network interface device comprises one or more transceivers implemented on the one more ICs.

20. The first communication device of claim 19, further comprising:

one or more antennas coupled to the one or more transceivers.

* * * * *